United States Patent
Sasaki et al.

(10) Patent No.: US 7,882,771 B2
(45) Date of Patent: Feb. 8, 2011

(54) DUST-COLLECTING DEVICES AND CUTTING DEVICES WITH THE DUST-COLLECTING DEVICES

(75) Inventors: Katsuhiko Sasaki, Anjo (JP); Masahiko Ono, Anjo (JP); Taiju Tsuboi, Anjo (JP); Manabu Tokunaga, Anjo (JP); Shinji Hirabayashi, Anjo (JP); Toshiyuki Kani, Anjo (JP); Syuji Aoyama, Anjo (JP)

(73) Assignee: Makita Corporation, Anjo-shi (JP)

( * ) Notice: Subject to any disclaimer, the term of this patent is extended or adjusted under 35 U.S.C. 154(b) by 0 days.

(21) Appl. No.: 12/457,335

(22) Filed: Jun. 8, 2009

(65) Prior Publication Data

US 2009/0249929 A1    Oct. 8, 2009

Related U.S. Application Data

(62) Division of application No. 11/180,562, filed on Jul. 14, 2005, now Pat. No. 7,559,268.

(30) Foreign Application Priority Data

| Jul. 16, 2004 | (JP) | ............... 2004-209969 |
| Sep. 24, 2004 | (JP) | ............... 2004-277306 |
| Dec. 9, 2004 | (JP) | ............... 2004-357112 |
| Jan. 19, 2005 | (JP) | ............... 2005-011402 |

(51) Int. Cl.
  *B23D 45/04* (2006.01)
(52) U.S. Cl. .............. 83/100; 83/167; 83/473; 83/490
(58) Field of Classification Search .......... 83/167, 83/478, 471.3, 473, 100, 490
See application file for complete search history.

(56) References Cited

U.S. PATENT DOCUMENTS

| 2,278,096 A | 3/1942 | Ross |
| 2,542,634 A | 11/1947 | Davis et al. |
| 2,839,102 A | 6/1958 | Kido |
| 3,322,169 A | 5/1967 | Hillard |
| 3,506,042 A | 4/1970 | Zuercher |
| 4,201,256 A | 5/1980 | Truhan |
| 4,573,237 A | 3/1986 | Kochte et al. |
| 5,063,805 A | 11/1991 | Brundage |
| 5,445,056 A | 8/1995 | Folci |
| 5,782,153 A | 7/1998 | Sasaki et al. |
| 5,819,619 A | 10/1998 | Miller et al. |
| 5,927,171 A | 7/1999 | Sasaki et al. |
| 5,931,072 A | 8/1999 | Shibata |
| 6,154,919 A | 12/2000 | Hetko |
| 6,289,778 B1 | 9/2001 | Wixey |

(Continued)

FOREIGN PATENT DOCUMENTS

DE    766255 C    12/1952

(Continued)

*Primary Examiner*—Kenneth E. Peterson
(74) *Attorney, Agent, or Firm*—Oliff & Berridge, PLC

(57) ABSTRACT

A dust-collecting device for collecting cutting chips produced by a cutting device has a separator for separating the cutting chips from the carrier air by utilizing the force of gravity upon the cutting chips. A dust container collects the cutting chips separated by the separator. The separator includes a separator body having a cutting chip discharge pipe and an air discharge pipe. After separation the carrier air is discharged upward from the separator body via the air discharge pipe. The separated cutting chips are discharge downward from the separator body via the cutting chip discharge pipe. The dust container is connected to the cutting chip discharge pipe.

10 Claims, 31 Drawing Sheets

U.S. PATENT DOCUMENTS

| | | |
|---|---|---|
| 6,427,570 B1 | 8/2002 | Miller et al. |
| 6,833,016 B2 | 12/2004 | Witter |
| 2004/0089125 A1 | 5/2004 | Schoene et al. |

FOREIGN PATENT DOCUMENTS

| | | |
|---|---|---|
| JP | A-08-057807 | 3/1996 |
| JP | A-08-057808 | 3/1996 |
| JP | A-09-029707 | 2/1997 |
| JP | A-10-180713 | 7/1998 |
| JP | A-10-277907 | 10/1998 |
| JP | A-2000-246703 | 9/2000 |
| JP | A-2000-317908 | 11/2000 |
| JP | A-2003-199694 | 7/2003 |

DUST-COLLECTING DEVICES AND CUTTING DEVICES WITH THE DUST-COLLECTING DEVICES

This is a Division of application Ser. No. 11/180,562 filed Jul. 14, 2005 now U.S. Pat. No. 7,559,268, which claims the benefit of Japanese Patent Publication Nos. 2004-209969, 2004-277306, 2004-357112, and 2005-011402 filed Jul. 16, 2004, Sep. 24, 2004, Dec. 9, 2004 and Jan. 19, 2005, respectively. The disclosures of the prior applications are hereby incorporated by reference herein in their entirety.

BACKGROUND OF THE INVENTION

1. Field of the Invention

The present invention relates to dust-collecting devices for collecting dust and debris, such as cutting chips produced during a cutting operation of a cutting device. The present invention also relates to cutting devices having such dust-collecting devices.

2. Description of the Related Art

Japanese Laid-Open Patent Publication No. 10-180713 teaches a known cutting device configured as a table saw and including a dust-collecting device. The dust-collecting device has a guide pipe and a dust-collecting bag. One end of the guide pipe is connected to a blade cover used for covering a circular saw blade of the table saw. The dust-collecting bag is connected to the other end of the guide pipe. A fan is disposed within the guide pipe, so that the air blowing force generated by the fan added to the air blowing force generated by the rotating saw blade may feed cutting chips produced during the cutting operation by the saw blade into the dust-collecting bag. In general, the dust-collecting bag is made of fabric. Therefore, the mesh of the fabric may separate the cutting chips from the air, so that the cutting chips are collected within the dust-collecting bag.

However, during a long time period of use of the dust-collecting device, the mesh of the fabric may become clogged with cutting chips. As a result, the air may be prevented from passing through the dust collection bag. Consequently, the dust-collecting efficiency may be degraded.

In addition, in order to dispose of the cutting chips, it may be necessary to beat or strike the dust-collecting bag in order to dislodge or remove the clogged dust from within the fabric mesh. This may cause the cutting chips to fly through the air. Therefore, it is not possible to sanitarily dispose the cutting chips in a controlled manner.

Further, in order to compensate for the degradation of the collecting efficiency, a fan is required to providing an additional force to the blowing force produced by the rotating saw blade.

Furthermore, the table saw of the above Japanese Laid-Open Patent Publication No. 10-180713 is configured to have a table and a saw unit vertically pivotable relative to the table. The dust-collecting bag is connected to the blade case via a cylindrical tubular mount portion disposed on the rear side of the blade case. U.S. Pat. No. 6,289,778 also teaches the same arrangement.

However, with this arrangement, the dust-collecting bag may extend rearward from the blade case. Therefore, when the saw unit is pivoted downward for a cutting operation, the dust-collecting bag may move upward opposite to the movement of the saw unit, so that the rear end of the dust-collecting bag may extend upward. In addition, after the cutting operation has been finished, the saw unit may be held in the downwardly pivoted position for transportation or for storing at a predetermined place. A table saw with the dust-collecting bag extending upward is difficult to handle. In addition, a storage space having a relatively large height must be ensured for storing the table saw. Such difficulties may be resolved if the dust-collecting bag is removed from the table saw. However, the operation for removing the dust-collecting bag for each occasion of storing the table saw is very troublesome. In addition, the further troublesome operation of disposing the collected cutting chips is required for each occasion of storing the table saw.

SUMMARY OF THE INVENTION

It is accordingly an object of the present invention to teach improved dust-collecting devices that can effectively collect dust. It is also an object to teach improved saws having such dust-collecting devices.

In one aspect of the present teachings, dust-collecting devices for collecting the cutting chips produced by a cutting device are taught. The dust-collecting device includes a separator for separating the cutting chips from the carrier air by utilizing the force of gravity on the cutting chips. A dust container or a dust-collector collects the cutting chips separated by the separator. The separator includes a separator body that has a cutting chip discharge pipe and an air discharge pipe. After separation the carrier air is discharged upward from the separator body via the air discharge pipe. The separated cutting chips are discharge downward from the separator body via the cutting chip discharge pipe. The dust container is connected to the cutting chip discharge pipe of the separator.

Therefore, the separator separates the cutting chips from the carrier air by utilizing the force of gravity. The separated cutting chips can be collected within the dust container. Since it is not necessary to use a fabric bag filter, which may be clogged by cutting chips during a long time period of use, the dust-collecting efficiency can be improved. In addition, the cutting chips can be sanitarily disposed, since it is not necessary to beat the fabric bag in order to remove the clogged cutting chips, as required in the known art.

In one embodiment, the separator body has an inlet pipe, so that the cutting chips and the carrier air are supplied into the separator body via the inlet pipe. The inlet pipe is positioned offset from the central axis of the separator body. As a result, the cutting chips, supplied into the separator body via the inlet pipe, move downward toward the cutting chip discharge pipe by the force of gravity, while the cutting chips circulate within the separator body in a circumferential direction along an inner wall of the separator body.

With this arrangement, the cutting chips are forced to move toward the inner wall of the separator body as they circulate within the separator body. Therefore, the cutting chips can be effectively separated from the carrier air by utilizing centrifugal force in addition to the gravity force. In other words, the separator is configured as a cyclone separator.

In another aspect of the present teachings, cutting devices are taught that include the dust-collecting devices. The cutting device may include a cutting tool, a cover for covering the cutting tool, and a guide pipe connected between the cover and the dust-collecting devices, so that the cutting chips produced by the cutting tool are fed from the cover to the dust-collecting device together with the carrier air.

In one embodiment, the cutting tool is a circular saw blade. In addition, the cutting device further includes a motor for rotatably driving the circular saw blade, so that the rotating circular saw blade produces a flow of the carrier air that are blown up into the guide pipe via the cover together with cutting chips produce by the circular saw blade.

In another embodiment, the cutting device further includes a tool unit having the cutting tool and the cover, a base to be placed on a floor of a worksite, and a slide member slidably movable relative to the base. The tool unit and the separator are mounted to the slide member.

With this arrangement, the separator may move together with the cover as the tool unit slides relative to the base. Therefore, the positional relation between the separator and the cover may not change during the sliding movement of the tool unit. For this reason, the sliding movement of the tool unit may not cause that the guide pipe connected between the cover and the separator is excessively flexed. Therefore, the cutting chips may be smoothly fed into the separator.

In a further embodiment, the dust container is removably mounted to the slide member. With this arrangement, the cutting chips can be easily disposed of from the dust container after the dust container has been removed from the slide member.

In a still further embodiment, the cutting device further includes a motor for driving the cutting tool and a fan that produces a flow of air for cooling the motor. A suction pipe connects between an upstream side of the fan and the air discharge pipe of the separator body. Therefore, the air within the separator body may be drawn from the separator body by the negative pressure produced by the fan. As a result, the pressure within the separator body may be reduced so as to enable the effective drawing of the cutting chips from the side of the cutting tool via the cover and the guide pipe.

In another aspect of the present teachings, saws are taught that include a rotary circular saw blade, a cover for covering the saw blade, and a dust-collecting device connected to the cover, so that cutting chips are fed to the dust-collecting device together with the flow of carrier air produced when the saw blade rotates within the cover. The dust-collecting device includes a first dust-collector, a cyclone unit, and a second dust-collector. The first dust-collector defines a first dust-collecting chamber and serves to collect at least a portion of the cutting chips, e.g., large and heavy cutting chips, fed from the side of the saw blade together with the carrier air and dropping within the first dust-collecting chamber due at least in part to the force of gravity. The cyclone unit receives the flow of the remaining cutting chips together with the carrier air, in which the cutting chips had not been collected within the first dust-collector. The cyclone body serves to cause circulation of the remaining cutting chips together with the carrier air along the circumference of the inner wall, while the separated remaining cutting chips drop downward by the force of gravity. After separation the carrier air is discharged upward from the cyclone body via the air discharge pipe. The separated cutting chips are discharge downward from the cyclone body via the cutting chip discharge pipe. The second dust-collector defines a second dust-collecting chamber and is connected to the cutting chip discharge pipe of the cyclone body, so that the cutting chips discharged from the cutting chip discharge pipe are collected within the second dust-collecting chamber.

With this arrangement, the first dust collect may collect the large and heavy cutting chips. Small and light cutting chips, which have not been collected by the first dust-collector, may be fed to the cyclone unit, where the cutting chips are separated from the carrier air by the force of gravity and the centrifugal force. The cutting chips separated by the cyclone unit are further fed so as to be collected within the second dust-collector. Therefore, the cutting chips may be effectively collected without utilizing a fabric bag filter, as required in the known art.

In one embodiment, the saw further includes an adjusting device that serves to adjust the position of the dust-collecting device relative to the cover. Therefore, it is possible to adjust the position of the dust-collecting device in order to suitably collect the cutting chips. For example, it is possible to adjust the angular position of the dust-collecting device such that the cyclone unit can effectively separate the cutting chips.

In another embodiment, the dust-collecting device is vertically pivotally mounted to the cover. The adjusting device is operable to adjust a vertical pivotal angle of the dust-collecting device relative to the cover.

In a further embodiment, the saw further includes a base vertically pivotally supporting the cover between an uppermost position and a lowermost position. The adjusting device adjusts the relative vertical angle between the cover and the dust-collecting device, so that the relative vertical angle when the cover is at the uppermost position or a position proximal to the upper most position is smaller than the relative vertical angle when the cover is at the lowermost position or a position proximal to the lowermost position.

Therefore, the cover may move to the uppermost position or the position proximal to the uppermost position without interference by the dust-collecting device, since the dust collating device may pivot to decrease the relative vertical angle. On the contrary, when the cover has moved to the lowermost position or the position proximal to the lowermost position, a large relative angle can be ensured between the dust-collecting device and the cover. Therefore, it is possible to prevent the cyclone unit from largely inclining relative to the vertical direction. As a result, the separation efficiency of the cyclone unit may be favorably maintained.

In a further embodiment, the adjusting device includes a restricting device and a support device. The restricting device serves to prevent the relative pivotal movement between the cover and the dust-collecting device, so that the dust-collecting device pivots together with the cover when the cover has pivoted downward from an intermediate position between the lowermost position and the uppermost position. The support device serves to support the dust-collecting device at a predetermined position, such as a horizontal position relative to the base, against the force of gravity when the cover has pivoted upward from an intermediate position.

In a still further embodiment, the dust-collecting device further includes a single bottom cover defining the bottoms of the first and second dust-collecting chambers. The cutting chips collected within the first and second dust-collecting chambers can be simultaneously discharged at a single time by opening the common bottom cover.

In a still further embodiment, the first dust-collector defining the first dust-collecting device has a front portion removably connected to the cover and including a width narrower than the remaining portion. With this arrangement, the operator can more easily grasp the narrower width front portion in order to connect and disconnect the dust-collecting device respectively to and from the cover.

In a still further embodiment, the first dust-collector, defining the first dust-collecting device, has engaging recesses formed on both lateral sides and extending proximally to and along an upper edge of the first dust-collector. As a result, an operator can hold the dust-collecting device by engaging the operator's fingers with the recesses. With this arrangement the operator can stably hold the dust-collecting device after the collecting device has been removed from the cover. Preferably, the engaging recesses are formed in a position substantially corresponding to the center of gravity of the dust-collecting device.

In a further aspect of the present teachings, table saws are taught that include a table, a saw unit, a dust-collecting device, and a connecting device. The table defines a surface for placing a workpiece thereon. The saw unit is vertically pivotally mounted on the table and includes a saw blade and a cover for covering the saw blade. The dust-collecting device serves to collect cutting chips produced by the saw blade during a cutting operation of a workpiece. The connecting device vertically pivotally connects the dust-collecting device to the saw unit.

With this arrangement, it is possible to position the dust-collecting device independently of the vertical position of the saw unit. For example, the dust-collecting device may be positioned at a lowermost position while the saw unit is also positioned at a lowermost position. Therefore, the table saw having the dust-collecting device could easily be transported to a desired place. In particular, it is possible to store the table saw within a storage space that is relatively small in height.

In one embodiment, the saw blade is a rotary saw blade and the cover has a discharge pipe connected to the cover. Cutting chips produced by the saw blade are blown up into the discharge pipe together with the flow of carrier air produced by the rotating saw blade. The connecting device includes an inlet pipe member pivotally mounted to the dust-collecting device. The connecting device includes a first end connected to the discharge pipe and a second end open into the dust-collecting chamber.

In another embodiment, the connecting device is configured to connect the dust-collecting device such that the dust-collecting device is free to pivot relative to the saw unit due to the force of gravity. With this arrangement, the dust-collecting device may normally be held in the lowermost position by the force of gravity.

In a further embodiment, the connecting device connects the dust-collecting device such that the dust-collecting device can pivot relative to the saw unit within a limited pivotal range. In addition, a retaining device temporarily holds the dust-collecting device in an intermediate position within the limited pivotal range.

With this arrangement, when the dust-collecting device is held in an intermediate position, the dust-collecting device may vertically pivot together with the saw unit, for example, during the pivotal movement of the saw unit for a cutting operation. Therefore, it is possible to position the dust-collecting device such that the dust-collecting device can effectively collect the cutting chips. The retaining device may be released to permit the dust-collecting device from pivoting downward by the force of gravity, so that the dust-collecting device can be held in the lowermost position for transportation or for storing.

In a still further embodiment, the table saw further includes a restricting member that serves to support the dust-collecting device from the lower side in order to restrict a lower pivotal end of the dust-collecting device. This arrangement makes it possible to prevent the dust-collecting device from interacting with the other elements, such as movable elements, in particular a movable slide support member of the saw unit. Therefore, the dust-collecting device and the restricting member can be prevented from being damaged.

In a still further embodiment, a support device mounted to the table vertically, pivotally, and horizontally, movably supports the saw unit. The restricting member is mounted to the support device.

In a still further embodiment, the restricting member resiliently supports the dust-collecting device from a lower side against the force of gravity. Therefore, it is possible to absorb potential impact or vibration applied to the dust-collecting device when the dust-collecting device moves to the lowermost position. Consequently, the generation of impact sounds or vibration sounds may be prevented or minimized.

In a still further embodiment, a rolling member is mounted to the restricting member, so that the restricting member contacts with the dust-collecting member via the rolling member. By using this arrangement, it is possible to ensure that the dust-collecting device can smoothly move in a horizontal direction in response to the vertical pivotal movement of the saw unit. Therefore, possible damage to the dust-collecting device and the restricting member can be further reduced so that the durability of the dust-collecting device can be improved.

In a still further aspect of the present teachings, table saws are taught that include a table, a saw unit, and a dust-collecting device. The table defines a surface for placing a workpiece thereon. The saw unit is vertically pivotally and laterally pivotally mounted to the table and includes a rotary circular saw blade and a case for covering the saw blade. The dust-collecting device is mounted to the saw unit and includes a first dust-collector, a cyclone unit, and a second dust-collector, assembled to each other. The first dust-collector defines a first dust-collecting chamber and is connected to the cover. Cutting chips produced by the saw blade during a cutting operation are fed into the first dust-collecting chamber together with the flow of carrier air and are partly collected within the first dust-collecting chamber by the force of gravity. The cyclone unit receives the remaining cutting chips carried by the air that were not collected within the first dust-collecting chamber. The cyclone unit includes a cyclone body, a cutting chip discharge pipe, and an air discharge pipe. The cyclone body has an inner wall and is arranged and constructed to cause circulation of the cutting chips together with the carrier air along the circumference of the inner wall, while at least some of the remaining cutting chips drop downward by the force of gravity. After separation, the carrier air is discharged upward from the cyclone body via the air discharge pipe. The separated cutting chips are discharge downward from the cyclone body via the cutting chip discharge pipe. The position of the cyclone unit is determined such that the cyclone unit moves to the upper side of the first dust-collecting chamber as the saw unit pivots laterally in one direction together with the dust-collecting device.

This configuration allows the first dust-collector to collect the large and heavy cutting chips while the second dust-collector collects the small and light cutting chips after separation by the cyclone unit utilizing a centrifugal force in addition to the force of gravity. In addition, because the cyclone unit moves to the upper side of the first dust-collecting chamber as the saw unit laterally pivots in one direction together with the dust-collecting device, the cutting chips collected within the first dust-collecting chamber may not be inadvertently moved to the cyclone unit through the force of gravity. Therefore, the cutting chips can be effectively collected even in the event that the saw unit has been laterally inclined in order to perform an oblique cutting operation.

In one embodiment, the cyclone unit is positioned on one side of the first dust-collector opposite to the lateral pivotal direction of the saw unit.

In another embodiment, the first dust-collecting chamber includes an inlet, a terminal end, and an outlet. The terminal end opposes to the inlet in the direction of the flow of cutting chips entering the inlet, so that the cutting chips collide with the terminal end. The outlet is disposed on a lateral side of the collecting chamber and is positioned spaced apart from the terminal end by a predetermined distance in a direction toward the inlet. As a result, a space is defined between the outlet and the terminal end in order to prevent the cutting chips from entering the outlet due to rebounding after collision with the terminal end.

With this arrangement, the flow of the cutting chips is moderately buffered by the space between the outlet and the terminal end before entering the cyclone unit. In other words, the space serves as a buffer region. The cutting chips can then be effectively collected within the first dust-collector without causing the cutting chips to enter the cyclone unit due to a rebounding force. As a result, the dust-collecting efficiency can be improved.

In one embodiment, the first dust-collecting chamber has a cross-sectional area that gradually increases in the direction of flow of the cutting chips within the first dust-collecting chamber. For example, the first dust-collecting chamber may have a streamlined configuration.

With this arrangement, the pressure of the carrier air flowing through the first dust-collecting chamber is gradually reduced in a direction toward the outlet. Consequently, the flow rate of the cutting chips as well as flow rate of the carrier air may be gradually reduced without the generation of turbulent flow in the carrier air. As a result, it is possible to ensure that a major portion of the cutting chips can fall within the first dust-collecting chamber so as to be collected therein. Therefore, the dust-collecting efficiency can be improved.

In a still further aspect of the present teachings, circular saws are taught that include a saw unit and a dust-collecting device. The saw unit includes a rotary circular saw blade and a case for covering the saw blade. The dust-collecting device is connected to the saw unit and includes a first dust-collector, a cyclone unit, and a second dust-collector, assembled to each other. The first dust-collector defines a first dust-collecting chamber that includes an inlet, a terminal end, and an outlet. The terminal end opposes the inlet in the direction of flow of the cutting chips entering the inlet, so that the cutting chips collide with the terminal end. The outlet is disposed on a lateral side of the collecting chamber and is positioned spaced apart from the terminal end by a predetermined distance in the direction toward the inlet. A space is defined between the outlet and the terminal end in order to prevent the cutting chips from entering the outlet due to rebounding after collision with the terminal end.

Also with this arrangement, the cutting chips can be effectively collected by the incorporation of the cyclone unit. In addition, it is possible to effectively collect the cutting chips within the first dust-collecting chamber by the incorporation of the buffering space between the outlet and the terminal end.

DETAILED DESCRIPTION OF THE INVENTION

Each of the additional features and teachings disclosed above and below may be utilized separately or in conjunction with other features and teachings to provide improved dust-collectors and table saws having such dust-collectors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

First Representative Embodiment

Figure 1:
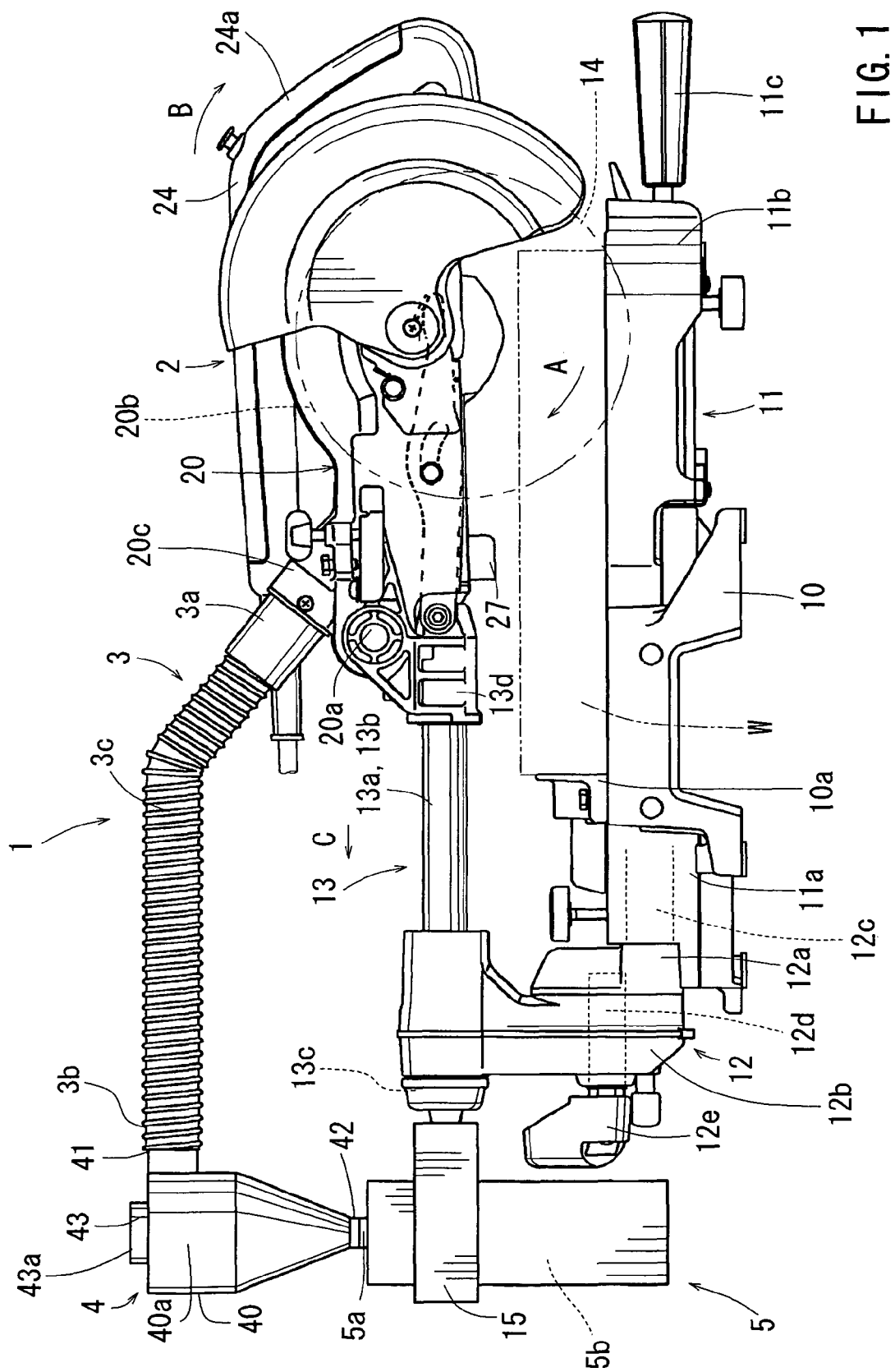
FIG. 1 is a front view of a slide table saw according to a first representative embodiment of the present invention.

A first representative embodiment of the present invention will now be described with reference to FIGS. 1 to 3. Referring to FIG. 1, there is shown a representative slide table saw 1 that includes a base 10, adapted to be placed on a floor of a work site, a turntable 11, rotatable relative to the base 10 within a substantially horizontal plane, a first slide 12, slidably movable relative to the turntable 11 in the right and left directions as viewed in FIG. 1, and a second slide 13, slidably movable relative to the first slide 12 in the right and left directions. In addition, the slide table saw 1 includes a saw unit 2 with a circular saw blade 14. The slide table saw 1 further includes a dust-collecting device for collecting cutting chips produced during a cutting operation, as will be explained later.

Figure 2:
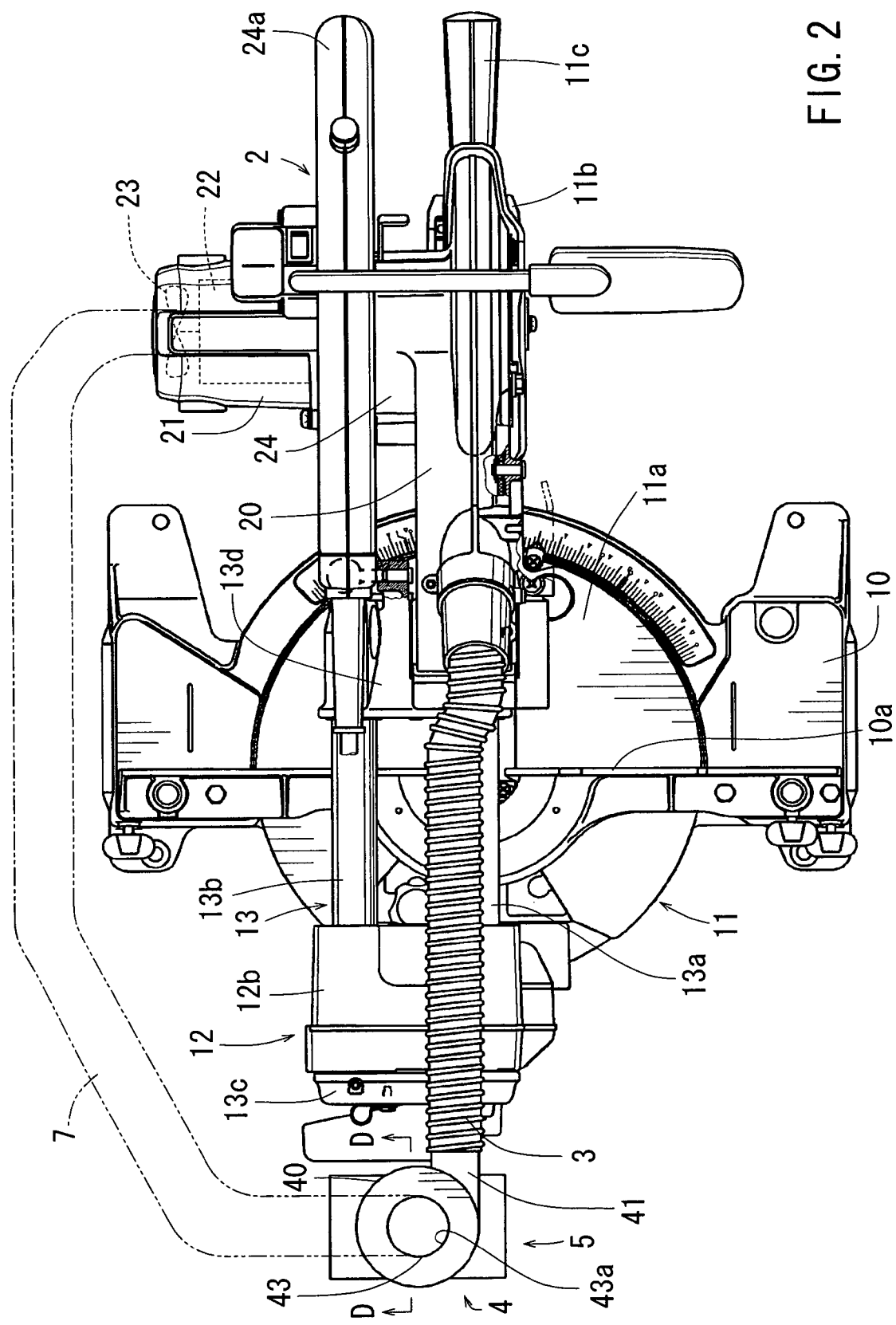
FIG. 2 is a plan view of FIG. 1 and also showing a suction pipe in dotted lines of a table saw according to a second representative embodiment.

As shown in FIG. 2, the turntable 11 has a circular disk-like portion 11a and an extension 11b, formed integrally with the disk-like portion 11a and extending radially outward from a portion (the rightmost portion as viewed in FIG. 2) of the outer circumference of the disk-like portion 11a. A fixing member 11c is operable to fix the table 11 in a desired rotational position relative to the base 10.

As shown in FIG. 1, a fence 10a is fixedly mounted on the base 10 to extend over and across the table 11. Therefore, in order to cut a workpiece, the workpiece may be placed on the table 11 with one side of the workpiece contacting the fence 10a. A holder (not shown) may be provided for pressing the workpiece against the upper surface of the table 11.

The first slide 12 has a slide member 12a and a pivotable member 12b. The slide member 12a is disposed in a position adjacent to a left side portion of the table II as viewed in FIG. 1. The pivotable member 12b is disposed adjacent to the left side of the slide member 12a. The table 11 supports the slide member 12a via a pair of parallel horizontal arms 12c, so that the slide member 12a can slide in the right and left directions as viewed in FIG. 1. The pivotable member 12b is laterally pivotally mounted to the slide member 12a via a shaft 12d, so that the pivotal member 12b can pivot in a direction of the thickness of the sheet of FIG. 1. A handle 12e is mounted to the slide member 12a in order to fix the pivotal member 12b at a desired pivoted angle relative to the slide member 12a. As a result, a cutting operation can be performed with the saw blade 14 as well as the saw unit 2 laterally inclined relative to the table 11.

As shown in FIG. 2, the second slide 13 has a pair of parallel horizontal arms 13a and 13b and a pair of arm holders 13c and 13d. As shown in FIG. 1, the arms 13a and 13b extend horizontally through the upper portion of the pivotable member 12b, so that the arms 13a and 13b can slide in the right and left directions relative to the pivotable member 12b. The arm holder 13c is mounted to the left ends of the arms 13a and 13b in order to connect there between. The arm holder 13d is mounted to the right ends of the arms 13a and 13b in order to connect there between. The saw unit 2 is mounted to the right side arm holder 13d.

As shown in FIG. 2, the saw unit 2 has a motor housing 21, a main housing 24, and a cover 20, that are integrally formed with each other. The motor housing 21 is disposed on the right side of the main housing 24 as viewed from the orientation of an operator (the top right side as viewed in FIG. 2). An electric motor 22 and a cooling fan 23 are disposed within the motor housing 21. The cooling fan 23 produces a flow of air from the outer side to the inside of the motor housing 21 in order to cool the motor 22. A handle 24a is mounted to the main housing 24 and is adapted to be grasped by the operator during a cutting operation.

The cover 20 is joined to the left side of the main housing 24 as viewed from the orientation of the operator (see FIG. 2). As shown in FIG. 1, the cover 20 has a mount portion 20a that is vertically pivotally mounted to the arm holder 13d. Consequently, the saw unit 2 is vertically pivotally joined to the arm holder 13d via the mount portion 20a. The cover 20 has a hollow portion 20b that covers substantially the upper half of the saw blade 14. The motor 22 may drive the saw blade 14. As a result of the driving by the motor 22, the saw blade 14 rotates in a clockwise direction as indicated by an arrow A in FIG. 1 in order to cut a workpiece. The cutting chips of the workpiece may then be blown up into the hollow portion 20b due to the flow of air produced by the rotating saw blade 14.

As shown in FIG. 1, an upper portion of a scattering prevention member 27 is fitted into the hollow portion 20b. The scattering prevention member 27 is positioned at the peripheral portion of the lower opening of the cover 20 in order to oppose the flow of the blown up cutting chips. Therefore, the cutting chips may be prevented from scattering to the surrounding areas and may be effectively guided into the hollow portion 20b.

A discharge pipe 20c is formed with the cover 20 in order to discharge the cutting chips that have been blown into the hollow portion 20b. Thus, the inside of the discharge pipe 20c communicates with the inside of the hollow portion 20b. In addition, the discharge pipe 20c extends in a direction substantially conforming to the blowing direction of the cutting chips. A guide pipe 3 is connected to the upper end of the discharge pipe 20c.

The dust-collecting device includes the cover 20 and the guide pipe 3, and further includes a separator 4 and a dust container 5. The guide pipe 3 includes a flexible hose 3c and joint portions 3a and 3b mounted to opposite ends of the flexible hose 3c. The joint portions 3a and 3b are respectively connected to the discharge pipe 20c of the cover 20 and an inlet pipe 41 of the separator 4. Accordingly, the cover 20 and the separator 4 are connected to each other via the guide pipe 3.

Referring to FIG. 1, the separator 4 has a tubular separator body 40, preferably made of resin. The tubular separator body 40 includes a substantially cylindrical upper tubular portion 40a and a lower tubular portion 40b having a gradually decreasing diameter in a downward direction away from the upper tubular portion 40a. A cutting-chip discharge pipe 42 is formed with the lower end of the lower tubular portion 40a in order to discharge the cutting chips. As shown in FIG. 3, an annular plate 40c is mounted to the upper end of the upper tubular portion 40a. A tubular air discharge pipe 43 is mounted within the central opening of the annular plate 40c. The air discharge pipe 43 extends into the upper tubular portion 40a in the vertical direction and is coaxial with the central axis of the separator body 40.

Figure 3:
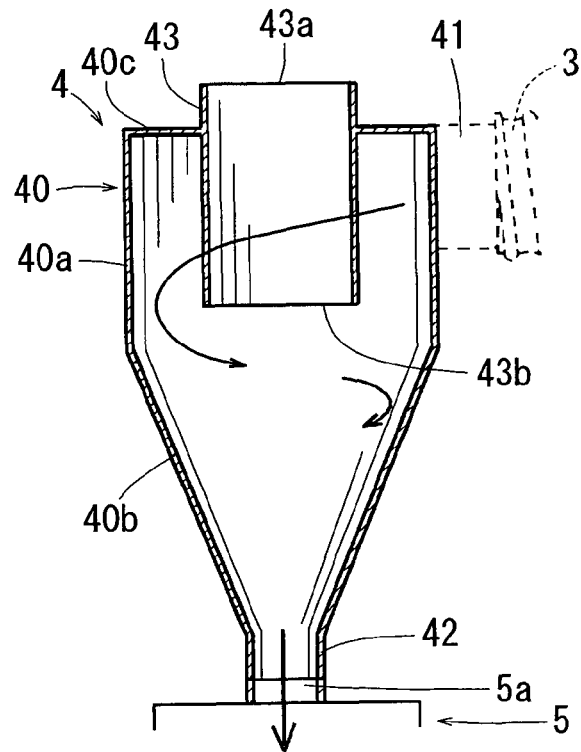
FIG. 3 is a vertical sectional view of a separator body of the slide table saw.

As shown in FIG. 3, the air discharge pipe 43 has an outlet opening 43a at its upper end and has an inlet opening 43b at its lower end, communicating with the inner space of the upper tubular portion 40a. Thus, the air discharge pipe 43 is configured to permit the air to enter the inlet opening 43b in a position near the central axis of the separator body 40 and to discharge the air to the outside of the separator body 40. Preferably, diameters of the outlet opening 43a and the inlet opening 43b are the same with each other and are larger than the inner diameter of the cutting-chip discharge pipe 42. With this configuration, the air within the separator 40 may tend to flow through the air discharge pipe 43 rather than through the cutting-chip discharge pipe 42.

As shown in FIG. 1, the inlet pipe 41 is mounted to the upper tubular portion 40a for connection with the joint portion 3b of the guide pipe 3. As shown in FIG. 2, the inlet pipe 41 is positioned in a position offset from the central axis of the separator body 40. The inlet pipe 41 extends substantially tangentially from the outer circumference of the upper tubular portion 40a within a horizontal plane. Therefore, the cutting chips entering the upper tubular portion 40a via the inlet pipe 41 may circulate along the inner circumferential wall of the separator body 40 and gradually move downward toward the cutting-chip discharge pipe 42. The cutting chips are discharged from the separator body 40 through the cutting-chip discharge pipe 42. In this way, the separator 4 is configured as a cyclone separator.

The dust container 5 defines a dust collecting chamber and has an inlet pipe 5a joined to the cutting chip discharge pipe 42. As shown in FIG. 1, the dust container 5 has a substantially rectangular parallelepiped configuration with the inlet pipe 5a disposed at the upper end of the dust container 5. As a result, the cutting chips may be collected within the dust container 5. Preferably, the dust container 5 may be made of resin. In particular, the dust container 5 does not have any fabric shaped holes or perforations.

A detachable mounting device 15 is fixedly mounted to the arm holder 13c. The dust container 5 is detachably mounted to the arm holder 13c and further to the second slide 13 via the mounting device 15. Accordingly, the separator 4 is detachably mounted to the second slide 13 together with the dust container 5.

Although not shown in the drawings, the dust container 5 may be separated into an upper portion and a lower portion that are pivotally joined by a hinge device. In order to dispose of the cutting chips collected within the dust container 5, the dust container 5 may be removed from the detachable mounting device 15. The hinge device may then pivot the upper portion relative to the lower portion of the dust container 5, producing an opening between the upper portion and the lower portion. Consequently, the cutting chips may be discharged from the dust container 5 via the opening thus produced.

The operation of the above representative embodiment will now be described in connection with the cutting operation and the operation for collecting the cutting chips by the dust-collecting device.

In order to cut a workpiece, the saw unit 2 may initially be pivoted upward to a suitable upwardly pivoted position via the mount portion 20a from the lowermost position shown in FIG. 1. The workpiece is then placed on the table 11. After which, the motor 22 is started in order to rotate the saw blade 14 in the direction indicated by the arrow A. The operator may pivot the saw unit 2 downward in a direction indicated by an arrow B in FIG. 1, so that the rotating saw blade 14 may cut the workpiece. The cutting chips produced during the cutting operation may be blown up by the rotating saw blade 14 and may then be fed into the guide pipe 3 and further to the separator 4 via the hollow portion 20b and the discharge pipe 20c of the cover 20.

If a wide workpiece is to be cut, the saw unit 2 may be slidably moved in a direction indicated by an arrow C with the aid of the first slide 12 and/or the second slide 13. As a result, the saw blade 14 can effectively cut a relatively wide workpiece. Also in this case, the generated cutting chips may be fed to the guide pipe 3 and further to the separator 4.

The cutting chips fed into the separator 4 may be separated from the air carrying the cutting chips by the separator 4. The cutting chips may then be collected within the dust container 5.

More specifically, the separator 4 is disposed between the guide pipe 3 and the dust container 5. The separator body 40 has the cutting-chip discharge pipe 42 for downwardly discharging the cutting chips that were dropped within the separator body 40 by at least the force of gravity. The dust container 5 is disposed on the downstream side of the cutting-chip discharge pipe 42. In addition, the separator body 40 has an air discharge pipe 43, through which the carrier air may be discharged upward after separation from the cutting chips.

In this way, the cutting chips and the carrier air are separated within the separator body 40 and are respectively discharged in opposite directions (i.e., downward and upward directions). Accordingly, it is possible to prevent the degradation of the dust-collecting efficiency due to the clogging of the cutting chips in the mesh of a fabric dust-collecting bag used for separating the cutting chips in the known art. In addition, the cutting chips can be sanitarily disposed, since it is not necessary to impact the dust-collecting bag in order to dislodge the clogged cutting chips.

More specifically, the inlet pipe 41 of the separation body 40 for connection with the guide pipe 3 is positioned offset from the central axis of the separation body 40, as shown in FIG. 2. Therefore, the cutting chips entering the separation body 40 via the inlet pipe 41 may drop into the separation body 40 toward the cutting-chip discharge pipe 42 while circulating in a circumferential direction along the inner wall of the separation body 40 (see FIG. 3). The circumferentially circulating cutting chips may be biased toward the circumferential wall of the separation body 40 by a centrifugal force so that the cutting chips may be effectively separated from the carrier air. Accordingly, the cutting chips may be separated from the carrier air by a centrifugal force in addition to the force of gravity.

Further, as shown in FIG. 1, the saw blade 14 as well as the cover 20 is mounted to a second slide 13 that can slide relative to the base 10. The separator 4 is also mounted to the second slide 13 via the dust container 5 and the detachable mounting device 15. Therefore, the separator 4 may move together with the cover 20 as the cover 20 or the saw unit 2 moves relative to the base 10. For this reason, even if the second slide 13 has been slidably moved relative to the base 10, the positional relationship between the cover 20 and the separator 4 may not be changed. This may prevent the guide pipe 3, connected between the cover 20 and the separator 4, from being excessively bent or deformed. In addition, the positional relationship may substantially prevent a situation where the cutting chips may not be effectively fed from the cover 20 to the separator 4 due to excessive bending of the guide pipe 3. Accordingly, the cutting chips may be smoothly and effectively fed to the separator 4.

Furthermore, since the dust container 5 is detachably mounted to the second slide 13 via the detachable mounting device 15, it is possible to remove the dust container 5 from the second slide 13 in order to readily dispose of the cutting chips collected within the dust container 5. Therefore, the disposal of the cutting chips can be easily made. In addition, because the separator 4 is mounted to the second slide 13 together with the dust container 5, the positional relationship between the dust container 5 and the separator 4 may not be changed even if the second slide 13 has been slidably moved. Consequently, the cutting chips may be fed from the separator 4 into the dust container 5 by utilizing a relatively simple mechanism constituted by the cutting-chip discharge pipe 42 and the inlet pipe 5a.

Second Representative Embodiment

A second representative embodiment is a modification of the first representative embodiment and is different from the first representative embodiment only in that a suction pipe 7, indicated by the chain lines in FIG. 1, is additionally incorporated. The suction pipe 7 may be made of a flexible hose. In addition, the suction pipe 7 may have joint portions at opposite ends respectively connected to the air discharge pipe 43 at the outlet opening 43a and to an inlet opening formed in the motor housing 21 on the upstream side of the cooling fan 23. According to this configuration, the suction force produced by the fan 23 may draw the air within the separator body 40 via the suction pipe 7. Therefore, the cutting chips may be fed from the side of the saw blade 14 to the separator 4 due to the suction force produced by the fan 23 in addition to the blowing force of the rotating saw blade 14.

As previously described, the separator 4 and the motor housing 21 are mounted to the second slide 13 as shown in FIG. 2. Therefore, the suction pipe 7, connected between the separator 4 and the motor housing 21, will not be excessively bent or deformed since the suction pipe 7 may move together with the second slide 13 relative to the base 10. As a result, the suction pipe 7 does not interfere with the sliding movement of the second slide 13. In addition, the suction pipe 7 may have a length only corresponding to the distance between the separator 4 and the motor housing 21, since the suction pipe 7 is not affected by the sliding movement of the second slide 13.

As described above, according to this modification the air within the separator body 40 may be drawn in part by the suction force produced by the fan 23, since the upstream side of the fan 23 and the air discharge pipe 43a of the separator body 40 are connected to each other via the suction pipe 7. Accordingly, the pressure within the separator body 40 may be reduced so as to effectively draw the cutting chips from the side of the saw blade 14 via the cover 20 and the guide pipe 3. Consequently, the dust-collecting efficiency can be increased.

Third Representative Embodiment

A third representative embodiment will now be described with reference to FIG. 4. The third representative embodiment is different from the first representative embodiment only in that the dust-collecting container 5 and the detachable mounting device 15 are respectively replaced with a dust container 6 and a detachable mounting device 16 shown in FIG. 4. In other respects, the third representative embodiment is the same as in the first representative embodiment.

Figure 4:
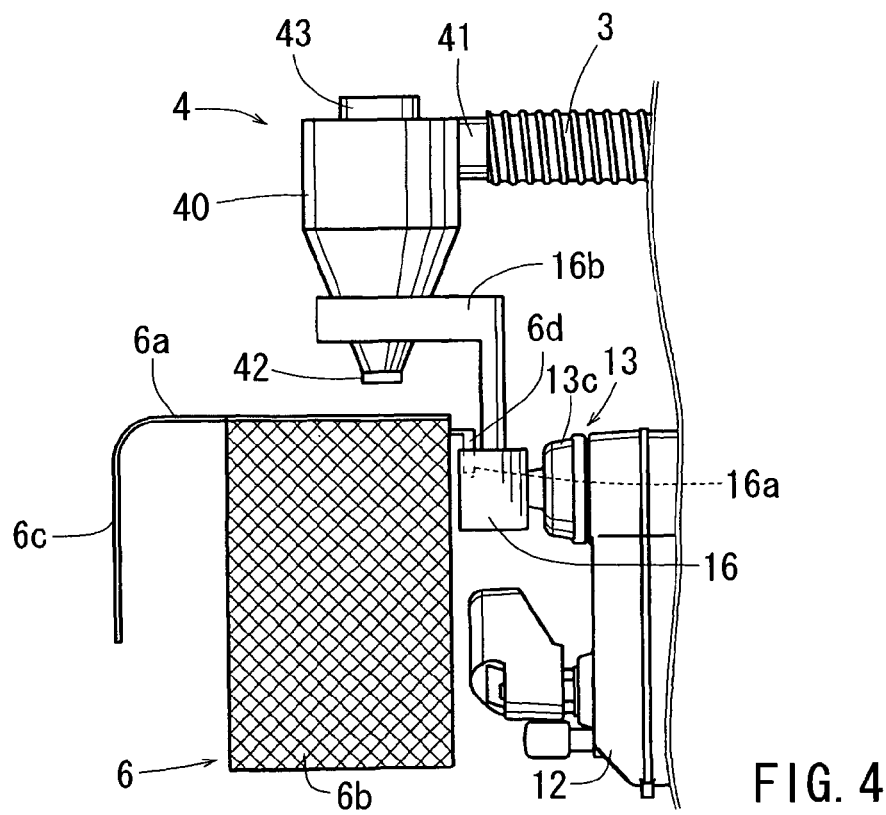
FIG. 4 is a front view of a part of a slide table saw according to a third representative embodiment.

As shown in FIG. 4, the dust container 6 includes a non-porous bag 6b made of a plastic material or the like and a frame member 6a defining an upper opening of the bag 6b. The frame member 6a maintains the opening of the upper opening of the bag 6b. A handle 6c and an engaging member 6d are formed on or mounted to the frame member 6a.

The detachable mounting device 16 is mounted to the arm holder 13c and includes a mounting portion 16a and an arm 16b. The mounting portion 16a is detachably engageable with the engaging member 6d of the dust container 6. The arm 16b serves to fixedly support the separation body 40 of the separator 4 so that the dust container 6 is positioned below the cutting chip discharge pipe 42 of the separator 4 with the upper opening of the bag 6b opposing the cutting chip discharge pipe 42. Also with this arrangement, substantially the same function and effect can be attained as with the first representative embodiment.

Possible Modifications to the First Through Third Representative Embodiments

The above first to third representative embodiments may be modified in various ways.

(1) For example, in the above representative embodiments, the separator 4 serves to separate the cutting chips from the carrier air by utilizing the force of gravity and a centrifugal force. However, it is possible to separate the cutting chips by utilizing only the force of gravity. For example, the separator body may have a wall or a plate defining a vertical surface and the cutting chips in the carrier air may collide against this vertical surface. Alternatively, a labyrinth-shaped flow channel may be formed in the separator body so that the cutting chips in the carrier air may collide with the wall surfaces of the flow channel. Thus, when the cutting chips collide with a vertical wall surface or the wall surfaces of the flow path, the flow rate of the cutting chips may be lowered so that the cutting chips may drop downward by the force of gravity. In the same manner as in the representative embodiments, the cutting chips may then be discharged from the cutting chip discharge pipe. The carrier air may be upwardly discharged from the air discharge pipe.

(2) In addition, although the above representative embodiments have been described in connection with a slidable table saw, the arrangement of the dust-collecting devices described above also may be applied to a table saw in which a saw unit is not slidably movable relative to a base, and to a portable circular saw having no base and no slide mechanism.

(3) Further, in order to produce a circulating flow of the cutting chips within the separator body, the inlet pipe is positioned to be offset from the axial center of the separator body. Alternatively, a deflection member such as a fin may be disposed within the separator body in order to produce the circulating flow.

(4) In the second representative embodiment, the suction pipe is connected to the upstream side of the fan. However, the suction pipe may be connected to a separate reducing pressure generating device, such as a vacuum pump.

Fourth Representative Embodiment

A fourth representative embodiment will now be described in connection with reference to FIGS. 5 to 19. The fourth representative embodiment is a modification of the first representative embodiment. Therefore, in FIGS. 5 to 19, the same elements as in the first representative embodiments are given the same reference numerals as FIGS. 1 to 3, and the description of these elements may not be repeated.

Figure 5:
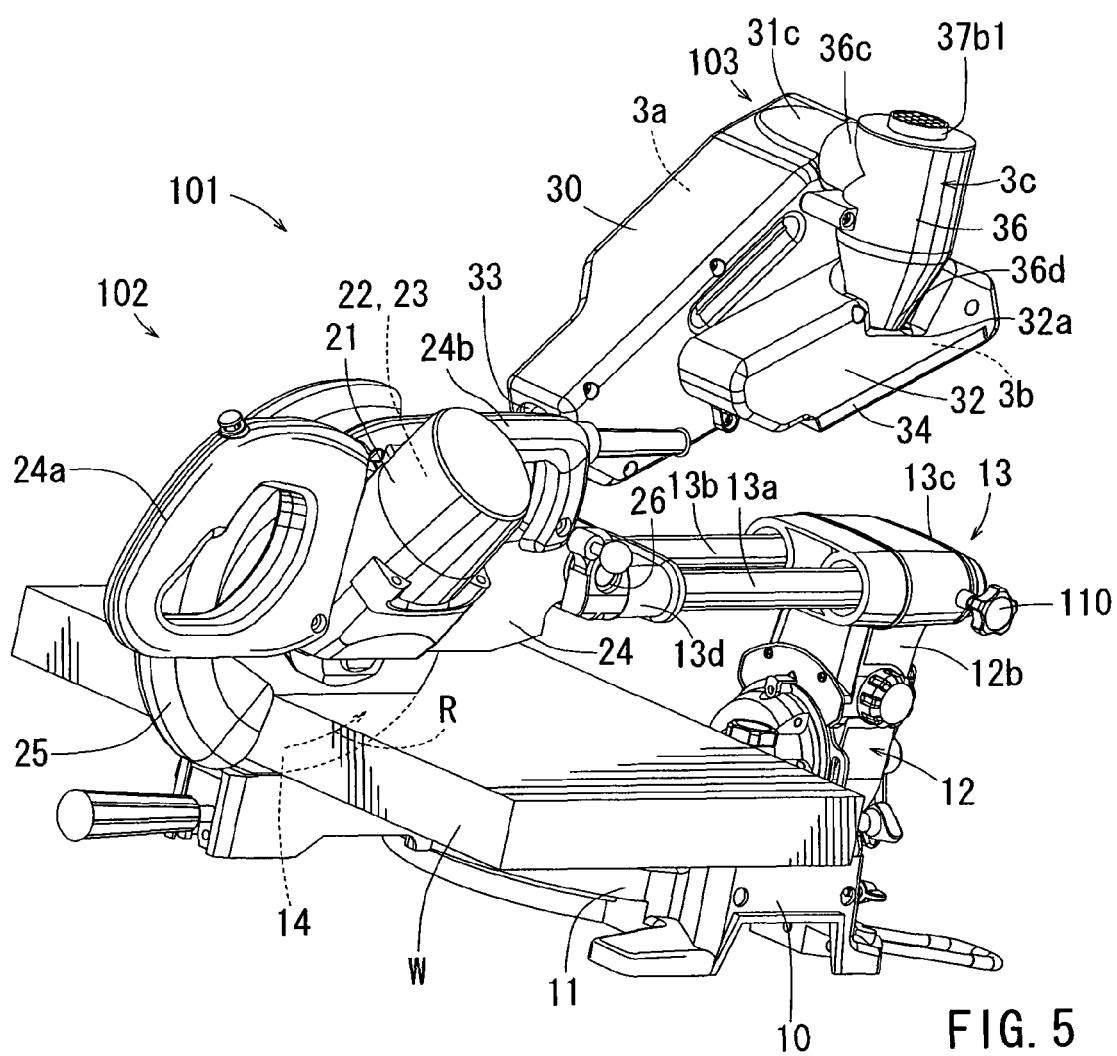
FIG. 5 is a perspective view of a slide table saw according to a fourth representative embodiment.
Figure 6:
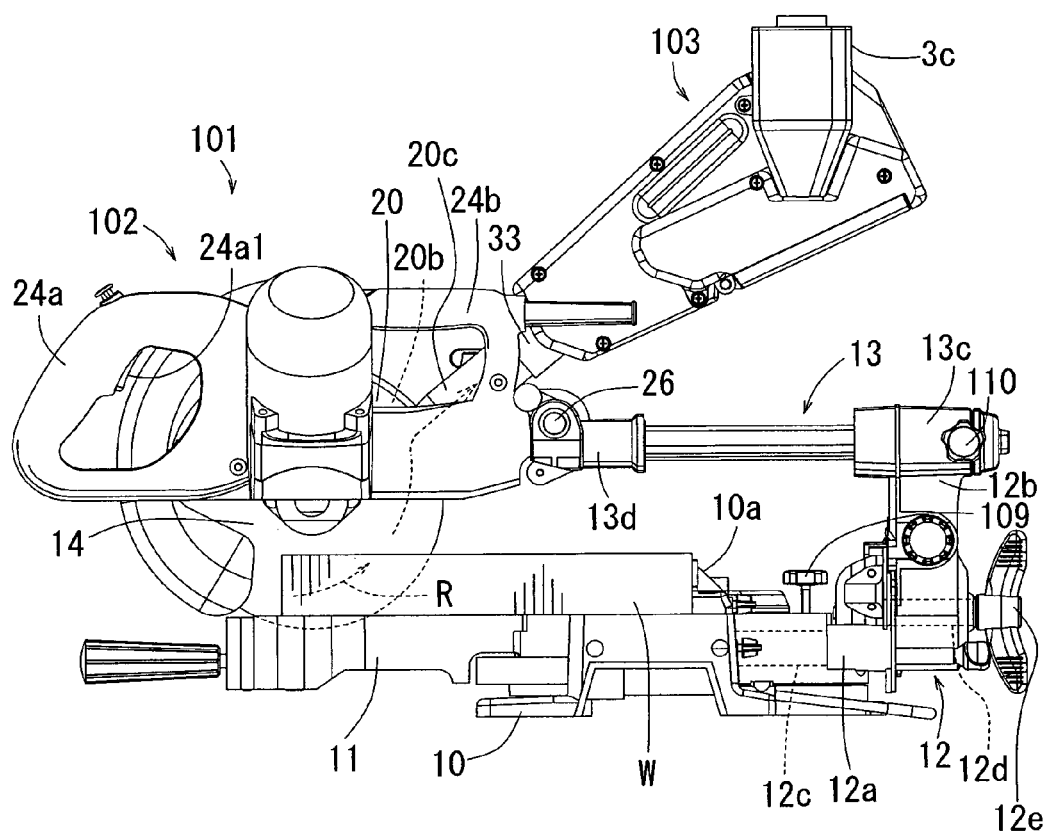
FIG. 6 is side view of the slide table saw according to the fourth representative embodiment and showing a saw unit with a blade cover pivoted to a lowermost position.

Referring to FIGS. 5 and 6, a representative slide table saw 101 is shown. Similar to the slide table saw 1 of the first representative embodiment, the slide table saw 101 includes the base 10, the turntable 11, the first slide 12, and the second slide 13. A saw unit 102 is mounted to the second slide 13 and differs from the saw unit 2 of the first representative embodiment mainly in that the body housing 24 of the saw unit 102 has an auxiliary handle 24b, in addition to the handle 24a, and that the motor housing 21 does not extend horizontally but instead extends obliquely upward. In addition, the cover 20 of the saw unit 102 is vertically pivotally supported on the arm holder 13d via pivotal shaft 26 that similarly serves as the mount portion 20a of the first representative embodiment. In addition, a dust-collecting device 103 is mounted to the saw unit 2.

As shown in FIG. 6, a fixing screw 109 is mounted to the table 11 in order to fix the arms 12c of the first slide 12 in position relative to the table 11. In addition, a fixing screw 110 is mounted to the arm holder 13c in order to fix the arms 13a and 13b in position relative to the arm holder 13c, and subsequently fixed relative to the pivotal member 12b. Therefore, when the fixing screws 109 and 110 have been tightened, the saw unit 2 may not slide horizontally, but instead can only pivot vertically.

In addition, as shown in FIG. 5, the lower half of the saw blade 14 is covered by a safety cover 25 that can pivot so as to expose the lower half of the saw blade 14 as the saw unit 2 moved downward. Further, a trigger 24a1 (see FIG. 6) is mounted to the handle 24a so that the motor 22 is started, rotating the saw blade 14, when the operator pulls the trigger 24a1.

Figure 11:
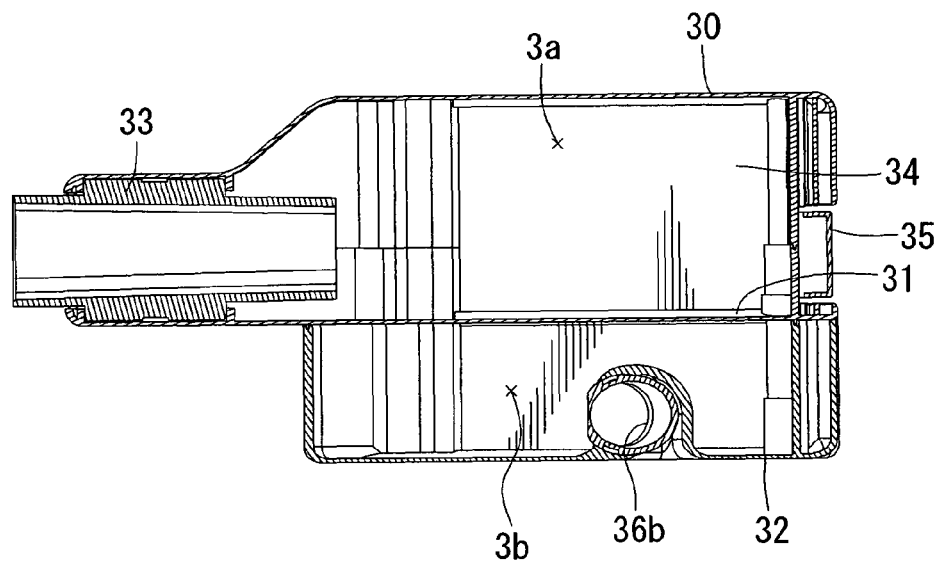
FIG. 11 is a cross-sectional view taken along line XI-XI in FIG. 10.
Figure 13:
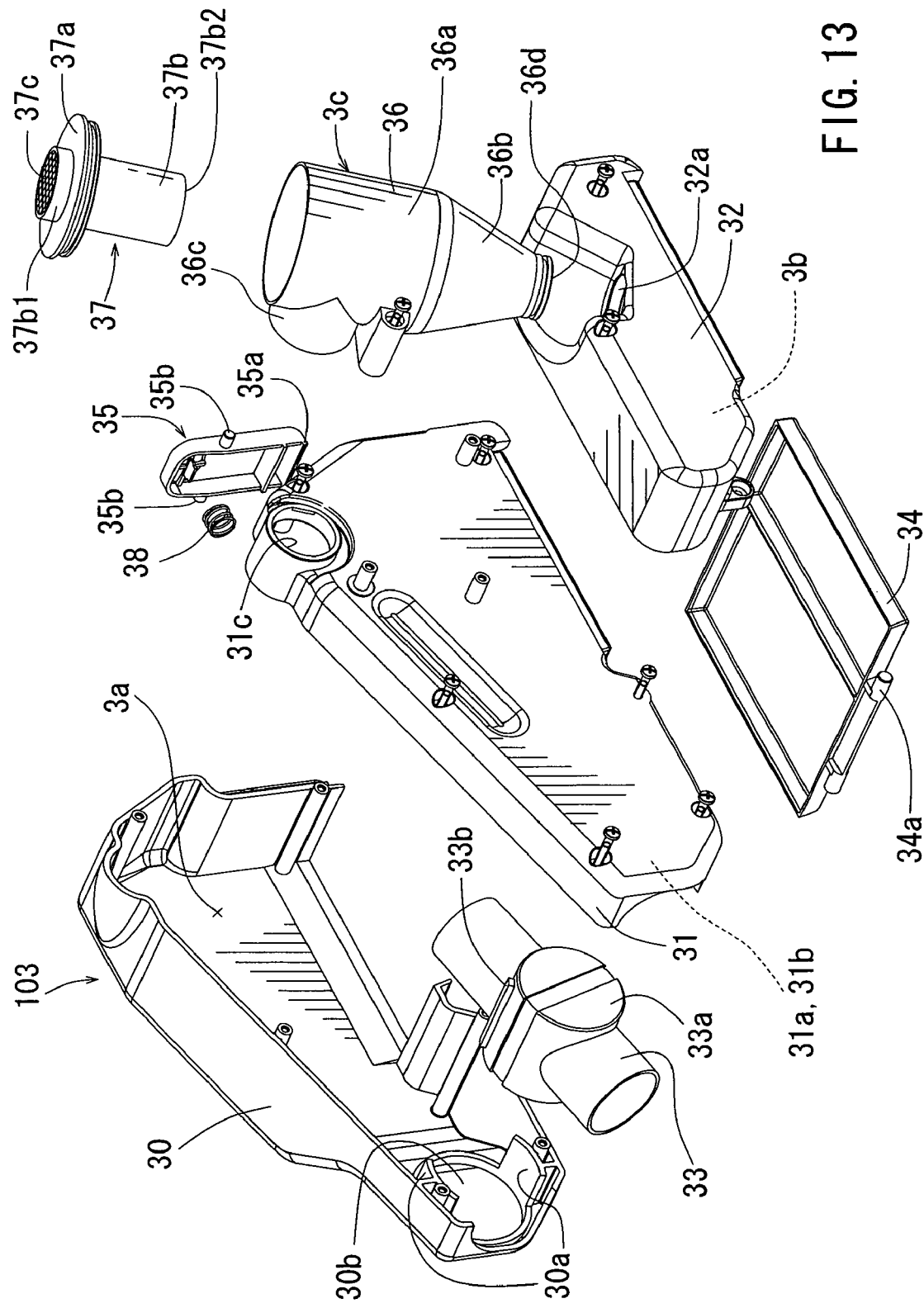
FIG. 13 is an exploded perspective view of the dust-collecting device.

The dust-collecting device 103 will now be described. The dust-collecting device 103 is connected to the discharge pipe 20b of the cover 20 and includes a first dust collection chamber 3a, a cyclone unit 3c, and a second dust collection chamber 3b, as shown in FIG. 13. As shown in FIG. 11, the first dust collection chamber 3a is defined between a first outer wall 30 and an intermediate partition wall 31. The second dust collection chamber 3b is defined between the intermediate partition wall 31 and a second outer wall 32.

As shown in FIG. 13, an inlet member 33 is mounted and supported between the first outer wall 30 and the intermediate partition wall 31. One end of the inlet member 33 opens into the first dust collection chamber 3a. The other end of the inlet member 33 is joined to the discharge pipe 20c of the cover 20 (see FIG. 6). Therefore, the inner space within the hollow portion 20b of the cover 20 communicates with the first dust collection chamber 3a via the inlet member 33. As shown in FIG. 13, an outlet hole 31c is formed in the intermediate partition wall 31. One end of the outlet hole 31c is open into the first dust collection chamber 3a. The other end of the outlet hole 31c is connected to the cyclone unit 3c. Therefore, the first dust collection chamber 3a communicates with the inner space of the cyclone unit 3c via the outlet hole 31c. Preferably, the outlet hole 31c is positioned at a higher level than the inlet member 33.

Figure 9:
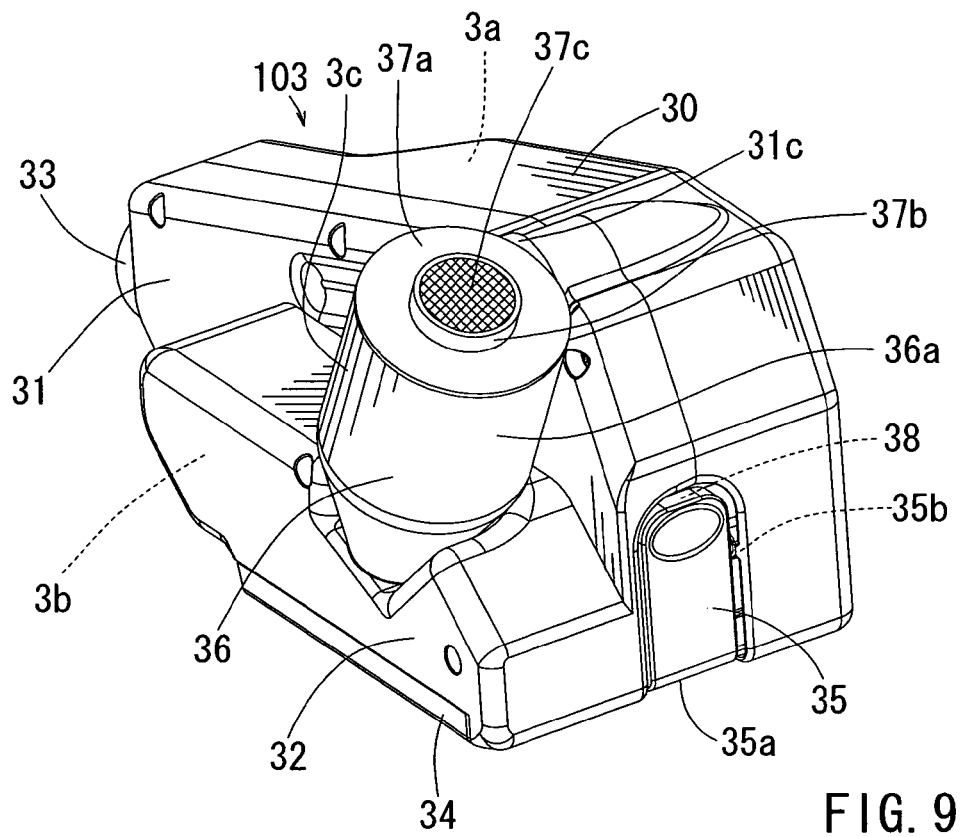
FIG. 9 is a perspective view of a dust-collecting device of the slide table saw according to the fourth representative embodiment.

As shown in FIG. 9, the cyclone unit 3c is disposed to intervene between the first dust-collecting chamber 3a and the second dust-collecting chamber 3b. The cyclone unit 3c is similar in its function to the separator 4 of the first representative embodiment and includes a cyclone body 36 and an air discharge member 37. The cyclone body 36 includes a substantially cylindrical upper tubular portion 36a and a lower tubular portion 36b (see FIG. 10) integrally formed with the upper tubular portion 36a. The lower tubular portion 36b has a diameter gradually decreasing in a downward direction.

An inlet pipe 36c (see FIG. 13) is formed with the outer peripheral wall of the upper tubular portion 36a and is joined to the outlet hole 31c of the intermediate partition wall 31. The first dust collection chamber 3a communicates with the inner space of the upper tubular portion 36a of cyclone body 36 via the outlet hole 31c and the inlet pipe 36c.

The inlet pipe 36c is positioned offset from the central axis of the upper tubular portion 36a and extends substantially tangentially from the outer circumference of the upper tubular portion 36a. Accordingly, the cutting chips and the carrier air entering the inner space of the upper tubular portion 36a via the inlet pipe 36c circulate in a circumferential direction along an inner wall of the upper tubular apportion 36a (see FIG. 8). The circulating cutting chips may gradually drop downward and may be discharged into the second dust-collecting chamber 3b via a cutting-chip discharge pipe 36d formed on the lower end of the lower tubular portion 36b (see FIG. 13).

As shown in FIG. 13, the air discharge member 37 has an annular portion 37a and an air discharge pipe portion 37b extending through the central opening of the annular portion 37a. As shown in FIG. 9, the annular portion 37a is mounted so as to cover the upper opening of the upper tubular portion 36a of the cyclone body 36. The air discharge pipe portion 37b extends into the cyclone body 36 along the central axis of the cyclone body 36. The air discharge pipe portion 37b has an air discharge opening 37b1 and an air inlet opening 37b2 respectively at the upper and lower ends of the air discharge pipe portion 37b. Therefore, the carrier air fed into the cyclone body and separated from the cutting chips may flow into the inlet opening 37b2 of the air discharge pipe portion 37b and may then be discharged from the discharge opening 37b1. Preferably, a wire net 37c is disposed to extend across the inner space of the discharge pipe portion 37b in a position proximal to the air discharge opening 37b1, in order to prevent unauthorized access into the cyclone body 36 or to prevent foreign materials from entering the cyclone body 36. Preferably, the mesh of the wire net 37c is set to be large enough so as to not resist against the flow of air.

As shown in FIG. 13, an inlet hole 32a is formed in the second outer wall 32 that together with the intermediate partition wall 31, defines the second dust-collecting chamber 3b. One end of the inlet hole 32a opens into the second dust-collecting chamber 3b. The other end of the inlet hole 32a is connected to the cutting-chip discharge pipe 36d of the cyclone body 36. Therefore, the cutting chips that have been separated from the carrier air within the cyclone unit 3c may be discharged into the second dust-collecting chamber 3b via the inlet hole 32a.

Figure 7:
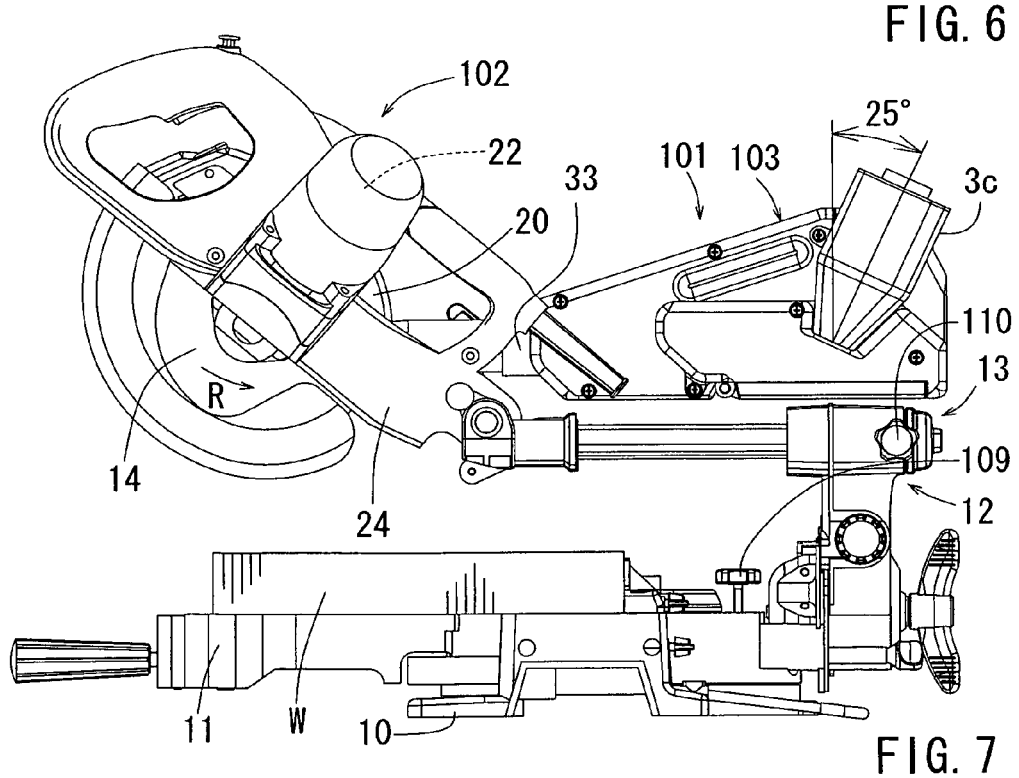
FIG. 7 is a side view similar to FIG. 6 but showing the saw unit with the cover pivoted to the uppermost position.

As shown in FIG. 7, the cyclone unit 3c is connected to the inlet hole 32a while the cyclone unit 3c is positioned relative to the second outer wall 32 such that the cyclone unit 3c is inclined relative to a vertical direction by an angle of about 25° (e.g., 25°±10°). With this determination, it is possible to ensure a large space portion within the second dust collection chamber 3b below the inlet hole 32a.

Figure 10:
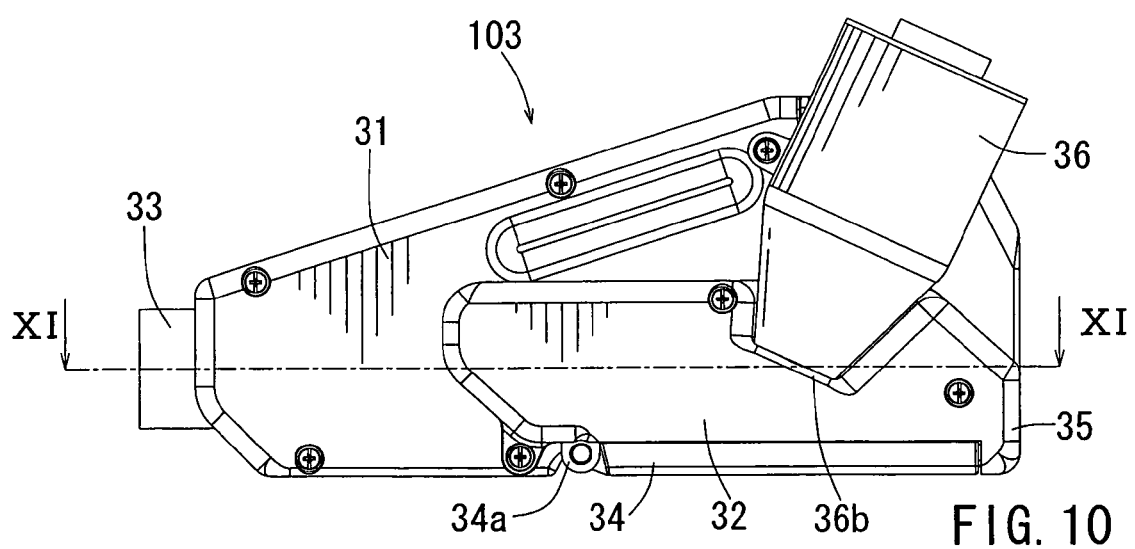
FIG. 10 is a side view of the dust-collecting device.
Figure 16:
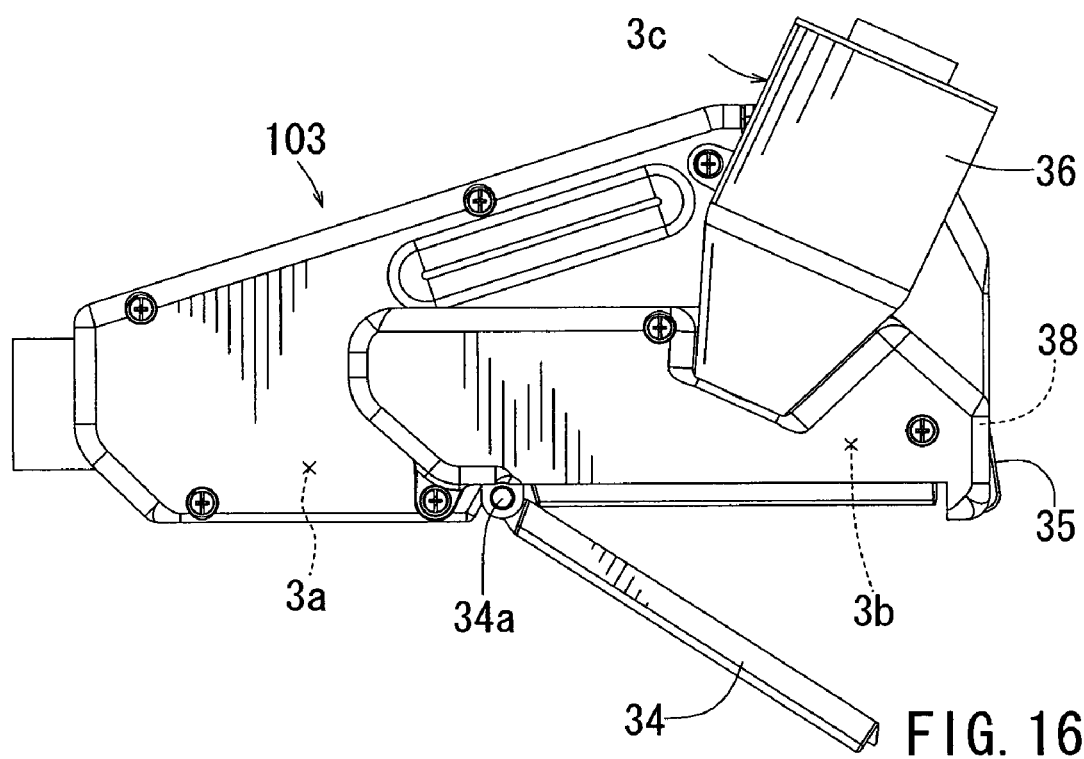
FIG. 16 is a side view of the dust-collecting device and showing the state where a bottom cover has been opened.

As shown in FIGS. 10 and 16, the dust container 3 includes a cover 34, which is configured as a tray for disposing of the collected cutting chips and an engaging member 35 for engaging the cover 34. As shown in FIG. 11, the cover 34 is positioned to extend between and below the first and second dust collection chambers 3a and 3b, so as to define the bottoms of these chambers. As shown in FIG. 13, a rod 34a is attached to one end (the left end as viewed in FIG. 13) of the cover 34 and has opposite ends that are respectively rotatably joined to the first and second outer walls 30 and 32.

As shown in FIG. 13, the engaging member 35 has a pair of rods 35b disposed at an intermediate position with respect to the vertical direction and extending from both sides of the engaging member 35. The rods 35b are respectively rotatably joined to the first and second outer walls 30 and 32, so that the engaging member 35 can pivot about a substantially horizontal axis defined by the rods 35b.

A claw 35a is formed on the lower end of the engaging member 35 and is engageable with the lower surface of one end of the cover 34, opposite to the joint portion of the rod 34a. A resilient member 38 (a coil spring in this representative embodiment) is disposed between the upper end of the engaging member 35 and the first outer wall 30 so that the engaging member 35 is biased in a direction for engagement of the claw 35a with the cover 34.

Figure 14:
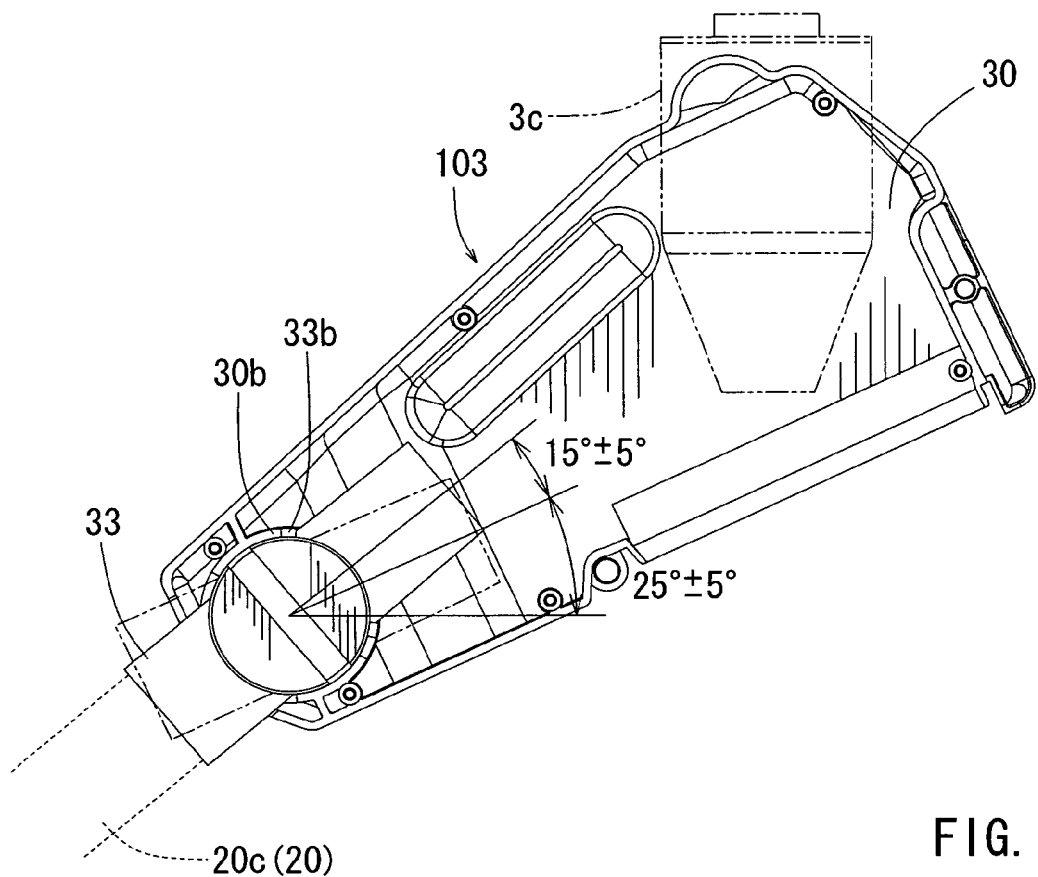
FIG. 14 is a vertical sectional view as viewed from a lateral side of the dust-collecting device and showing the positions of a first outer wall and an inlet member when the saw unit is positioned at the lowermost position.
Figure 15:
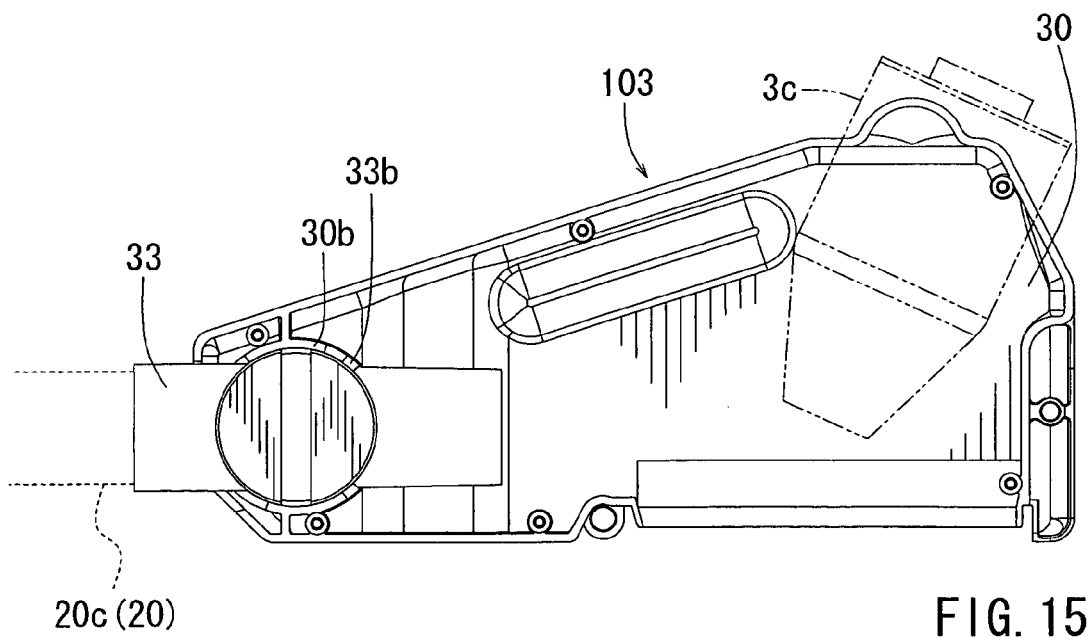
FIG. 15 is a vertical sectional view similar to FIG. 14 but showing the positions of the first outer wall and the inlet member when the saw unit is positioned at the uppermost position.

Referring to FIGS. 14 and 15, the dust collecting device 103 further includes a pivotal angle-adjusting device for adjusting the pivoted angle relative to the cover 20. As shown in FIG. 13, the pivotal angle-adjusting device includes a rotary shaft portion 33a formed on the inlet member 33. The rotary shaft portion 33a has a substantially cylindrical configuration and has an axis that is substantially perpendicular to the longitudinal axis of the inlet member 33. The rotary shaft portion 33a has opposite end portions that respectively intervene between the inlet member 33 and the first outer wall 30, and between the inlet member 33 and the intermediate partition wall 31. A rotation restricting portion 33b is formed on the rotary shaft portion 33a and projects radially from the outer peripheral wall of the rotary shaft portion 33a.

The first outer wall 30 and the intermediate partition wall 31 respectively have rotary support recesses 30b and 31b for rotatably supporting opposite ends of the rotary shaft portion 33a, so that the dust collecting device 103 can vertically pivot relative to the cover 20 about the axis of the rotary shaft portion 33a. In addition, the first outer wall 30 and the intermediate partition wall 31 respectively have wall portions 30a and 31a, which rotatably support the rotary shaft portion 33a and extend from the circumferences of the support recesses 30b and 31b for engaging with the rotation restricting portion 33b in order to restrict the angle of rotation of the rotary shaft portion 33a.

Figure 17:
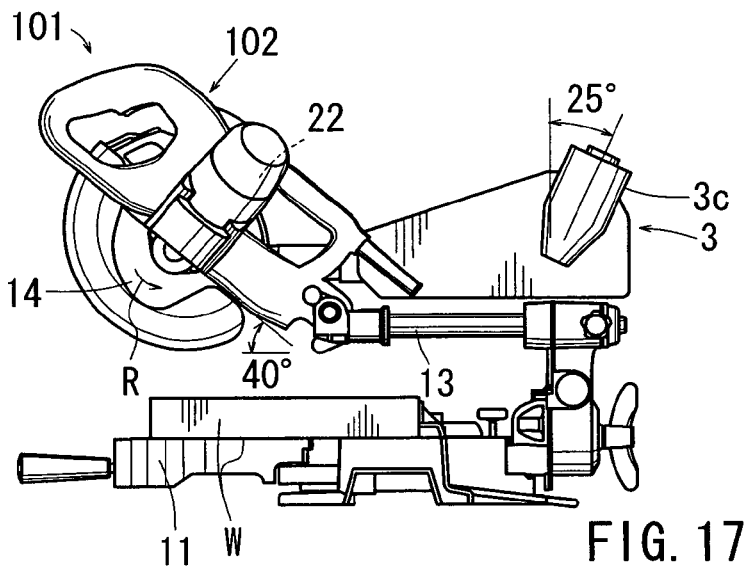
FIGS. 17 to 19 are schematic views of the slide table saw according to the fourth representative embodiment and showing different vertically pivoted positions of the saw unit.

The operation of the above fourth representative embodiment will now be described in connection with the cutting operation of a workpiece. First, as shown in FIG. 17, the saw unit 102 is pivoted vertically upward to a suitable pivoted position (a position pivoted from the horizontal position by an angle of about 40° in this representative embodiment). Here, the horizontal position of the saw unit 102 is used to mean a lowermost position of the saw unit 102, where the discharge pipe 22c of the cover 20 extends in a substantially horizontal direction. A workpiece W is then placed on the table 11 and is held from the top by a holder device (not shown). At this stage, the right end (as viewed in FIG. 17) of the dust collecting device 103 contacts with the second slide 13 due to the force of gravity. Accordingly, the dust collecting device 103 is in a substantially horizontal position as shown in FIG. 15, where the cover 34 as well as the discharge pipe 22c extend in a substantially horizontal direction.

The operator may then start the motor 22, rotating the saw blade 14 in a direction indicated by an arrow R in FIG. 17. Thereafter, the operator pivots the saw unit 2 downward through an angle of about 15° (e.g., 15°±5°) from the position shown in FIG. 17, so that the saw unit 102 may be positioned in a position shown in FIG. 18, where the saw unit 2 is pivoted by an angle of about 25° from the horizontal position. Along with this pivotal movement of the saw unit 102, the inlet member 33 pivots in a counterclockwise direction from the position shown in FIG. 17 by the same angle of about 15°. At that pivoted position, the rotation restricting portion 33b of the rotary shaft portion 33a engages with the circumferential ends of the wall portions 30a and 31a.

Figure 18:
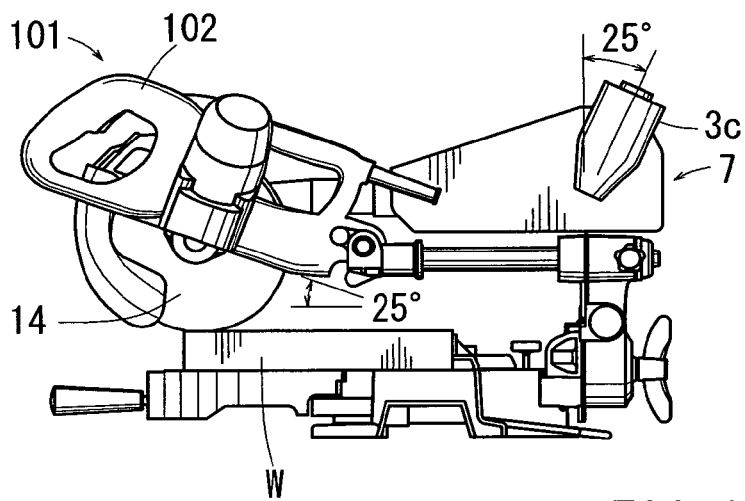
Figure 19:
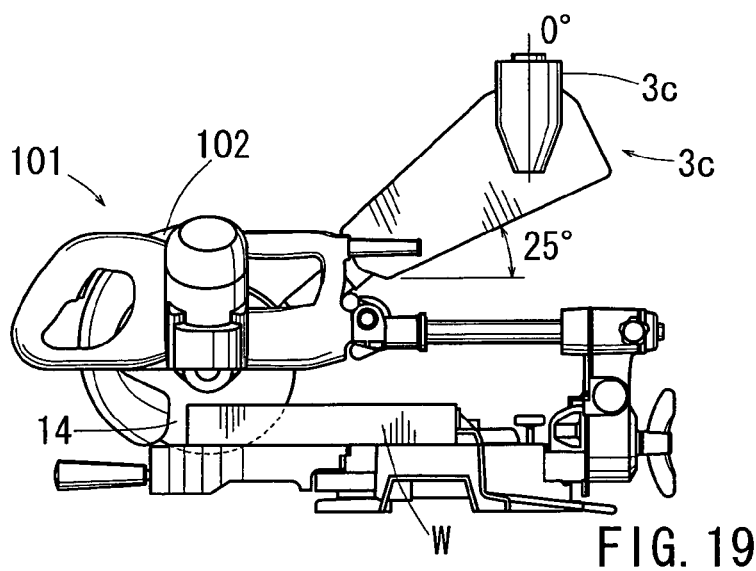

As the saw unit 102 further pivots downward by an angle of about 25° (e.g., 25°±5°) from the position shown in FIG. 18, the saw unit 102 may be positioned at a substantially horizontal position as shown in FIG. 19. Along with this pivotal movement of the saw unit 102, the inlet member 33 further pivots together with the saw unit 102 in the counterclockwise direction. In addition, the dust-collecting device 103 may pivot together with the inlet member 33 by the same angle of about 25° through the engagement between the rotation restricting portion 33b and the circumferential ends of the wall portions 30a and 31a. As a result, as shown in FIG. 19, the cyclone unit 3c may be positioned in a substantially vertical position where the central axis of the cyclone unit 3c extends at an angle of substantially 90° (e.g., 90°±5°) relative to the horizontal direction. In the state shown in FIG. 19, the inlet member 33 is inclined by an angle of about 40° relative to the horizontal direction (see FIG. 14).

As the saw unit 102 pivots from the state shown in FIG. 18 to the state shown in FIG. 19, the workpiece W may be cut by the saw blade 14. Cutting chips generated during the cutting operation may be blown up together with air by the rotating saw blade 14 in a direction upward from the right side of the saw blade 14 as viewed in FIG. 6. The cutting chips may then be fed to the dust collecting device 103 via the hollow portion 20b and the discharge pipe 20c of the cover 20.

More specifically, the cutting chips are fed into the first dust-collecting chamber 3a via the inlet member 33 (see FIGS. 5 and 11). Some cutting chips having a relatively large mass may fall within the first collecting chamber 3a due to the force of gravity and may be collected there within. Other light and small cutting chips that do not fall within the first collecting chamber 3a by the force of gravity may move into the inlet pipe 36c of the cyclone body 36 together with the carrier air.

Figure 12:
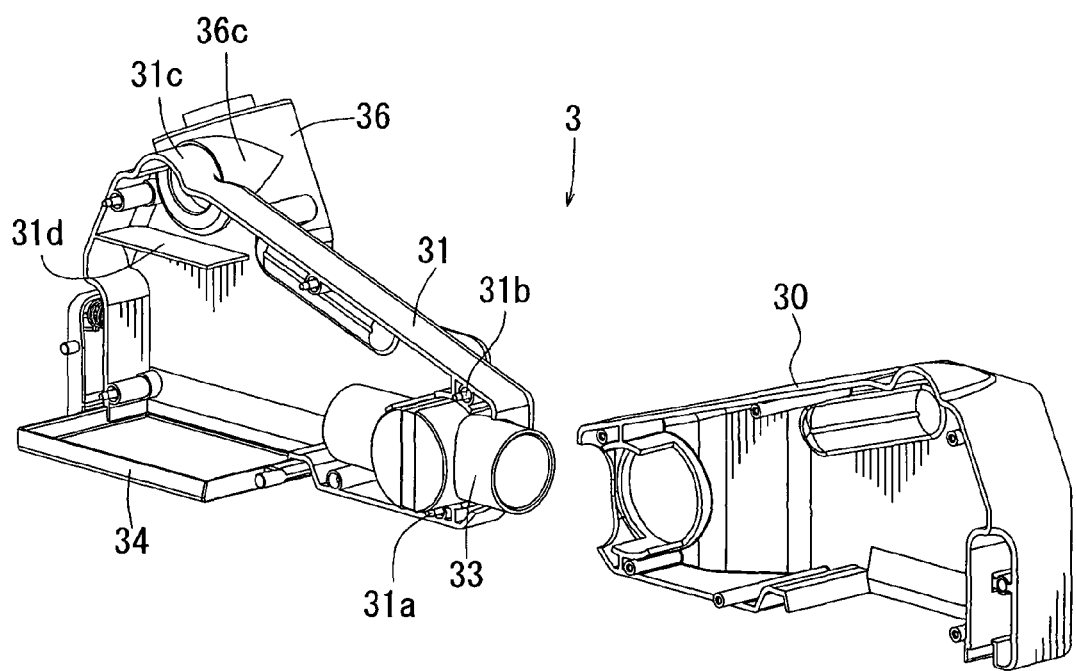
FIG. 12 is a partly exploded perspective view of the dust-collecting device.

As shown in FIG. 12, a baffle plate 31d is mounted within the first dust collection chamber 3a in order to interfere with the large mass cutting chips, inhibiting them from entering the cyclone body 36. More specifically, the baffle plate 31d is formed on the intermediate partition wall 31 and extends below the inlet pipe 36c.

Figure 8:
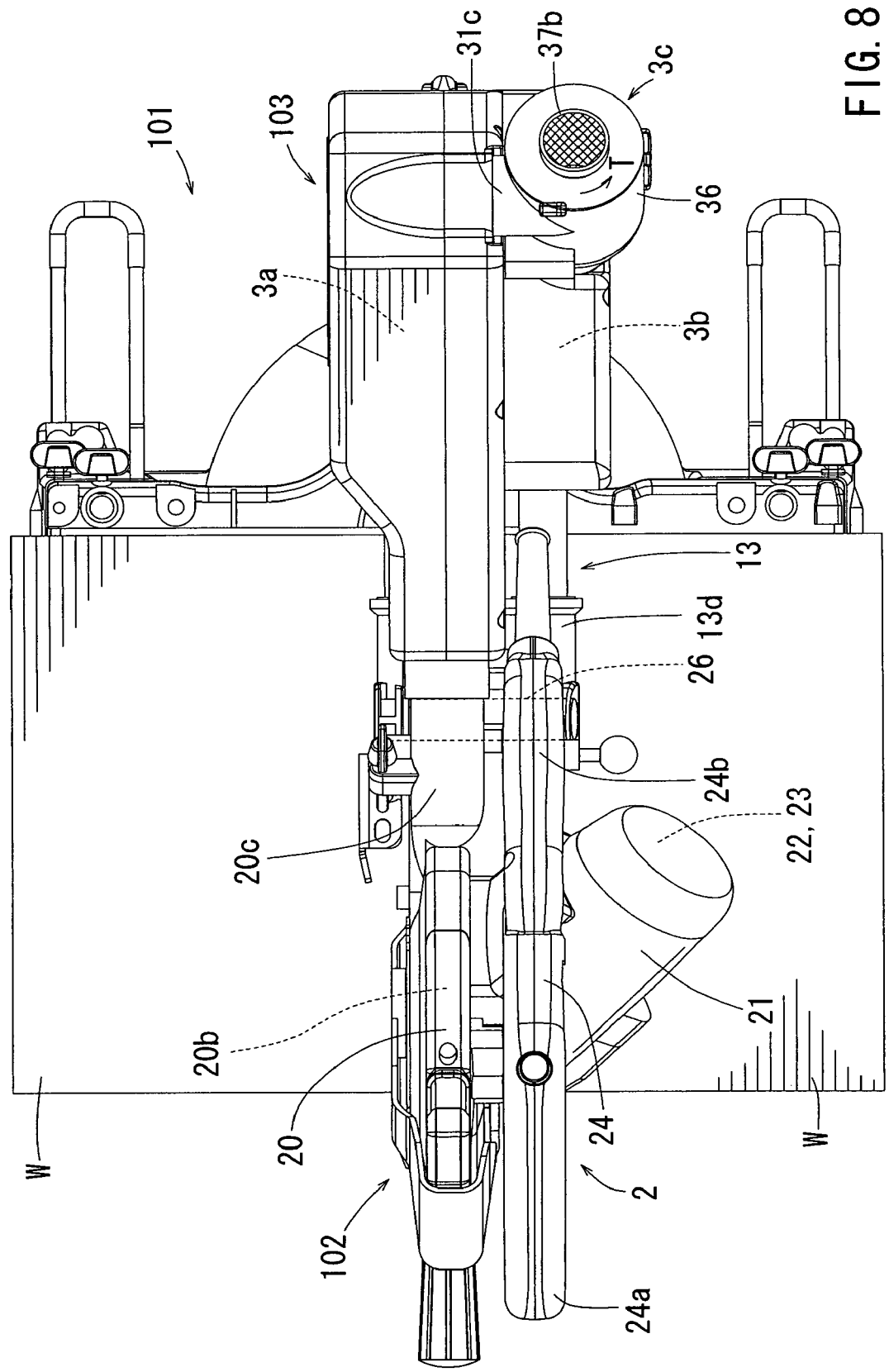
FIG. 8 is a plan view of the slide table saw according to the fourth representative embodiment.

As shown in FIG. 8, the cutting chips entering the cyclone body 36 via the inlet pipe 36c circulate in a circumferential direction as indicated by an arrow T along the inner wall of the cyclone body 36, while the cutting chips gradually drop downward due at least in part to the force of gravity. Accordingly, the cutting chips that have not fallen within the first dust collection chamber 3a may be separated by centrifugal force and the force of gravity and may then be fed into the second dust-collecting chamber 3b. As noted above, during the cutting operation, the cyclone body 36 may be positioned at a substantially vertical position. Therefore, the cutting chips can be effectively separated by the cyclone unit 3c.

When the saw unit 102 is in the lowermost position shown in FIG. 5, the dust collecting device 103 may be positioned to extend rightward and upward as shown in FIG. 14. Therefore, the cutting chips may tend to be collected at the left and lower portion of the first dust-collecting chamber 3a, away from the outlet hole 31c, and at the left and lower portion of the second dust-collecting chamber 3b, away from the inlet hole 32a. Therefore, the amount of cutting chips collectable within the first dust-collecting chamber 3a and the second dust-collecting chamber 3b can be increased.

As described above, the heavy or large cutting chips may be collected within the first dust-collecting chamber 3a, while the light and small cutting chips may be collected within the second dust-collecting chamber 3b. It is possible to use the second dust-collecting chamber 3b as a sub-chamber when the first dust-collecting chamber 3a has been filled up with cutting chips.

In order to cut a large size workpiece W, as shown in FIG. 5, the operator may push the saw unit 102 rightward as viewed in FIG. 5. Consequently, the saw unit may slide rightward with the aid of the first slide 12 and the second slide 13.

After the cutting operation, the operator may pivot the saw unit 102 upward (see FIG. 18), so that the dust-collecting device 3 may pivot together with the saw unit 102 while the right side portion of the saw unit 102 gradually moves downward. Then, the dust-collecting device 103 contacts the second slide 13. As the saw unit 102 further pivots upward (see FIG. 17), the inlet member 33 pivots relative to the dust-collecting device 103, e.g., by an angle of 15°±5°, so that the rotation restricting portion 33b moves away from the circumferential ends of the wall portions 30a and 31a, while the dust-collecting device 103 maintains a substantially horizontal position. In this way, it is possible to pivot the saw unit 102 further upward by a large angle, such as a maximum pivoted angle of 40°±5°, from the horizontal position.

In order to dispose of the cutting chips collected within the first dust-collecting chamber 3a and the second dust-collecting chamber 3b as shown in FIGS. 9 and 16, the operator may first remove the dust-collecting device 103 from the saw unit 102. The operator may then push the upper portion of the engaging member 35 to pivot the engaging member 35 against the biasing force of the resilient member 38, so that the claw portion 35a of the engaging member 35 is disengaged from the cover 34. Thereafter, the operator may pivot the cover 34 about the rod 34a, so that the bottoms of the first and second dust-collecting chambers 3a and 3b may be simultaneously opened to dispose of the collected cutting chips at one time.

As described above, according to the fourth representative embodiment, the dust-collecting device 103 has the first collecting chamber 3a, the cyclone unit 3c, and the second dust-collecting chamber 3b, shown in FIG. 5. The cutting chips carried by the air and blown up from the side of the saw blade 14 may fall within the first dust-collecting chamber 3a by the force of gravity and may be collected there within. The cutting chips that have not fallen within the first dust-collecting chamber 3a may be fed into the cyclone unit 3c, where the cutting chips circulate with the carrier air along the inner circumferential wall of the cyclone unit 3c and fall there within. Thus, the cutting chips are separated from the carrier air by a centrifugal force and the force of gravity. The cutting chips are then discharged from the bottom of the cyclone unit 3c into the second dust-collecting chamber 3b via the cutting chip discharge pipe 36d, while the carrier air may be discharged out of the cyclone body 36 from the top of the cyclone unit 3c via the air discharge pipe 37b1. In this way, relatively large and heavy cutting chips are separated from the carrier air by the first dust-collecting chamber 3a, while relatively small and light cutting chips are separated from the carrier air by the cyclone unit 3c.

No fabric filter is disposed within the dust-collecting device 103 for separating the cutting chips from the carrier air. Therefore, the fabric filter may not inhibit the flow of the carrier air produced by the rotating saw blade 14. In addition, the dust-collecting device 103 may not cause a gradual reduction of the dust-collecting performance due to the clogging of cutting chips in the mesh of the fabric filter. Accordingly, it is possible to effectively collect the cutting chips within the dust-collecting device 103.

In addition, according to this representative embodiment, the angle-adjusting device (30a, 31a, 33b) is provided between the cover 20 and the dust-collecting device 103 as shown in FIGS. 14 and 15 in order to adjust the angular position of the dust container 103 relative to the cover 20. As a result, it is possible to adjust the angular position of the dust-collecting device 103 to a suitable position, for example, in order to effectively collect the cutting chips by the cyclone unit 3c.

In particular, according to this representative embodiment, the angle adjusting device adjusts the relative angle between the cover 20 and the dust collecting device 103 such that the relative angle produced when the cover 20, i.e., the saw unit 102, is positioned at an uppermost position is smaller than the relative angle produced when the cover 20, i.e., the saw unit 102, is positioned at the lowermost position. Thus, the relative angle between the cover 20 and the dust-collecting device 103 may be 140°±5° when the cover 20 or the saw unit 102 is at the uppermost position, as shown in FIG. 17. While the relative angle may be 155°±5°, so that the cyclone unit 3c may extends substantially vertically, when the cover 20 or the saw unit 102 is at the lowermost position as shown in FIG. 19.

With this adjustment, during the movement of the cover 20 or the saw unit 102 from a predetermined position below an uppermost position, to the uppermost position, the cover 20 may approach the dust-collecting device 103. However, the dust-collecting device 103 may not interfere with the movement of the cover 20.

During the movement of the cover 20 or the saw unit 102 from a predetermined position upward of the lowermost position, to the lowermost position, the relative angle between the dust-collecting device 103 and the cover 20 is relatively large. Accordingly, when the cover 20 or the saw unit 102 is in the lowermost position, the angle of the dust-collecting device 103 relative to the horizontal direction (i.e., 25°±5°) is smaller than the angle of the cover 20 relative to the horizontal direction (i.e., 40°±5°). Therefore, the inclination of the cyclone unit 3c relative to the vertical direction can be minimized. As a result, it is possible to prevent the degradation of the separation efficiency of the cyclone unit 3c due to inclination.

Furthermore, according to the representative embodiment, the cover 34 extends between and below the first and second dust-collecting chambers 3a and 3b as shown in FIGS. 13 and 16. Consequently, it is possible to dispose of the cutting chips collected within the first and second dust-collecting chambers 3a and 3b at one time by opening the cover 34.

Still further, the dust-collecting device 103 can be readily applied to an existing table saw having a dust-collecting device by simply removing the dust-collecting device from a discharge pipe and connecting the inlet member 33 of the dust-collecting device 103 to the discharge pipe. Accordingly, the present invention in improved in the applicable range.

Fifth Representative Embodiment

A fifth representative embodiment will now be described with reference to FIGS. 20 to 24. The fifth representative embodiment is a modification of the fourth representative embodiment and is different from the fourth representative embodiment only in that the dust-collecting device 103 is replaced with a dust-collecting device 104. In addition, the basic construction of the dust-collecting device 104 is the same as the dust-collecting device 103 but is different than the dust-collecting device 103 mainly in the arrangement of some of the elements, such as a cover. Therefore, the fifth representative embodiment will be described primarily in connection with the different arrangement of the dust-collecting device 104 from the dust-collecting device 103.

Figure 20:
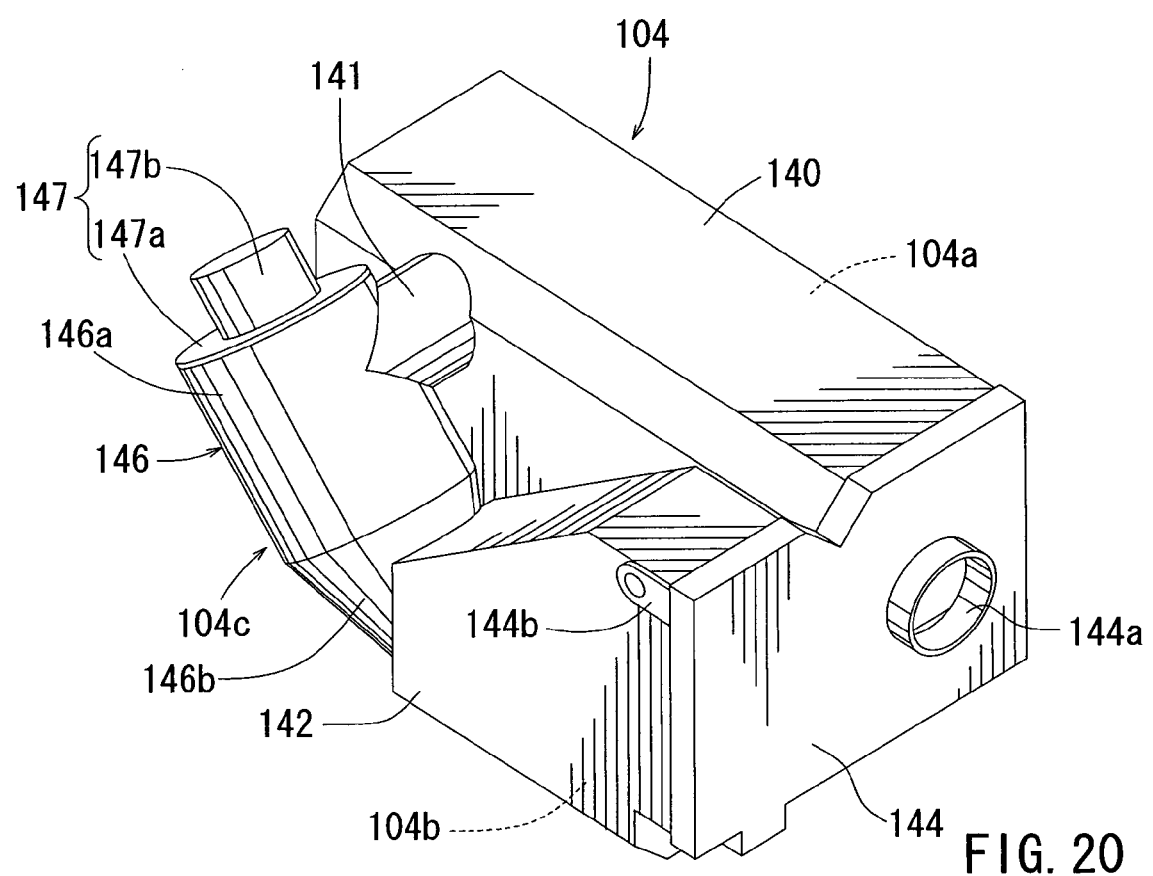
FIG. 20 is a perspective view of a dust collating device of a slide table saw according to a fifth representative embodiment.
Figure 21:
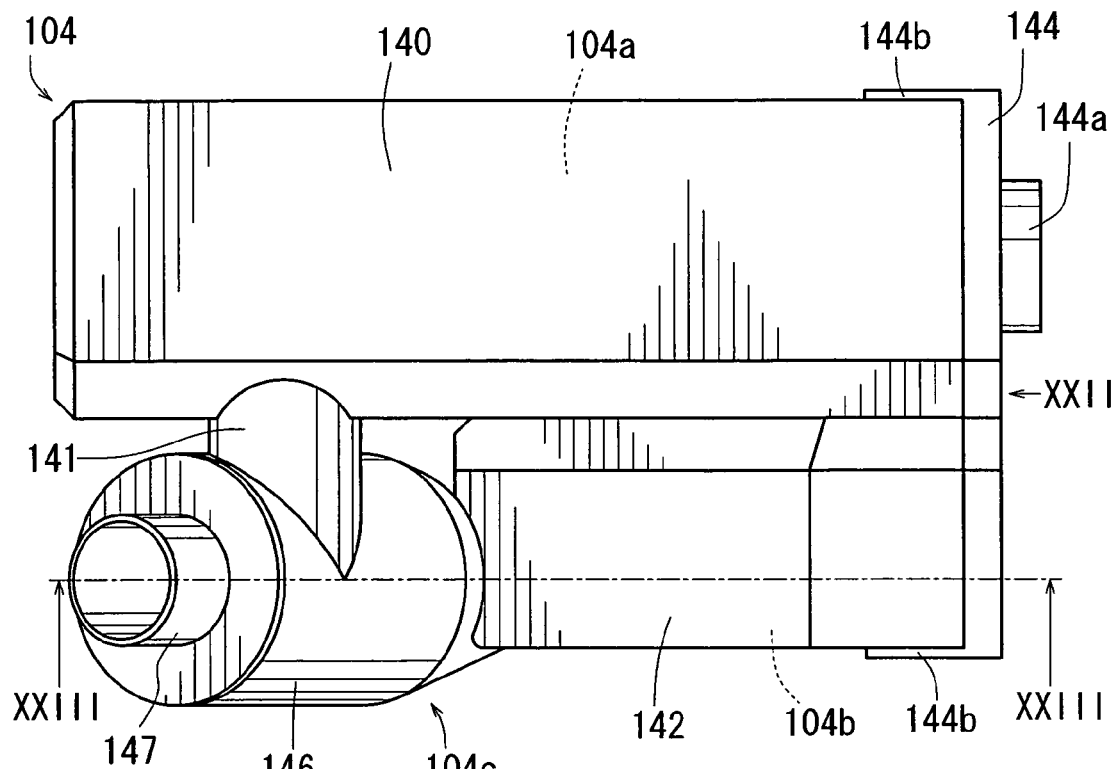
FIG. 21 is a plan view of the dust-collecting device shown in FIG. 20.
Figure 22:
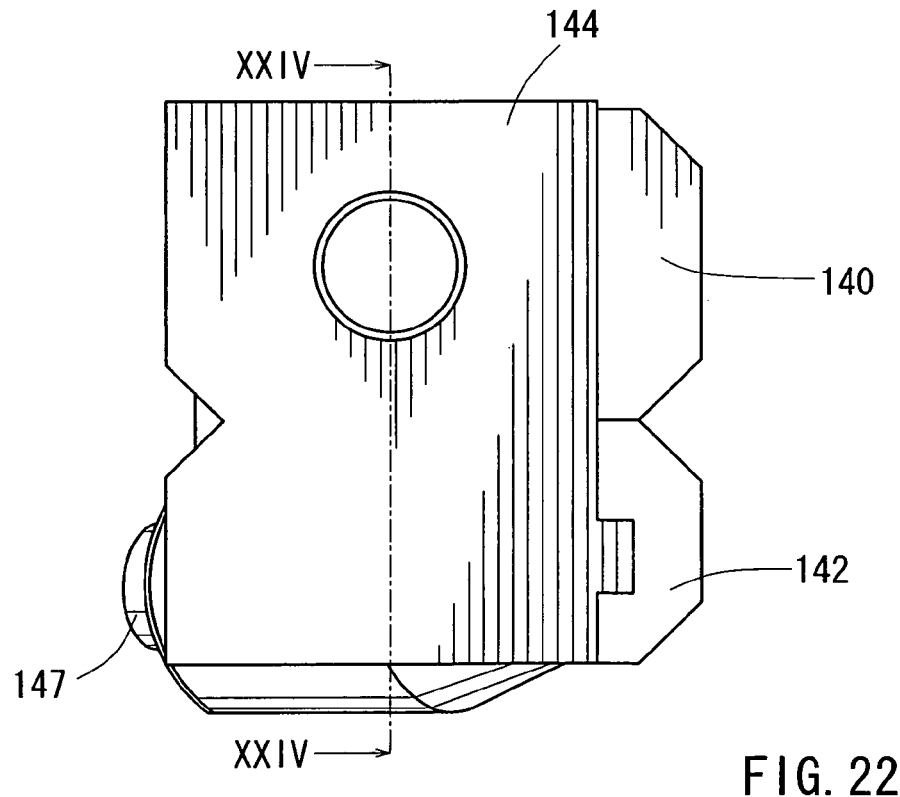
FIG. 22 is a view of the dust-collecting device as viewed in a direction indicated by arrow XXII in FIG. 21.

Referring to FIG. 20, the dust-collecting device 104 has a first dust-collecting chamber 104a, a cyclone unit 104c, and a second dust-collecting chamber 104b, respectively corresponding to the first dust-collecting chamber 3a, the cyclone unit 3c, and the second dust-collecting chamber 3b, of the fourth representative embodiment. The first dust-collecting chamber 104a and the second dust-collecting chamber 104b are respectively defined by a first tubular member 140 and a second tubular member 142 shown in FIGS. 21 and 24, which may be molded, for example, by a blow molding process. Each of the first and second tubular members 140 and 142 has a closed first end and an opened second end (left and right ends as viewed in FIGS. 21 and 24), opposite to the first end. The open second ends of the first and second tubular members 140 and 142 are closed by a removable cover 144, formed to have a plate-shaped configuration by an injection molding process, for example.

Figure 23:
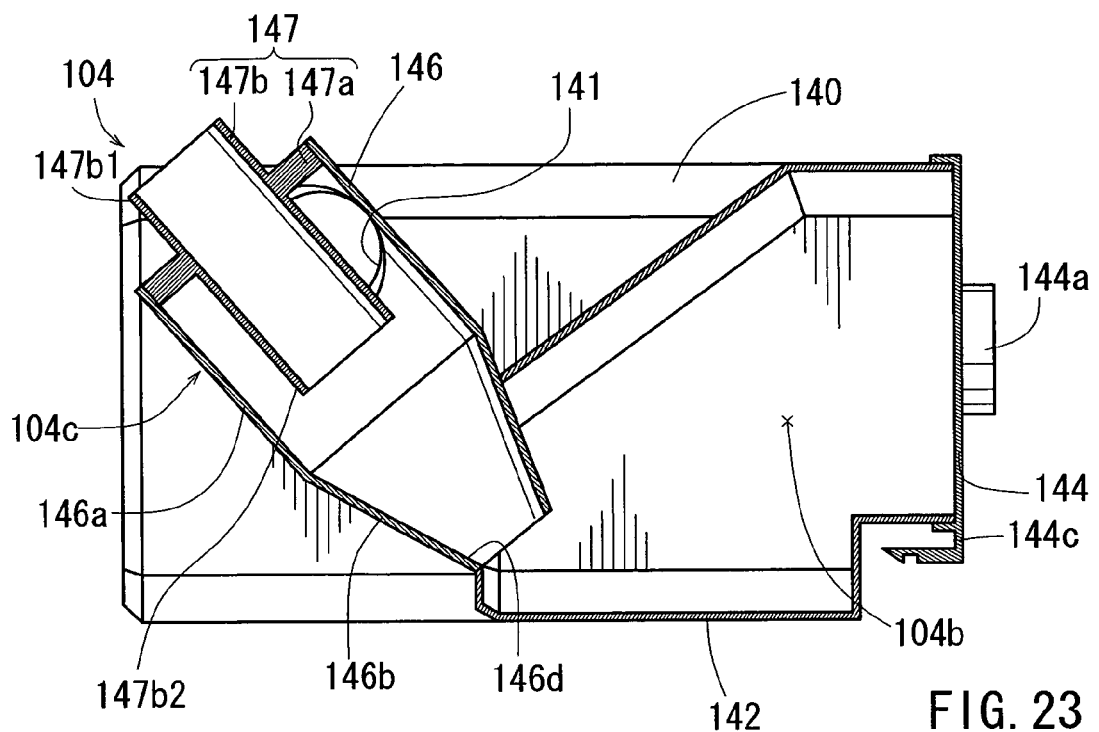
FIG. 23 is a cross-sectional view taken along line XXIII-XXIII in FIG. 21.
Figure 24:
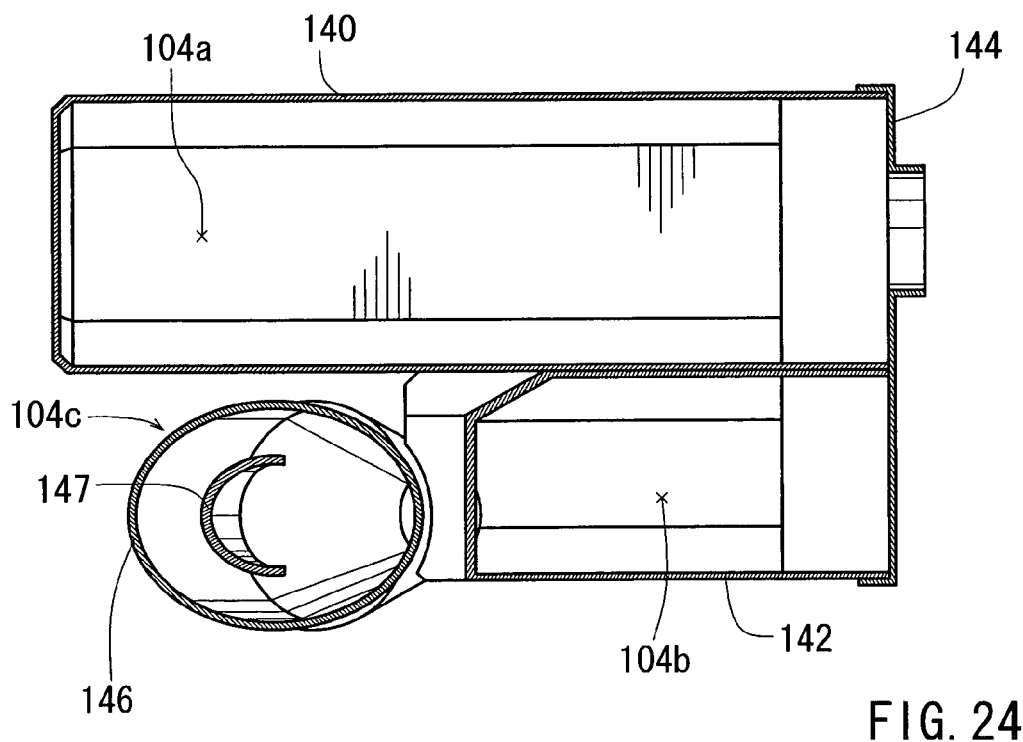
FIG. 24 is a cross-sectional view taken along line XXIV-XXIV in FIG. 22.

As shown in FIG. 20, a pair of arms 144b are formed on both lateral sides at the upper end of the cover 144, and are respectively pivotally joined to the first and second tubular members 140 and 142. As shown in FIG. 23, an engaging portion 144c is formed on the lower end of the cover 144 and is engageable with the lower surface of the right end of the second tubular member 142. Further, a mount opening 144a is formed on the cover 144 and opens into the first dust-collecting chamber 104a for connection with the cover 20 (see FIG. 8).

As shown in FIG. 20, the cyclone unit 104c has a cyclone body 146 and an air discharge member 147. The cyclone body 146 has a substantially cylindrical upper tubular portion 146a and a lower tubular portion 146b. The lower tubular portion 146b is integrally formed with the upper tubular portion 146a and has a diameter gradually decreasing in the downward direction. A connecting pipe 141 connects between the upper tubular portion 146 and the first tubular member 140. More specifically, one end of the connecting pipe 141 is connected to the upper portion of the first tubular member 140. The other end of the connecting pipe 141 is connected to the upper tubular portion 146a in a position offset from the central axis of the upper tubular portion 146a or the cyclone body 146, so that the connecting pipe 141 extends tangentially from the circumference of the upper tubular portion 146a. As shown in FIG. 23, a cutting chip discharge hole 146d is formed at the lower end of the lower tubular portion 146b and opens into the second dust-collecting chamber 104b.

As shown in FIG. 20, the central axis of the cyclone body 146 of the cyclone unit 104 is inclined relative to the longitudinal axis of the second tubular member 142, so that the central axis of the cyclone body 146 extends substantially along the vertical direction (e.g., 90°±5° relative to the horizontal direction), when the saw unit 2 is in the lowermost position (see FIG. 6).

As shown in FIGS. 20 and 23, the air discharge member 147 has an annular portion 147a and an air discharge pipe 147b inserted into the central opening of the air discharge member 147. The annular portion 147a is mounted to the upper tubular portion 146a in order to cover the upper opening of the upper tubular portion 146a. The air discharge pipe 147b is positioned to extend into the cyclone body 146 along the central axis, so that the air discharge pipe 147b has an air discharge opening 147b1 at the upper end and has an air inlet opening 147b2 at the lower end.

Also with the fifth representative embodiment, substantially the same operation and effect can be attained as with the fourth representative embodiment.

Possible Modifications of the Fourth and Fifth Representative Embodiments

The dust-collecting devices of the fourth and fifth representative embodiments may be used in combination with non-sliding type table saws or circular saws without tables.

The angle-adjusting device of the fourth representative embodiment is configured such that the rotation restricting portion and the stoppers are spaced apart from each other in order to permit the dust-collecting device to rotate relative to the cover or the saw unit when the dust-collecting device is in the horizontal position shown in FIGS. 7 and 15. However, the angle-adjusting device may be configured such that the dust-collecting device positively pivots relative to the cover or the saw unit in order to decrease the angle relative to the cover or the saw unit as the saw unit moves from a predetermined position below the uppermost position, to the uppermost position.

Further, although the angle-adjusting device is disposed between the dust-collecting device 103 (104) and the discharge pipe 20c of the cover 20, the angle adjusting device may be disposed between the cover 20 and the discharge pipe 20c or at any other position between the dust-collecting device and the saw unit 2.

Sixth Representative Embodiment

A sixth representative embodiment will now be described with reference to FIGS. 25 to 31. The sixth representative embodiment is a modification of the fourth representative embodiment. Therefore, like members are given the same reference numerals as with the fourth representative embodiment and may not be described in detail.

A slide table saw 201 of this representative embodiment is substantially the same as the slide table saw 101 of the fourth representative embodiment. Therefore, construction of the slide table saw 201 will be described mainly in connection with the differences in the configuration from the slide table saw 101 of the fourth representative embodiment.

Figure 25:
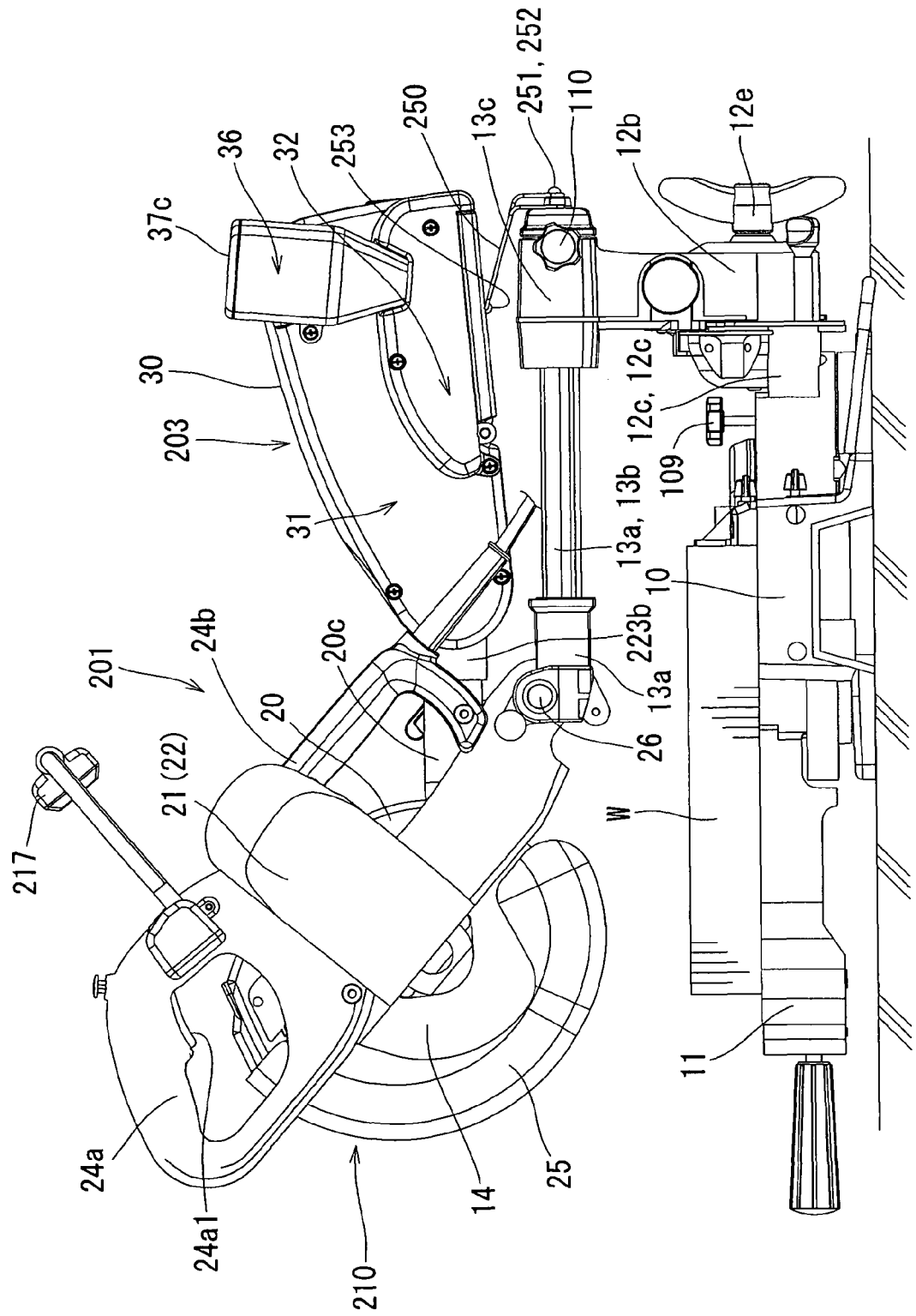
FIG. 25 is a side view of a slide table saw according to a sixth representative embodiment and showing a saw unit positioned at an uppermost position.
Figure 26:
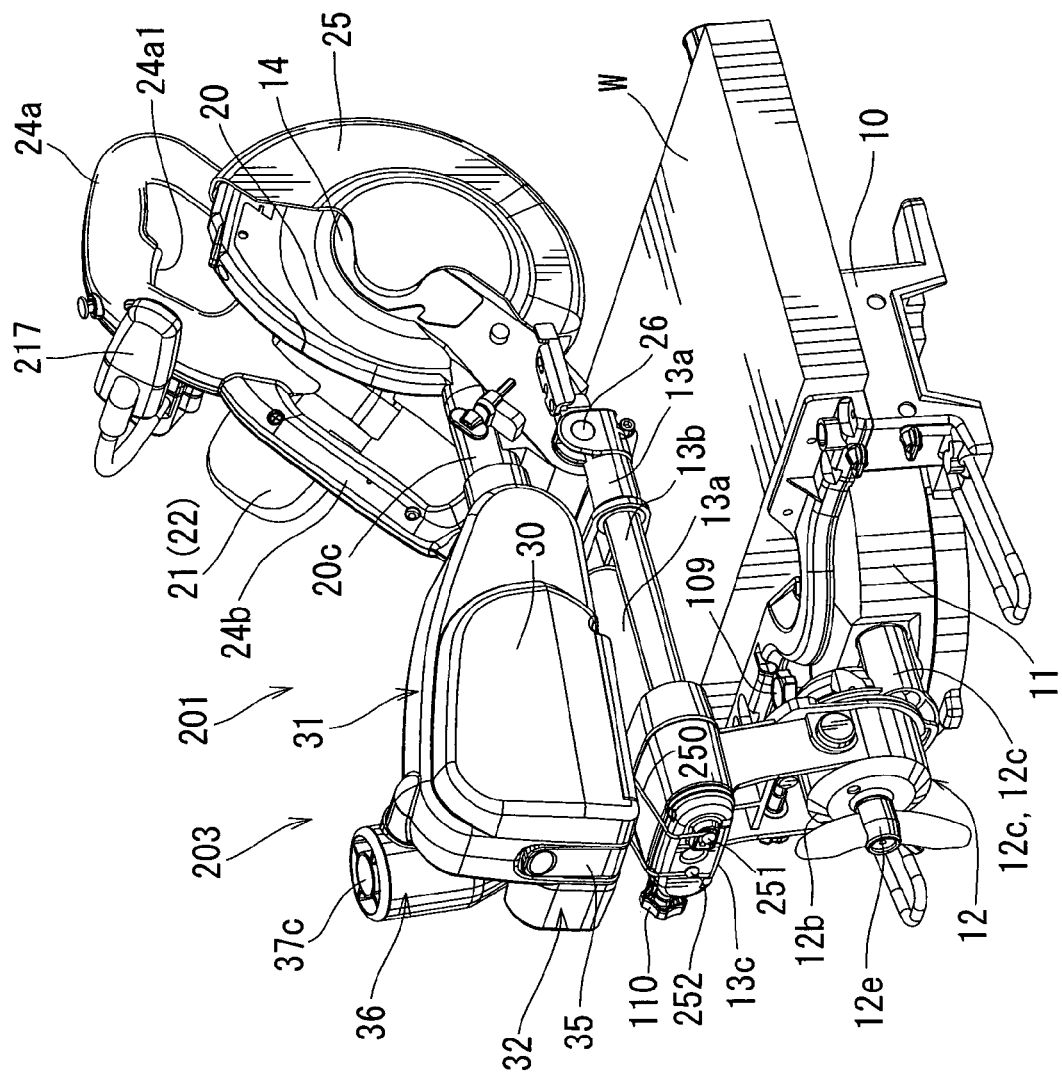
FIG. 26 is a perspective view of the slide table saw shown in FIG. 25 and showing the saw unit positioned at the uppermost position.

As shown in FIG. 25, a lighting device 217, such as a fluorescent lamp and an incandescent lamp for example, is mounted to the handle 24a of a saw unit 210 corresponding to the saw unit 2. The lighting device 217 is positioned on the backside (the right side as viewed in FIG. 25) of the handle 24a.

Figure 29:
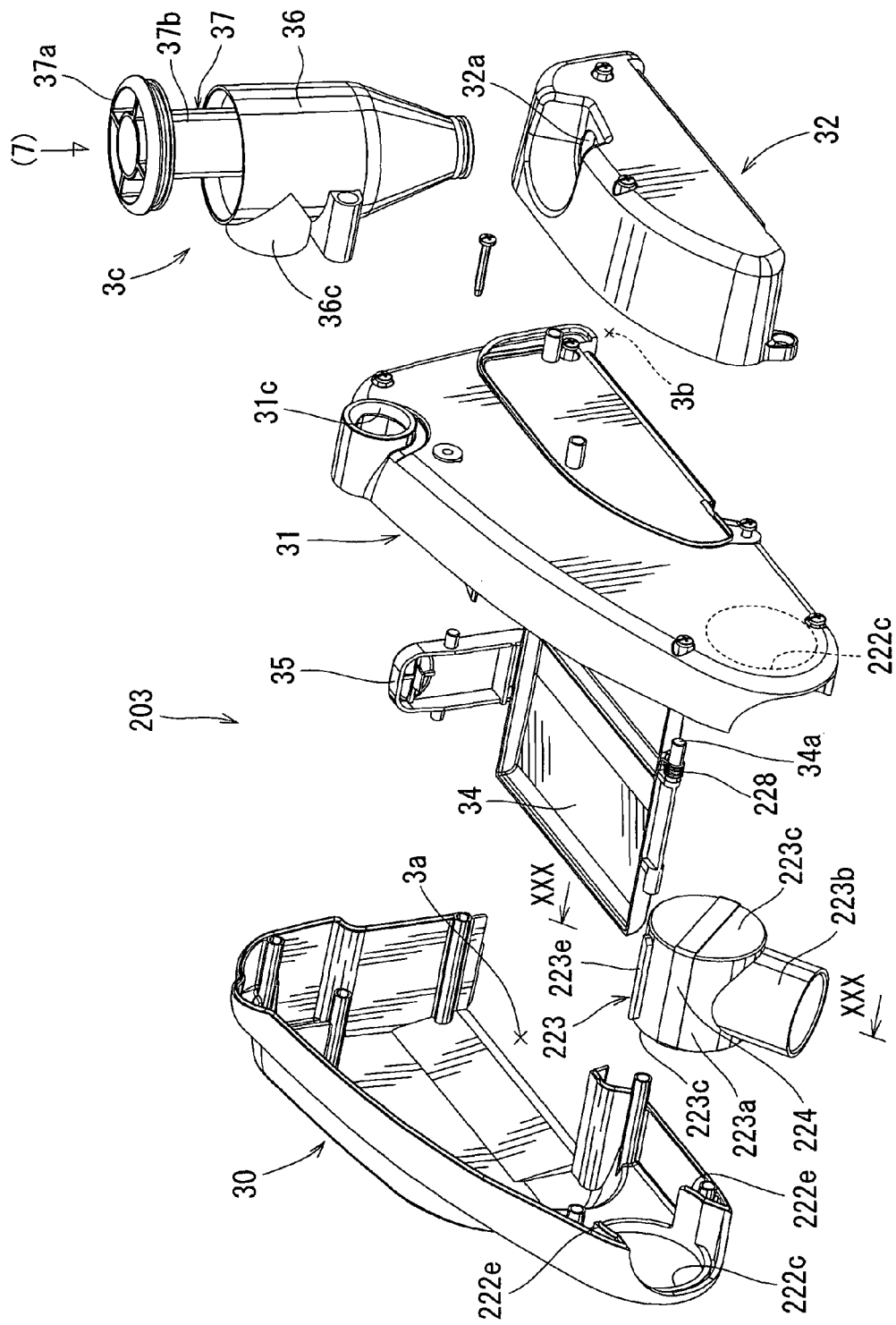
FIG. 29 is an exploded perspective view of a dust-collecting device of the slide table saw according to the sixth representative embodiment.

A dust-collecting device 203 corresponding to the dust-collecting device 103 has an inlet member 223 (see FIG. 29). The inlet member 223 corresponds to the inlet member 33 and has a cylindrical rotary shaft portion 223a (corresponding to the rotary shaft portion 33a) and a connecting pipe portion 223b for connection with the discharge pipe 20c of the cover 20. Opposite sides of the rotary shaft portion 223a are hermetically closed by circular lids 223c. The connecting pipe portion 223b extends from the circumference of the rotary shaft portion 223a in the radial direction and has a diameter sealingly connectable to the discharge pipe 20c. On the side opposite to the rotary shaft portion 223a, an opening 223d (see FIG. 30), having a diameter substantially equal to the inner diameter of the connecting pipe portion 223b, is formed in the circumference of the rotary shaft portion 223 and is always open into the first dust-collecting chamber 3a. Therefore, the inner space of the case 20 always communicates with the first dust-collecting chamber 3a via the inlet member 223.

Figure 30:
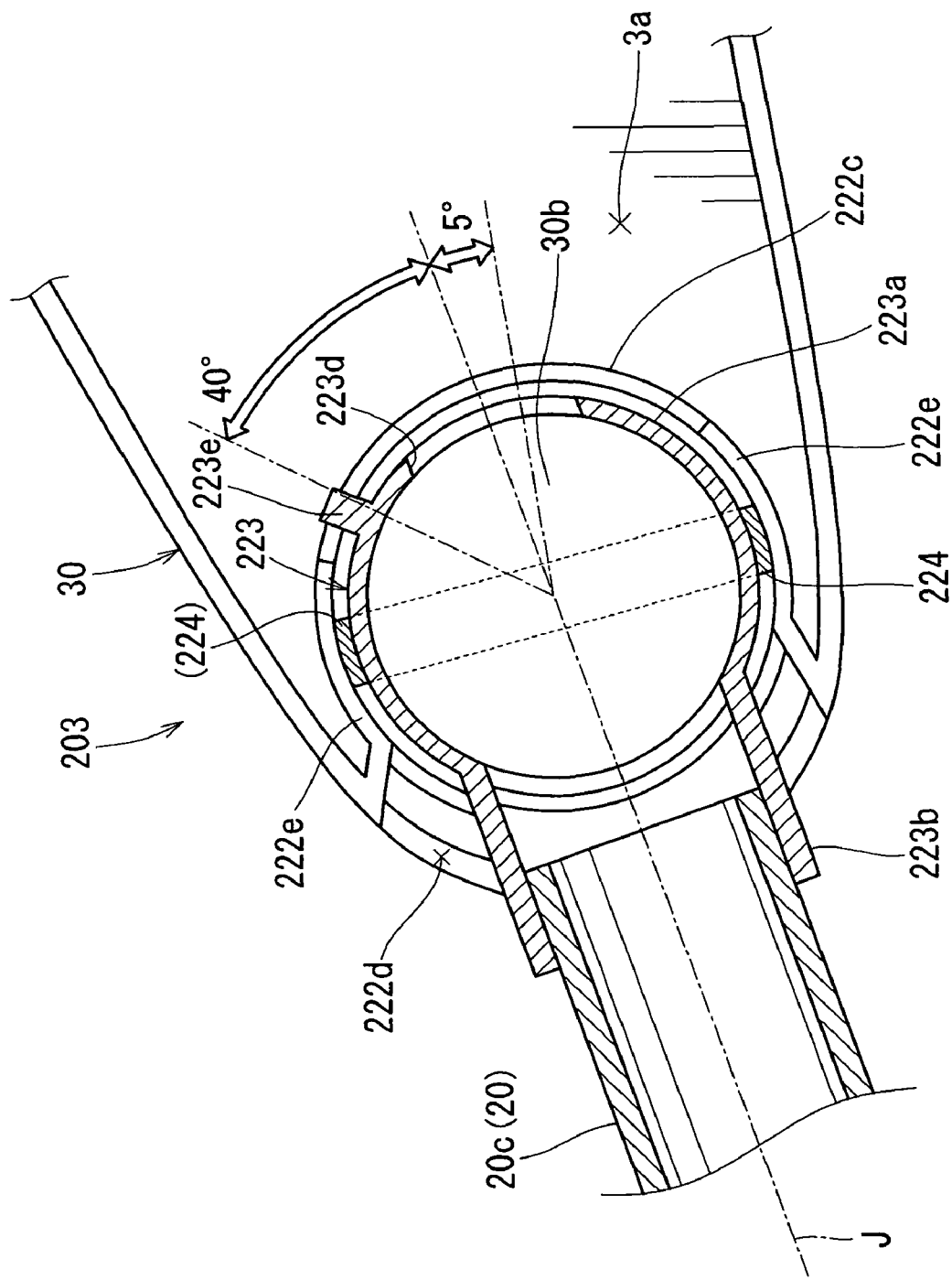
FIG. 30 is a cross-sectional view taken along line XXX-XXX in FIG. 29 and showing the connecting construction between an inlet member of the dust collating device and a discharge pipe of a cover of a saw unit.
Figure 31:
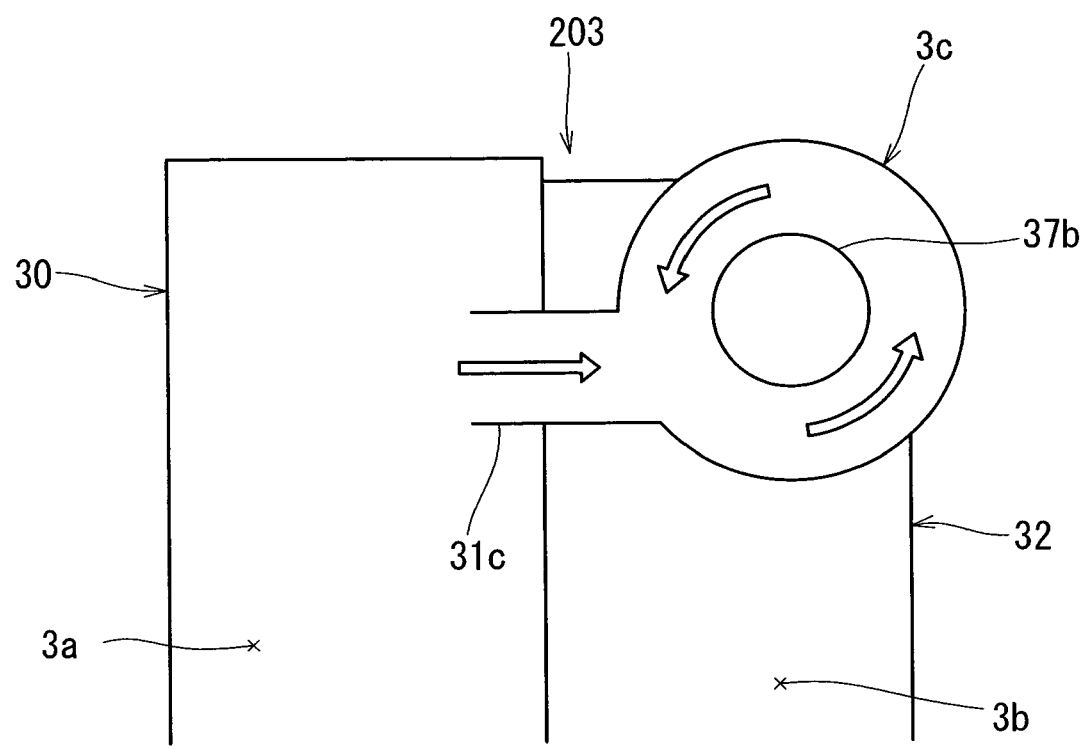
FIG. 31 is a schematic sectional view of a portion of the dust-collecting device as viewed in a direction of arrow XXXI in FIG. 29.

Opposite ends of the rotary shaft portion 223a are respectively rotatably received within circular support recesses 222c formed in the inner surfaces of the first outer wall 30 and the intermediate partition wall 31, as shown in FIG. 29. Accordingly, at a position on the front side of the first dust-collecting chamber 3a, the inlet member 223 can rotate relative to the first outer wall 30 and the intermediate partition wall 31 so that the inlet member 223a is free to pivot in the vertical direction. As shown in FIG. 30, the connecting pipe portion 223b extends outward from the first dust-collecting chamber 3a via an opening 222d formed at the front end of the first dust-collecting chamber 3a. The opening 222d is configured with an elongated opening in the vertical direction in order to enable the vertical pivotal movement of the inlet member 223. In the state where the inlet member 223 has been connected to the discharge pipe 20c of the cover 20, the dust-collecting device 203 can pivot downward by a maximum angle of 5° with respect to a longitudinal axis J of the discharge pipe 20c. In addition, the dust-collecting device 203 can pivot upward by a maximum angle of 40° with respect to the longitudinal axis J. The dust-collecting device 203 is free to pivot within this range and may move to a lowermost pivoted position by the force of gravity, if no opposing force is applied to the dust-collecting device 203.

The opening 222d on the front side of the first dust-collecting chamber 3a is hermetically sealed from the inside of the first dust-collecting chamber 3a in order to prevent the cutting chips that have been collected within the first collecting chamber 3a from scattering to the outside, and to prevent the air carrying the cutting chips from leaking to the outside. To this end, a seal member 224, made of felt, is wrapped around the rotary shaft portion 223a to continuously extend longitudinally along opposite sides of the rotary shaft portion 223a and radially across the lids 223c. In this connection, a pair of wall portions 222e is formed in continuity with an inner wall of each of the support recess 222c of the first outer wall 30 and the intermediate partition wall 31. Each of the wall portions 222e has a substantially arc-shaped cross-section. The pair of wall portions 222e is opposed to each other in the diametrical direction of the corresponding support recess 222c or with respect to the rotational axis of the rotary shaft portion 223a. The pair of wall portions 222e of the first outer wall 30 and the pair of wall portions 222e of the intermediate partition wall 31 extend toward each other in the direction of width of the first dust collecting chamber 3a. Accordingly, terminal ends of the wall portions 222e of the first outer wall 30 respectively closely contact with the corresponding terminal ends of the wall portions 222e of the intermediate partition wall 31, without creating any substantial gaps. The seal member 224 slidably contacts with these pairs of wall portions 222e and with the bottoms of the receiving recesses 222c in order to seal the first dust-collecting chamber 3a from the outside.

In addition, the wall portions 222e extend along the circumference of the corresponding support recesses 222c to the extent that the wall portions 222e do not interact with the vertical pivotal movement of the connecting pipe portion 223b and do not block the front side of the opening 222d in the direction of the flow of the cutting chips. However, the wall portions 222e have sufficient circumferential lengths to ensure that the seal member 224 contacts with the wall portions 222e throughout the entire vertically pivotable range of the inlet member 223 or the dust collection container 203.

A rotation restricting portion 223e corresponding to the rotation restricting portion 33b is formed on the rotary shaft portion 223a and is adapted to contact the circumferential edges of the wall portions 222e in order to define the pivotable range of the inlet member 223.

As shown in FIG. 29, a coil spring 228 is fitted on the rod 34a of the cover 34 in order to normally bias the cover 34 in the open direction.

A restricting member 250 (see FIGS. 25-28), for restricting the lower movable stroke end of the dust-collecting device 203, is mounted to the arm holder 13c and serves to support the dust-collecting member 203 from the lower side. Preferably, the restricting member 250 is made of steel wire having a suitable diameter. The steel wire is bent to have a substantially inverted U-shaped configuration as viewed from the upper side and to have a substantially inverted L-shaped configuration as viewed from the lateral side, so that the upper portion of the restricting member 250 extends obliquely toward the front side (on the side of the operator) over the arm holder 13c and below the dust-collecting device 203. Opposite ends of the restricting member 250 are secured to the arm holder 13c by means of screws 251 and 252. With this arrangement, the restricting member 250 can resiliently deform in the vertical direction such that the upper portion of the restricting member 250 changes its inclination angle relative to the lower portion.

A rotary member 253 is rotatably fitted on the upper end of the restricting member 250. The rotary member 253 may be made of a steel wire coiled around the upper end of the restricting member 250. Therefore, the dust-collecting device 250 is resiliently supported by the restricting member 250 while the lower surface of the cover 34 of the dust-collecting device 203 contacts with the upper end of the restricting member 250 via the rotary member 253. As a result, the dust-collecting device 203 can smoothly move in forward and rearward directions in response to the vertical movement of the saw unit 201. Therefore, the saw unit 210 can smoothly move in the vertical direction.

According to the sixth representative embodiment, the dust-collecting device 203 is free to pivot relative to the saw unit 210 within the maximum angle of 45°. More specifically, the dust-collecting device 203 can pivot downward by a maximum angle of 5° with respect to the longitudinal axis J of the discharge pipe 20c, and can pivot upward by a maximum angle of 40° with respect to the longitudinal axis J. Therefore, when the saw unit 210 is in the upwardly pivoted positions shown in FIGS. 25 and 26, the dust-collecting device 203 is positioned at a substantially horizontal position where the cover 34 extends substantially horizontally and substantially parallel to the arms 13a and 13b. In the horizontal position, the collecting container 203 is supported by the restricting member 250 with the lower surface of the cover 34 contacting with the rotary member 253 disposed at the upper end of the restricting member 250.

As the saw unit 210 pivots downward, the discharge pipe 20c may move downward. However, because the inlet member 223 may pivot relative to the discharge pipe 20c, the dust-collecting container 203 may be held in the horizontal position.

Figure 27:
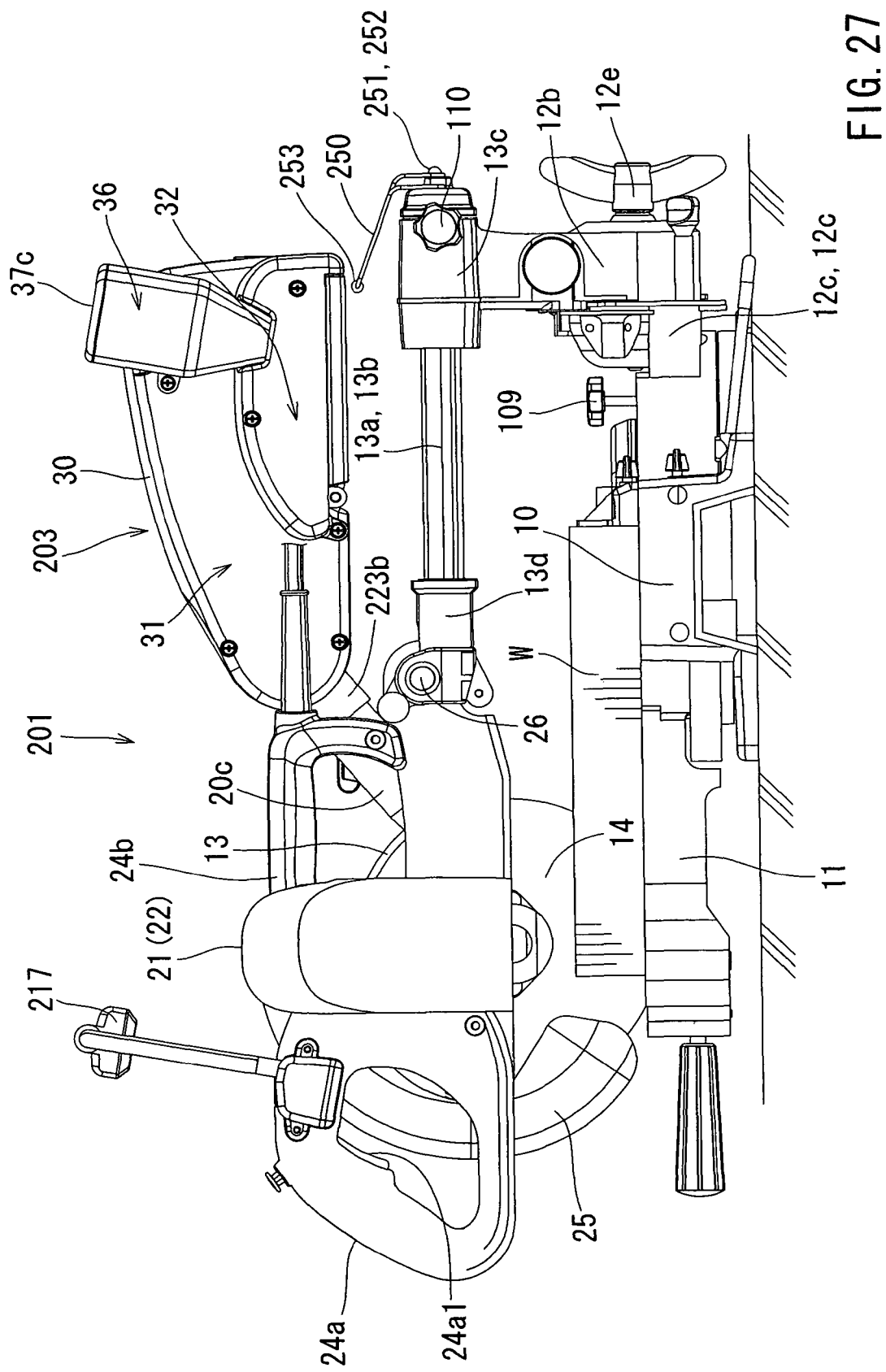
FIG. 27 is a side view similar to FIG. 25 but showing the saw unit positioned at a lowermost position.
Figure 28:
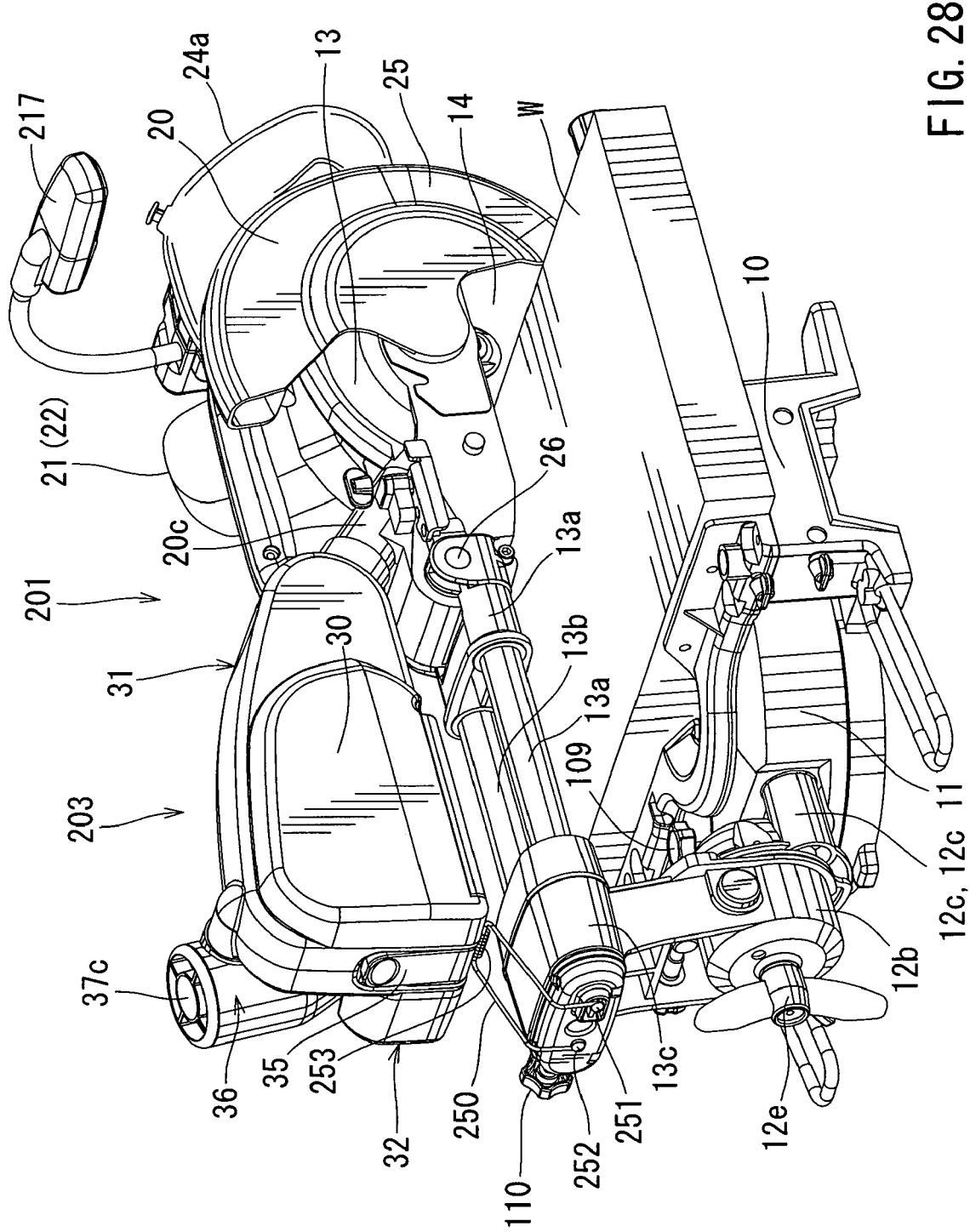
FIG. 28 is a perspective view similar to FIG. 26 but showing the saw unit positioned at the lowermost position.

In addition, the dust-collecting device 203 may be held in the horizontal position even if the saw unit 210 has been pivoted to the lowermost position, as shown in FIGS. 27 and 28. Accordingly, the slide table saw 201 could be stored within a storage space with the dust-collecting device 203 positioned at a lower level in regard to a horizontal direction. Therefore, it is possible to store the slide table saw 201 even within a limited storage space having a relatively lower height.

Further, according to this representative embodiment, the dust-collecting device 203 may be held in a substantially horizontal position irrespective of the change of the vertical position of the saw unit 201. Therefore, by setting the position of the cyclone unit 3c such that the central axis of the separator body 36 extends in the vertical direction when the dust-collecting device 203 is in the horizontal direction, the cutting chips can always be effectively separated by the cyclone unit 3c.

Furthermore, because the dust-collecting device 203 is supported by the restricting member 250 from the lower side, the dust-collecting device 203 can be reliably prevented from interacting with the arms 13a and 13b of the second slide 13. Accordingly, smooth sliding movement of the saw unit 210 in the horizontal direction can also be ensured in this respect.

Still further, in order to secure the restricting member 250 to the arm holder 13c, the screws used for fixing the arm holder 13c in position relative to the arms 13a and 13b can also be used for the screws 251 and 252. As a result, no additional screw and no additional machining operation are required for securing the restricting member 250.

Possible Modifications of Sixth Representative Embodiment

The above sixth representative embodiment may be modified in various ways. For example, although the restricting member 250 is mounted to the arm holder 13c in the above representative embodiment, the restricting member 250 may be mounted to another arm holder 13d (that supports the saw unit 210) or to the dust-collecting device 203.

In the above representative embodiment, the dust-collecting device 203 is free to rotate within a pivotal range of 45° and can pivot to a lowermost pivoted position (the position downwardly pivoted with respect to the longitudinal axis J of the discharge pipe 20c by an angle of about 5°) through the force of gravity. However, it is possible to design the configuration such that the dust-collecting device 203 is held in position relative to the discharge pipe 20c or the saw unit 210 at a predetermined position within the pivotal range. Such an alternative embodiment will now be described as a seventh representative embodiment with reference to FIGS. 32 and 33.

Seventh Representative Embodiment

Figure 32:
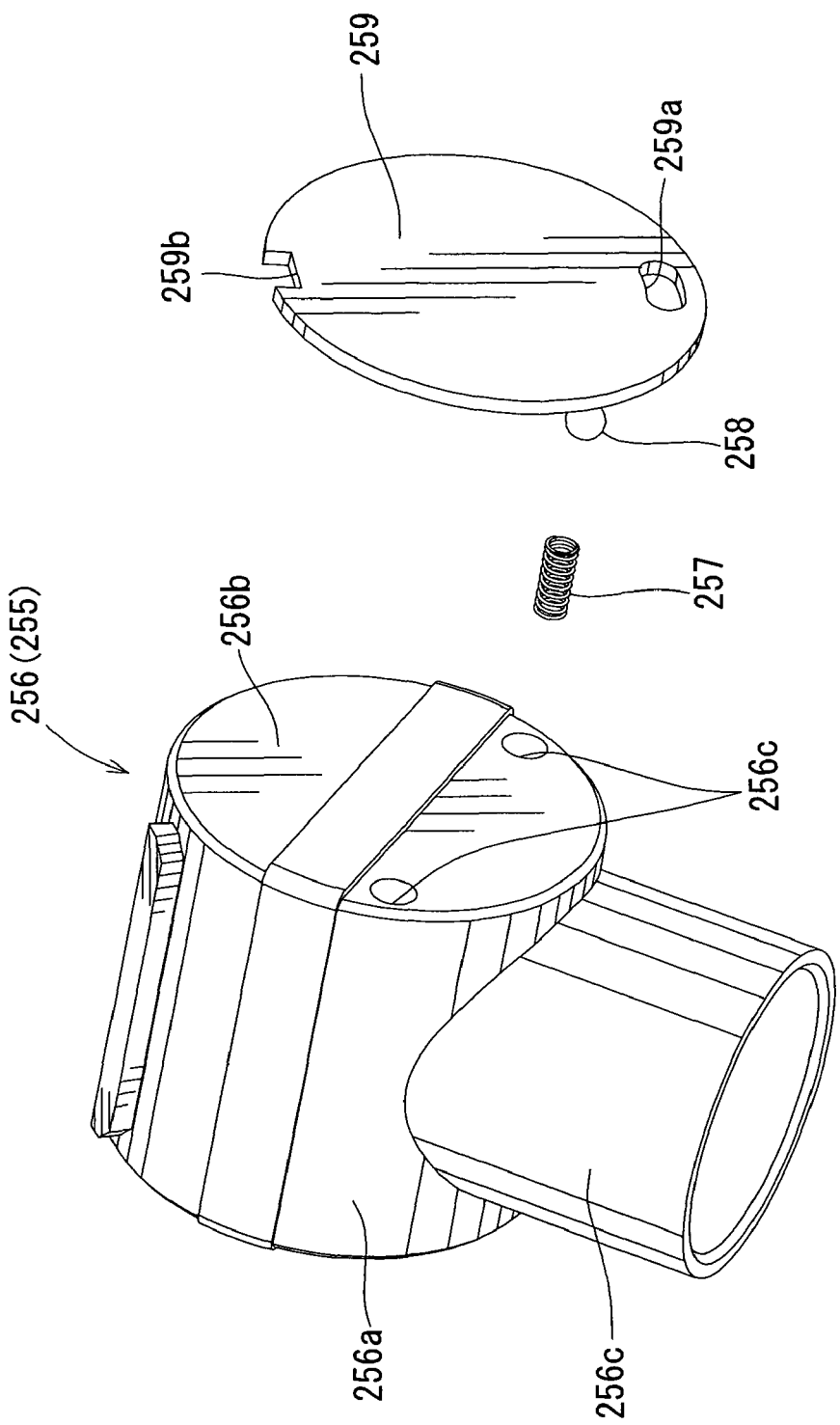
FIG. 32 is a perspective view of an inlet member of a dust-collecting device of a slide table saw according to a seventh representative embodiment.
Figure 33:
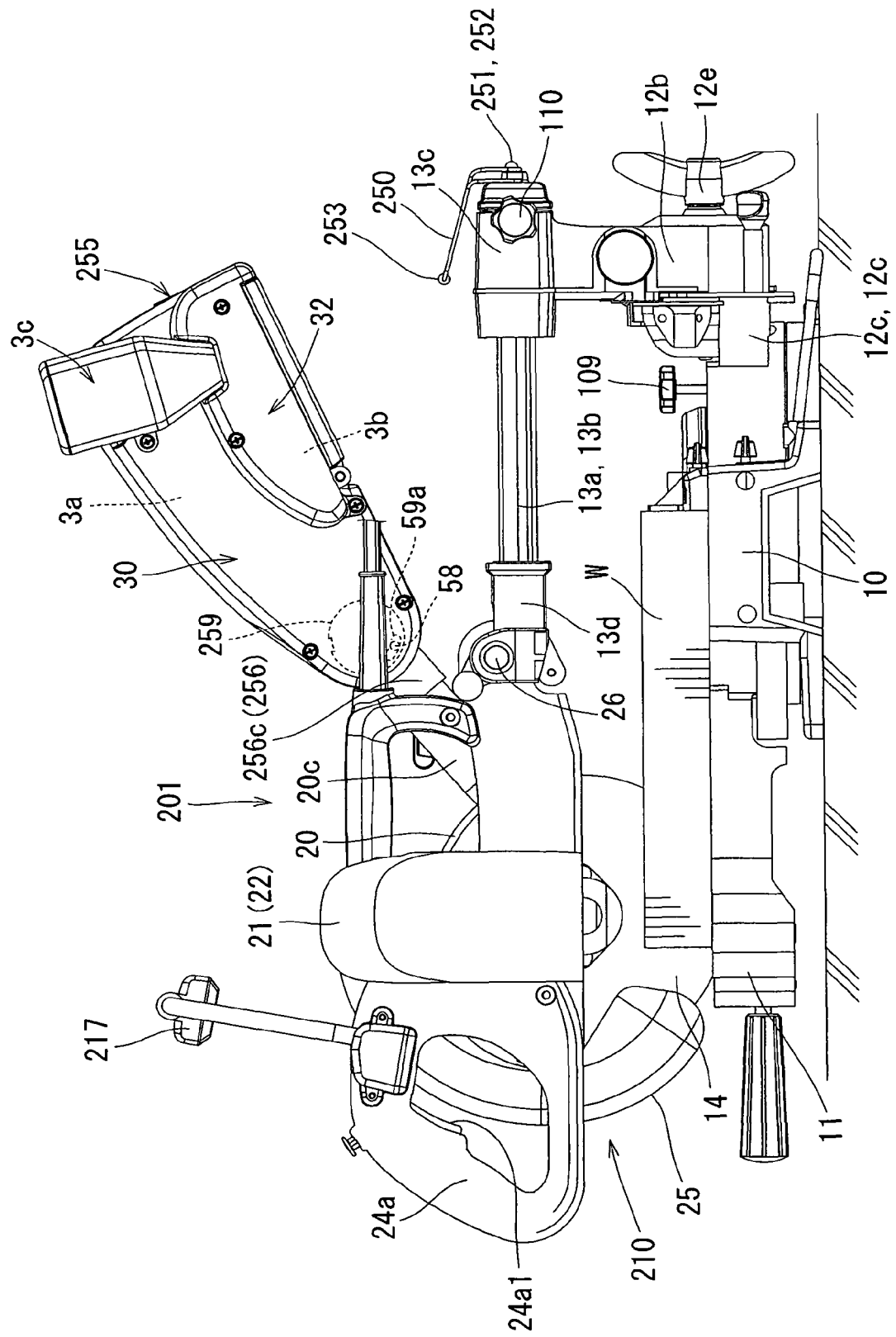
FIG. 33 is a side view of the slide table saw according to the seventh representative embodiment and showing a saw unit positioned at a lowermost position.

Referring to FIGS. 32 and 33, a dust-collecting device 255 has an inlet member 256 that is different in configuration from the inlet member 223 of the sixth representative embodiment. The remaining construction, other than the inlet member 256, is the same as the dust-collecting device 203 of the sixth representative embodiment and therefore, may not be repeatedly described.

The inlet member 256 of the sixth representative has a detent device known as a ball-plunger mechanism. The detent device includes a compression coil spring 257, a steel ball 258 biased in one direction by the coil spring 257, and a retainer plate 259 having a retaining hole 259a for engaging the steel ball 258. The compression coil spring 257 may be received within one of the receiving holes 256c formed on a lid 256b. The lid 256b closes the open right end of a cylindrical rotary portion 256a. The receiving holes 256c do not extend completely through the thickness of the lid 256b and are closed with bottoms. Accordingly, the inner space of a connecting pipe portion 256c can be reliably sealed relative to the outside in the same manner as the connecting pipe portion 223b of the sixth representative embodiment. The steel ball 258 is held at one end of the compression coil spring 257. The retainer plate 259 is received within the support recess 222c of the intermediate partition wall 31 and is positioned at the bottom of the support recess 222c of the 223b. The retaining hole 259a is configured as a slot formed in the retainer plate 259 and is elongated in the circumferential direction for a short distance.

An engaging recess 259b is formed in the retainer plate 259 and is configured as a cutout recess extending radially inwardly from the circumferential edge of the retainer plate 259. An engaging projection (not shown) is formed on the bottom of the support recess 222c and engages the engaging recess 259b. Accordingly, the retainer plate 259 is prevented from rotating relative to the support recess 222c. Therefore, the right end of the rotary shaft portion 256a is rotatably received within the support recess 222c while the retainer plate 259 is interleaved between the right end of the rotary shaft portion 256a and the bottom of the support recess 222c. The left end of the rotary shaft portion 256a is rotatably received within the corresponding support recess 222c formed in the first outer wall 30 in the same manner as in the sixth representative embodiment. Also, the connecting pipe portion 256c is connected to the discharge pipe 20c of the cover 20 of the saw unit 210 in the same manner as in the sixth representative embodiment.

According to the seventh representative embodiment, the steel ball 258 is pressed against the retainer plate 259 by the biasing force of the compression coil spring 257. As long as the steel ball 258 does not engage with the retaining hole 259a, the retainer plate 259 can rotate together with the dust-collecting device 255 relative to the lid 256c of the rotary shaft portion 256a, as the dust-collecting device 255 pivots vertically relative to the saw unit 210. In other words, the dust-collecting device 255 can freely pivot vertically due to the force of gravity. However, when the steel ball 258 is brought to oppose the retaining hole 259a during the pivotal movement of the dust-collecting device 255, the steel ball 258 engages the retaining hole 259a through the biasing force of the compression coil spring 257. As a result, the dust-collecting device 255 may be prevented from pivoting further. To this end, the biasing force of the compression coil spring 257 is set to be sufficient to prevent the pivotal movement of the dust-collecting device 255 against the force of gravity.

In this representative embodiment, the position of the steel ball 258 and the position of the retaining hole 259 are determined such that steel ball 258 engages with retaining hole 259 when the pivotal angle of the dust-collecting device 255 is within the entire pivotal range of 0° to 45° and within the range of about 15° from the upper pivotal limit of the entire pivotal range of 0° to 45°. Accordingly, when the saw unit 210 has been pivoted to the lowermost position or a position upward from the lowermost position by a predetermined angle (e.g., a position within the pivotal range where the saw blade 14 cuts the workpiece W as shown in FIG. 33), the steel ball 258 may engage the retaining hole 259. Therefore, the dust-collecting device 255 may be inclined such that the rear portion (right portion as viewed in FIG. 33) of the dust-collecting device 255 is positioned upward relative to the front portion. In other words, the dust-collecting device 255 is inclined downwardly in the forward direction (left direction as viewed in FIG. 33). In contrast, in the case of the sixth representative embodiment, the dust-collecting device 203 is positioned in the horizontal position when the saw unit 210 is in the lowermost position, as shown in FIG. 27.

With this arrangement, the dust-collecting device 255 is held to be inclined downwardly in the forward direction during the cutting operation. Therefore, the second outer wall 32 or the second dust-collecting chamber 3b may also be inclined downwardly in the forward direction. Since the cyclone unit 3c is positioned on the rear side of the second outer wall 32, the cutting chips discharged from the cyclone unit 3c move toward the front portion (the left portion as viewed in FIG. 33) of the second dust-collecting chamber 3b by the force of gravity. In other words, the cutting chips may be collected within the second dust-collecting chamber 3b at the front portion thereof. Accordingly, the cutting chips may be effectively collected within the second dust-collecting chamber 3b without blocking the inlet hole 32a of the second dust-collecting chamber 3b. Consequently, the dust-collecting efficiency of the dust-collecting device 255 can be improved.

In order to store the slide table saw 201 within a storage space, the operator may manually press the rear portion of the dust-collecting device 255 downward from the state shown in FIG. 33. Accordingly, this action removes the steel ball 258 from the retaining hole 259a against the biasing force of the compression coil spring 257, allowing the dust-collecting device 255 to move to a horizontal position. As a result, the slide table saw 201 could be stored with a lowered overall height of the slide table saw 201.

As described above, according to the seventh representative embodiment, when the pivotal angle of the dust-collecting device 255 is within the range of about 15° from the upper pivotal limit of the entire pivotal range of 0° to 45°, the dust container 255 may be provisionally fixed in position relative to the saw unit 210. Accordingly, during the cutting operation the cutting chips may be stored within the second dust-collecting chamber 3b at the front portion thereof, since the second dust-collecting chamber 3b is held so as to be inclined downwardly in the forward direction. As a result, the dust-collecting efficiency of the dust-collecting device 255 can be improved.

In addition, it is possible to move the dust-collecting device 255 from the inclined position to the horizontal position with the saw unit 210 located at the lowermost position. Accordingly, in the same manner as in the sixth representative embodiment, the slide table saw 201 can be stored within a storage space while the slide table saw 201 has been compacted with respect to overall height.

Other Possible Modifications of Sixth and Seventh Representative Embodiments The sixth and seventh representative may be modified in various ways. For example, the detent device utilizing the spring-biased steel ball 258 and the retaining hole 259 may be replaced with any other devices for provisionally fixing the pivoted position of the dust-collecting device 255. For example, the detent device may be replaced with a tightening screw or a pin that is removably insertable into a corresponding pin-receiving hole.

In addition, the construction of the dust containers 203 and 255 of the sixth and seventh representative embodiments related to the pivotal movement thereof can be applied to the other types of dust-collecting devices, such as dust-collecting devices that do not have the cyclone unit 3c and the second dust-collecting chamber 3b, and instead have only the first dust-collecting chamber 3a, or such as dust-collecting devices that have fabric dust-collecting bags and frames for retaining the bags.

Furthermore, although the dust containers of the sixth and seventh representative embodiments have been described in connection with portable slide saws, the dust containers may be used in combination with any other type of cutting devices, such as stationary installed cutting devices.

Eighth Representative Embodiment

An eighth representative embodiment will now be described with reference to FIGS. 34 to 42. The eighth representative embodiment is substantially the same as the sixth representative embodiment. However, the eighth representative embodiment has been incorporated in order to describe particular features that were not clearly described in the sixth representative embodiment or in the other representative embodiments. Consequently, in FIGS. 34 to 42, like members are given the same reference numerals and the description of these elements may not be repeated.

Thus, the eighth representative embodiment will be described in relation to the different constructions from the sixth representative embodiment and particular features that are substantially disclosed in some of the previous representative embodiments but have not been described in detail.

Referring to FIGS. 34 to 37, a slide table saw 301 of the eighth representative embodiment includes a saw unit 310 and a dust-collecting device 303. As described in connection with the first representative embodiment (see FIG. 1), the pivotable member 12b is laterally pivotally mounted to the slide member 12a via the shaft 12d, so that the pivotal member 12b can pivot in the lateral direction. In addition, the handle 12e is mounted to the slide member 12a in order to fix the pivotal member 12b at a desired pivoted angle relative to the slide member 12a, so that a cutting operation can be performed with the saw blade 14 as well as the saw unit 2 inclined laterally relative to the table 11. These features are also incorporated into the slide table saw 301 of the eighth representative embodiment as well as the table saws disclosed in the second to seventh representative embodiments.

More specifically, the pivotable member 12b can pivot the saw unit 310 in both a right and left direction. However, in general, a majority of operators are right-handed persons. Therefore, the operator may grasp the handle 24a with his or her right hand and naturally place the workpiece W on the left side of the table 11. In addition, because the electric motor 12 is positioned on the right side of the cover 20, the operator can more easily view the left side of the saw unit 310 than the right side. For the above reasons, the operator may usually pivot the saw unit 310 leftward (with regard to an operating orientation) and fix the saw unit 310 at the desired pivoted position by the operation of the handle 12e.

Figure 34:
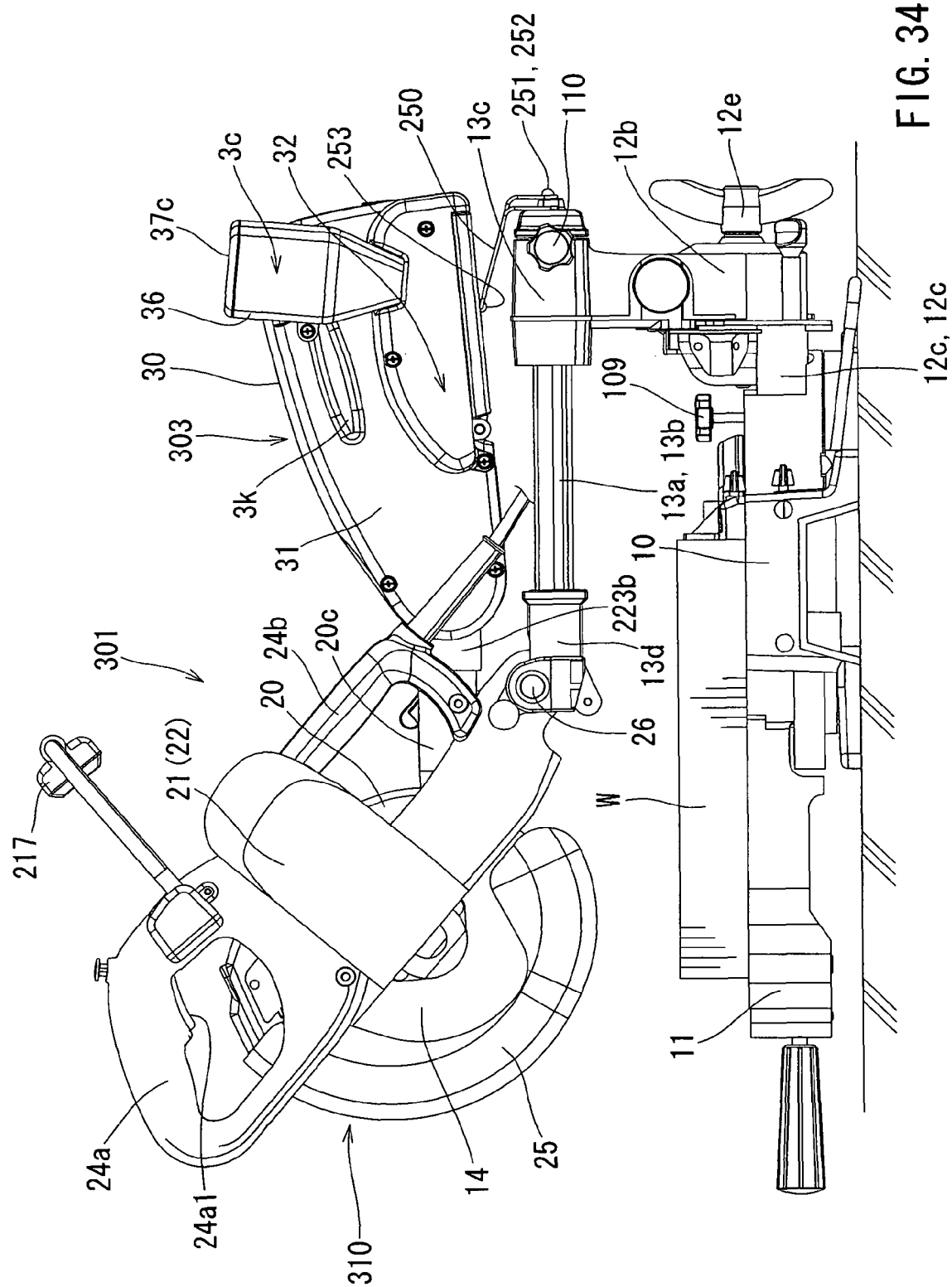
FIG. 34 is a right side view of a slide table saw according to an eighth representative embodiment.

Referring to FIG. 34, the first outer wall 30 defining the first dust-collecting chamber 3a of the dust-collecting device 303 is elongated in the forward and rearward directions (left and right directions as viewed in FIG. 34) and has a substantially triangular configuration when viewed from a lateral side. In other words, the first dust-collecting chamber 3a as well as the first outer wall 30 has a streamlined configuration having a height gradually increasing in the rearward direction.

Figure 38:
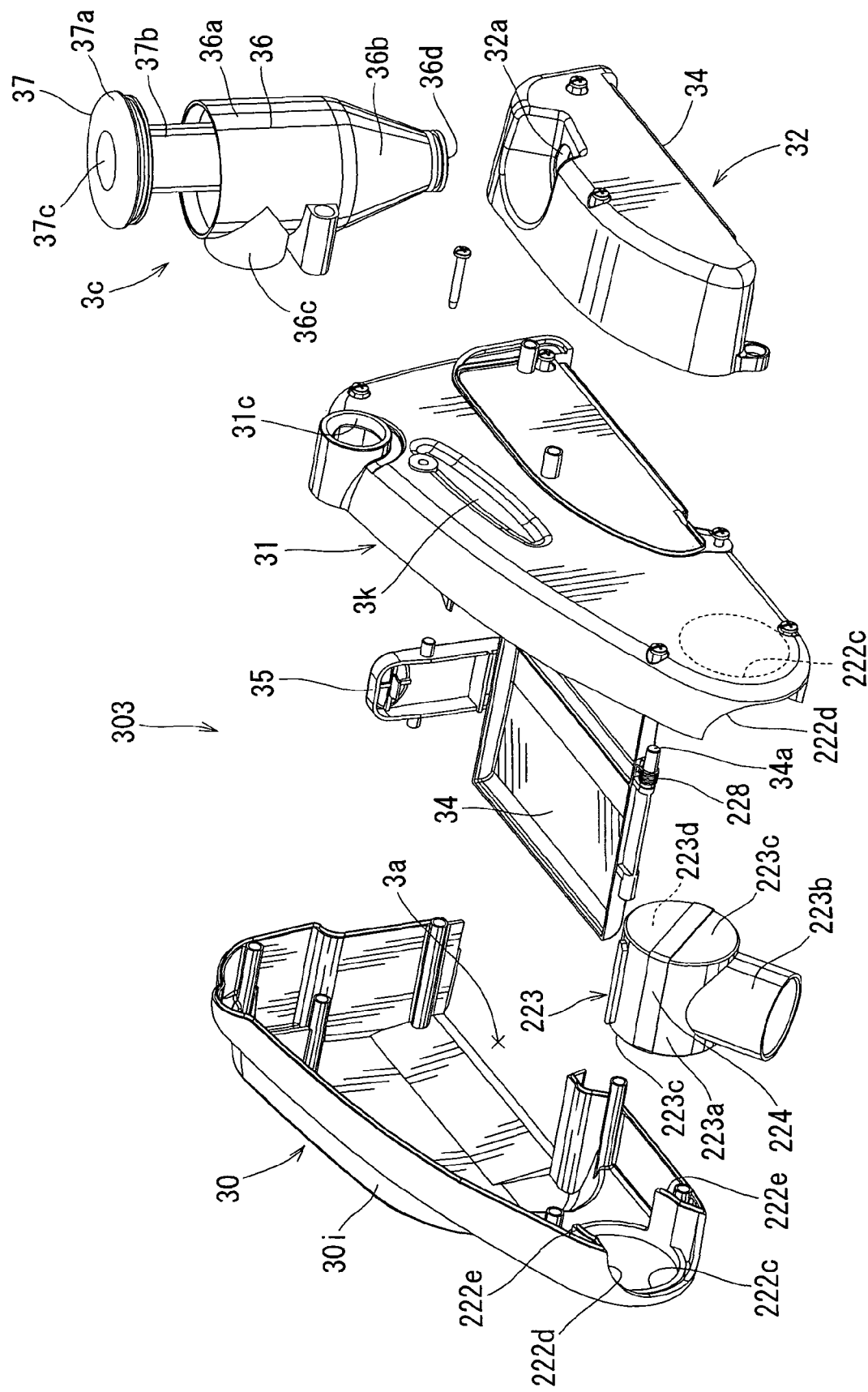
FIG. 38 is an exploded perspective view of a dust-collecting device of the slide table saw according to the eighth representative embodiment.
Figure 39:
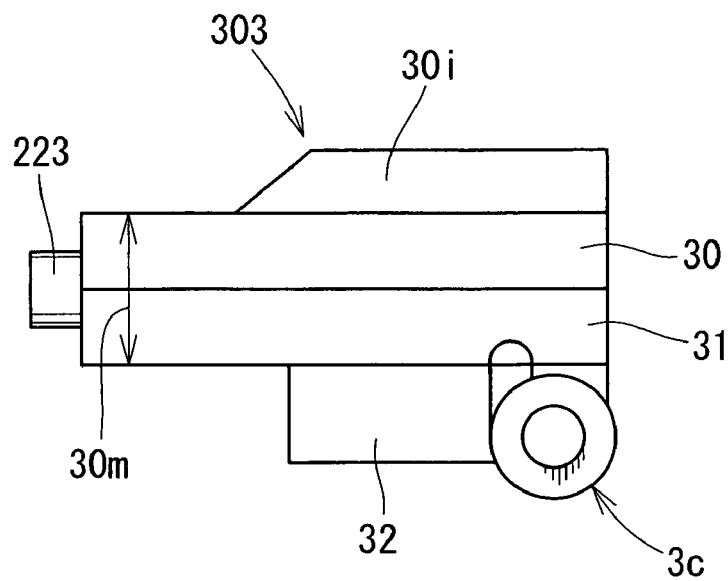
FIG. 39 is a schematic plan view of the dust-collecting device.

As shown in FIGS. 38 and 39, the first outer wall 30 has a laterally enlarged portion 30*i* on the left side as viewed in FIG. 38 (upper side as viewed in FIG. 39) and extends from a substantially central portion to the rear end of the first outer wall 30. The intermediate partition wall 31 extends from a position corresponding to a substantially central portion of the first outer wall 30 to a position corresponding to the rear end of the first outer wall 30. Therefore, the dust-collecting device 303 has a narrow width 30*m* on the front side or the side of the inlet member 223. Accordingly, the operator can stably hold the dust-collecting device 303 by grasping the front portion having the narrow width 30*m* and easily perform the connecting and disconnecting operation of the dust-collecting device 303 to and from the discharge pipe 20*c* of the saw unit 310.

Figure 40:
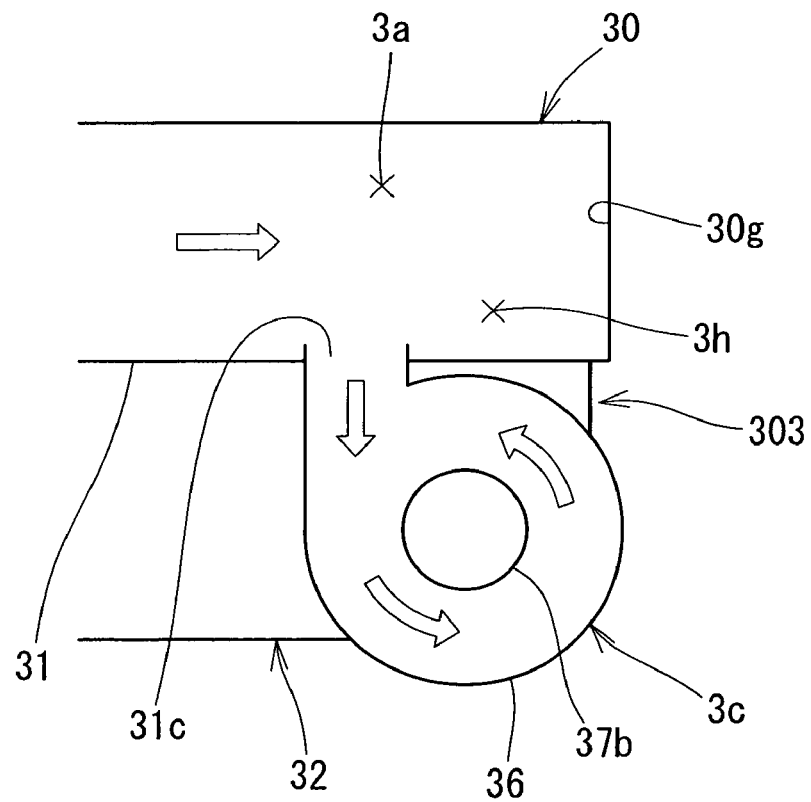
FIG. 40 is a schematic sectional view of a portion of the dust-collecting device.

In addition, as shown in FIG. 40, the first dust-collecting chamber 3*a* defines a rear end surface 30*g*. The cutting chips supplied from the front side will collide with the rear end surface 30*g*. The outlet hole 31*c* is formed in the intermediate partition wall 31 disposed on the right side of the first outer wall 30 and is positioned to be spaced by a predetermined distance from the rear end surface 30*g* in order to prevent or minimize the occasions in which a vigorously moving cutting chip directly enters the outlet hole 31 after a collision with the rear end surface 30*g*. Namely, a space 3*h* is ensured between the outlet hole 31*c* and the rear end surface 30*g* in order to buffer the flow of the colliding and rebounding cutting chips before reaching the outlet hole 31*c*. Consequently, the cutting chips may be effectively collected within the first dust-collecting chamber 3*a*.

Figure 35:
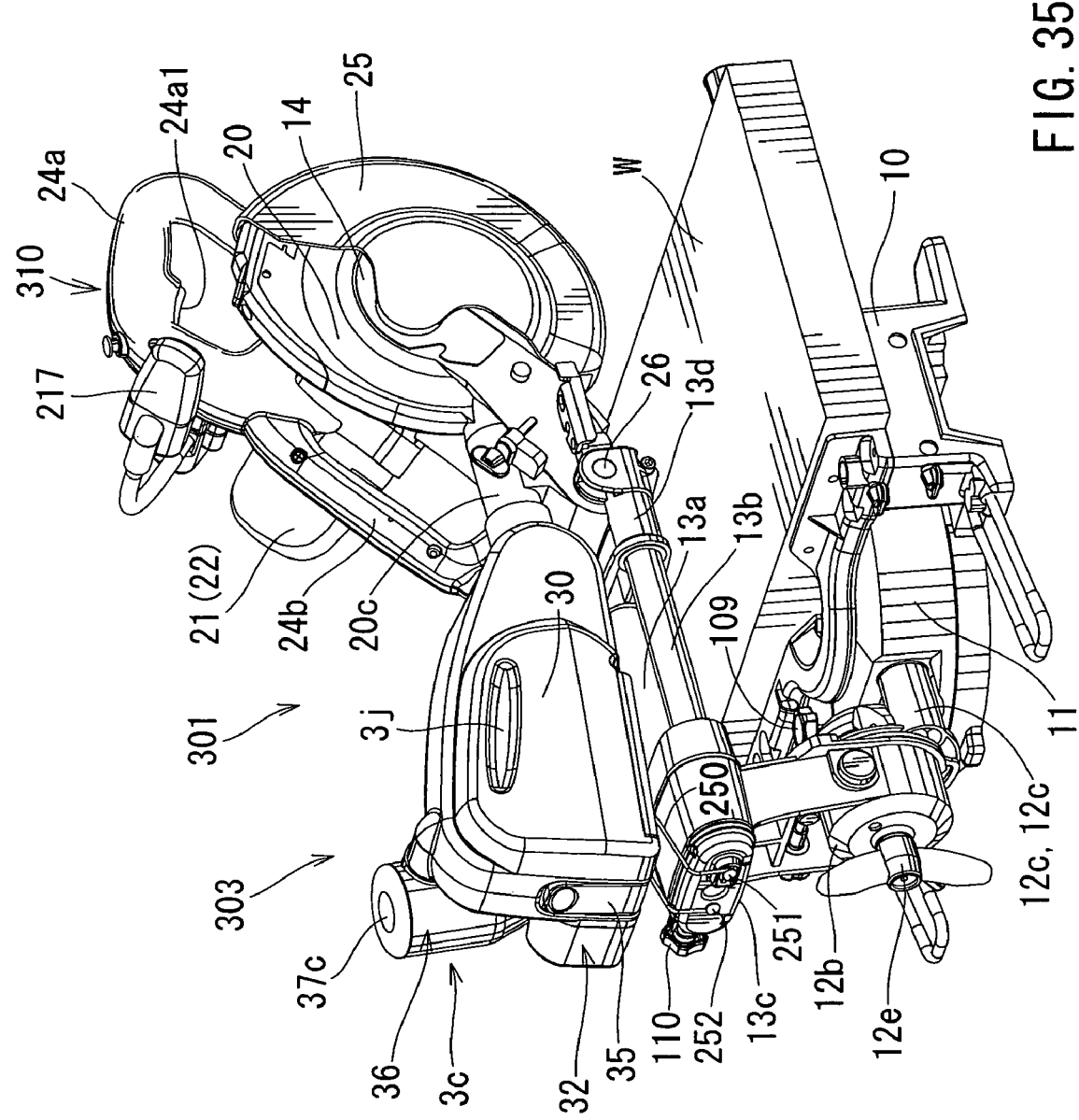
FIG. 35 is a perspective view of the slide table saw shown in FIG. 34 as viewed from the left and rear side.

As shown in FIGS. 34 and 35, finger engaging recesses 3*j* and 3*k* are respectively formed in the first outer wall 30 defining the left side surface of the dust-collecting device 303 and a portion of the intermediate partition wall 31 exposed to the outside and defining the right side surface of the dust-collecting device 303. The finger engaging recesses 3*j* and 3*k* are respectively positioned in proximity to the upper edges of the first outer wall 30 and the intermediate partition wall 31 and extend along the corresponding upper edges. More specifically, the central portions of the finger engaging recesses 3*j* and 3*k* are positioned to correspond to the position of the center of gravity of the dust-collecting device 303. Therefore, after removal from the saw unit 310, an operator can single handedly grasp the dust-collecting device 303 by engaging his or her fingers with the finger engaging recesses 3*j* and 3*k* in a balanced position.

As shown in FIG. 40, the cyclone body 36 of the cyclone unit 3*c* is positioned such that the frontmost part and a rearmost part of the cyclone body 36 are respectively positioned to substantially aligned with the front portion of the outlet hole 31*c* and the rear ends of the first outer wall 30 and the intermediate partition wall 31 defining the rear end surface 30*g* of the first dust-collecting chamber 3*a*. Since the first outer wall 30 and the intermediate partition wall 31 have a maximum height at their rear ends, the cyclone body 36 can be positioned so as to not extend upward by a large distance beyond the top of the rear ends of the first outer wall 30 and the intermediate partition wall 31 (see FIG. 36). Accordingly, it is possible to ensure a large space below the cyclone body 36 so that the capacity of cutting chips within the second dust-collecting chamber 3*b* can be increased.

Figure 41:
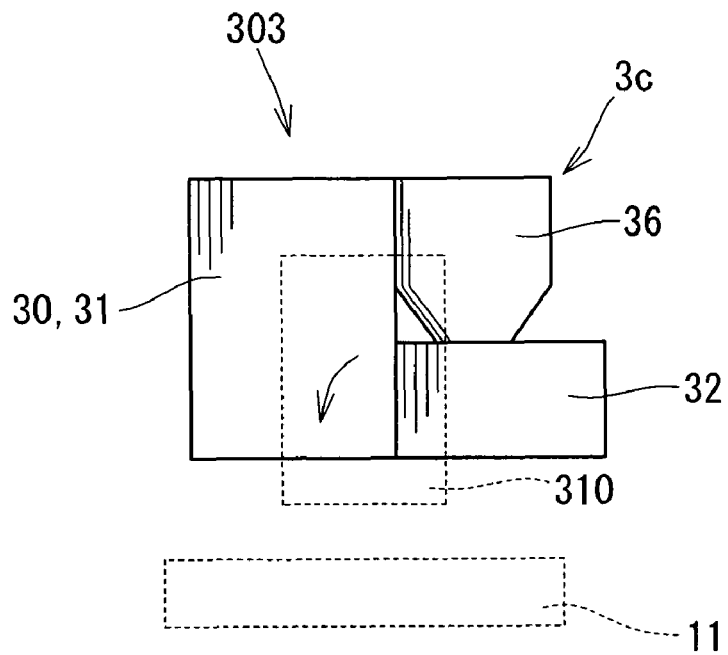
FIG. 41 is a schematic front view of the dust-collecting device.
Figure 42:
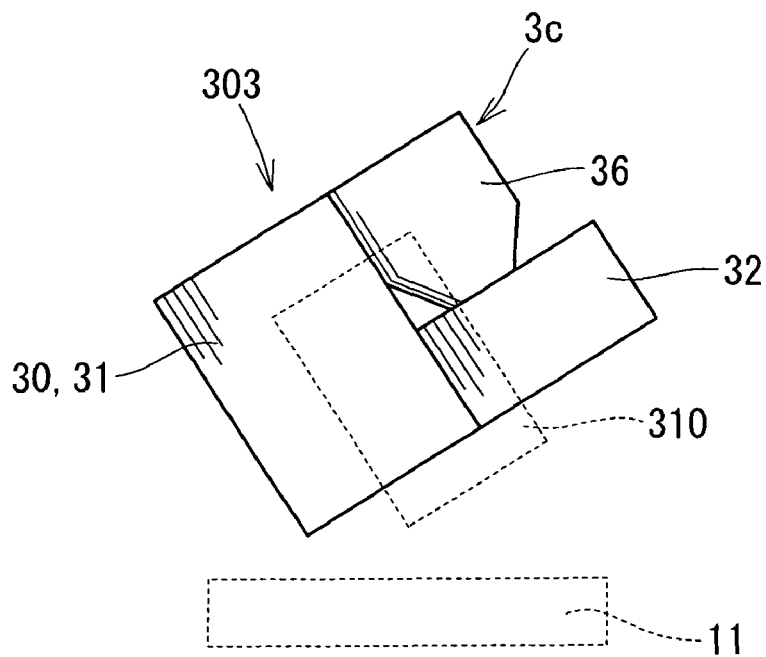
FIG. 42 is a schematic front view similar to FIG. 41 but showing the position of the dust-collecting device when the saw unit has been laterally pivoted.

The operation of the eighth representative embodiment will be described in relation to the particular features described above. First, the cyclone unit 3*c*, integrated with the first outer wall 30, the intermediate partition wall 31, and the second outer wall 32, is disposed on the right side of the intermediate partition wall 31. Accordingly, when the saw unit 310 has been pivoted leftward relative to the table 11 from a vertical position in order to cut the workpiece W with the saw blade 14 inclined relative to the workpiece (oblique cutting operation), the right side of the intermediate partition wall 31 may be turned upward together with the cyclone unit 3*c* as schematically shown in FIGS. 41 and 42.

Therefore, during an oblique cutting operation, the cyclone unit 3*c* may be positioned upward of the intermediate partition wall 31 or the first dust-collecting chamber 3*a*. Accordingly, the cutting chips collected within the first dust-collecting chamber 3*a* and/or the cutting chips fed into the first dust-collecting chamber 3*a* from the case 20 may be prevented from accidentally flowing into the cyclone unit 3*c* by the force of gravity. Therefore, the dust-collecting efficiency can be improved.

Figure 36:
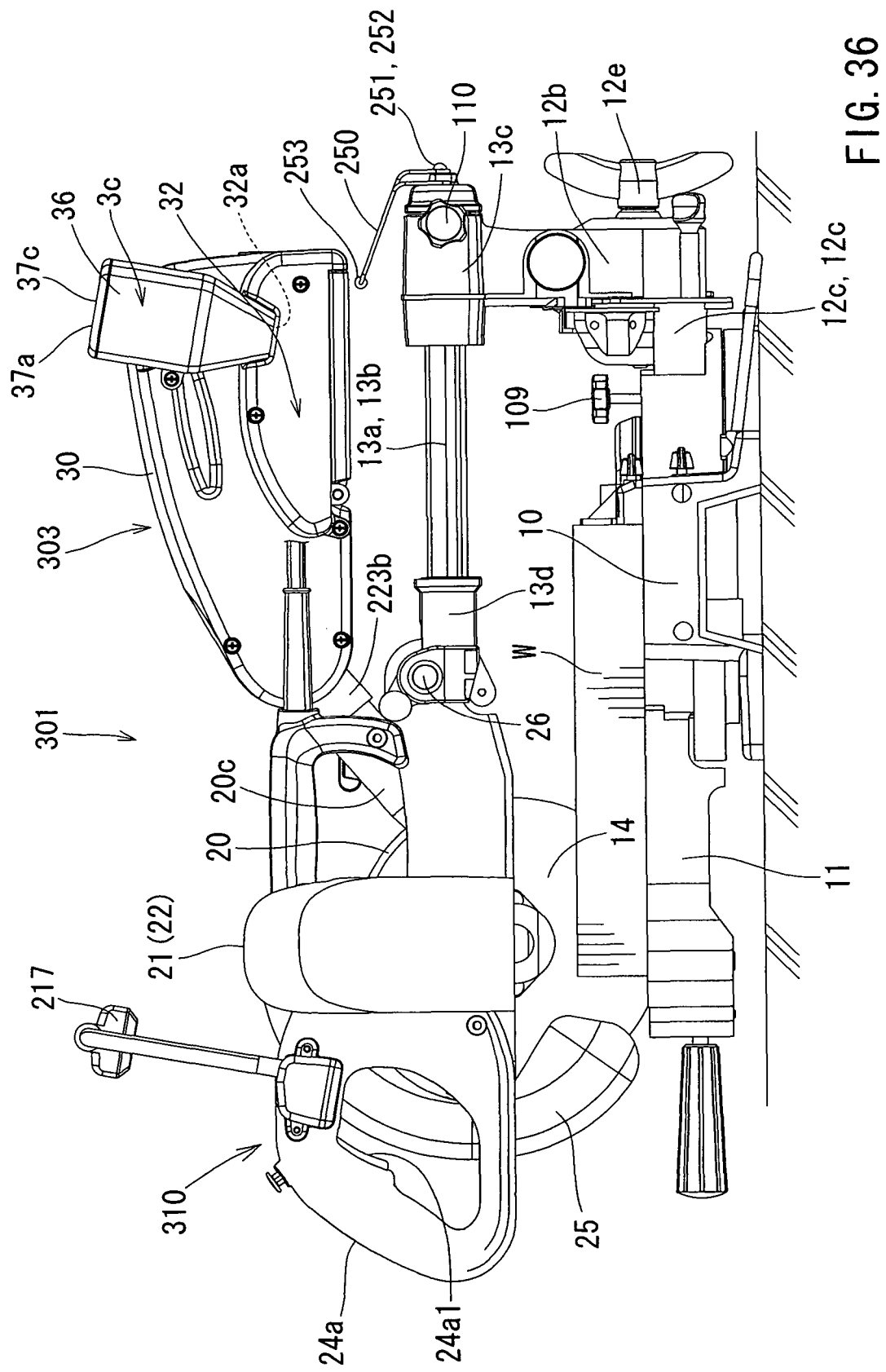
FIG. 36 is a view similar to FIG. 34 but showing a saw unit positioned at a lowermost position.
Figure 37:
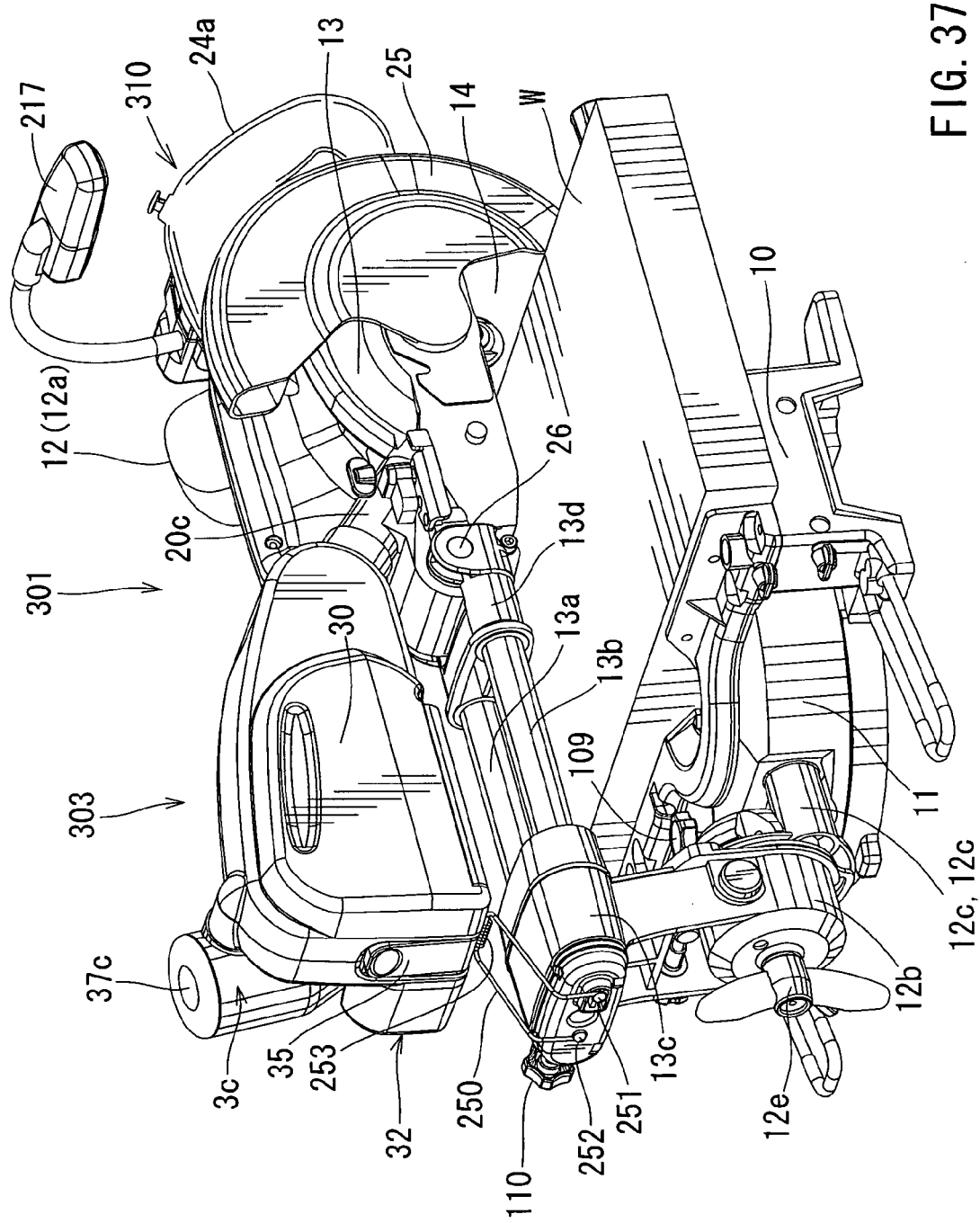
FIG. 37 is a perspective view similar to FIG. 35 but showing the saw unit positioned at the lowermost position.

Second, as shown in FIGS. 36 and 40, the cutting chips entering from the front side of the first dust-collecting chamber 3*a* may collide with the end surface 30*g* of the first dust-collecting chamber 3*a*. Since a space 3*h* is ensured between the outlet hole 31*c* and the end surface 30*g*, the vigorous flowing of the cutting chips caused by the collision may not directly enter the outlet hole 31*c*. Consequently, the cutting chips may be effectively collected within the first dust-collecting chamber 3*a*, so that the dust-collecting efficiency can be improved.

Third, the first dust-collecting chamber 3*a* is streamlined and has a vertical height that gradually increases in the rearward direction. In other words, the vertical cross-sectional area of the first dust-collecting chamber 3*a* increases in the rearward direction. Accordingly, the pressure of the carrier air blown into the first dust-collecting chamber 3*a* gradually decreases in the rearward direction without generating turbulent airflow, so that the flow rate of the carrier air gradually decreases. As a result, the flow rate of the cutting chips carried by the carrier air also gradually decreases. Therefore, the large and heavy cutting chips may effectively drop within the first dust-collecting chamber 3*a*, improving the dust-collecting efficiency.

Although the above features have been described in relation to the slide table saw, these features are also applicable to different types of table saws. For example, although the above features have been described in relation to table saws that can pivot both rightward and leftward, these features can be applied to table saws that can pivot only rightward or only leftward. If the above features are applied to table saws that can pivot only rightward, it is preferable that the cyclone unit is positioned on the left side of the dust-collecting device so that the cyclone unit may be positioned on the upper side of the first dust-collecting chamber during an oblique cutting operation. In addition, although the above features have been described in relation to the dust-collecting devices that can pivot vertically relative to the saw unit, these features can also be applied to dust-collecting devices that are fixed in position relative to the saw unit.

This invention claims:

1. A saw comprising:
   a table for supporting a workpiece;
   a rotary circular saw blade; and
   a pivotable saw arm for mounting the saw blade such that the saw blade is pivotable in a plane to cut the workpiece; and
   a cover arranged and constructed to cover the saw blade; and
   a dust-collecting device connected to the cover, so that cutting chips are fed to the dust-collecting device together with a flow of a carrier air produced when the saw blade rotates within the cover; and an adjusting device arranged and constructed to adjust a position of the dust-collecting device relative to the cover, wherein the dust-collecting device is positioned on a downstream side of a downstream outlet of the cover with respect to a direction of flow of the carrier air carrying the cutting chips, the dust-collecting device is a rigid container, the cover comprises a discharge pipe extending from the cover toward the downstream side with respect to the direction of flow of the carrier air carrying the cutting chips, and the dust-collecting device is connected to the discharge pipe via the adjusting device, and the adjusting device further comprises:

a connecting pipe having a first end and a second end, the first end being connected to the discharge pipe, and the second end being open into a dust collecting container; and a shaft portion connected to the connecting pipe and extending perpendicular to the connecting pipe;

the dust collecting container is supported by the shaft portion so as to pivot in said plane, relative to the table, about an axis of the shaft portion, and the shaft portion is configured such that the carrier air flows through the shaft portion.

2. The saw as in claim 1, the dust-collecting device further comprising:

a first dust-collector defining a first dust-collecting chamber and arranged and constructed to collect at least a portion of the cutting chips fed from the side of the saw blade together with the carrier air and remaining within the first dust-collecting chamber due at least in part to a force of gravity; and a cyclone unit receiving the flow of a remaining portion of the cutting chips together with the carrier air, in which the remaining portion of the cutting chips have not been collected within the first dust-collector, wherein the cyclone unit comprises a cyclone body, a cutting chip discharge pipe, and an air discharge pipe;

wherein the cyclone body has an inner wall and is arranged and constructed to cause circulation of the remaining portion of the cutting chips together with the carrier air along the circumference of the inner wall, while the remaining portion of the cutting chips are separated and drop downward due at least in part to the force of gravity; and wherein after separation the carrier air is discharged from the cyclone body via the air discharge pipe; and wherein the separated remaining portion of the cutting chips are discharged from the cyclone body via the cutting chip discharge pipe; and a second dust-collecting device defines a second dust-collecting chamber and is connected to the cutting chip discharge pipe of the cyclone body, so that the separated remaining cutting chips discharged from the cutting chip discharge pipe are collected within the second dust-collecting chamber.

3. The saw as in claim 2, the dust-collecting device further comprising a single bottom cover defining a bottom of the first dust-collecting chamber and the second dust-collecting chamber, so that collected cutting chips within the first and second dust-collecting chambers can be simultaneously discharged by opening the bottom cover.

4. The saw as in claim 2, wherein the first dust-collector defining the first dust-collecting device has a front portion removably connected to the cover and having a narrower width than a remaining portion.

5. The saw as in claim 2, wherein the first dust-collector defining the first dust-collecting device has engaging recesses formed on both lateral sides and extending proximally to and along an upper edge of the first dust-collector, so that an operator can hold the dust-collecting device by engaging the operator's fingers with the engaging recesses.

6. The saw as in claim 5, wherein the engaging recesses are formed in a position substantially corresponding to a center of gravity of the dust-collecting device.

7. The saw as in claim 1, further comprising a base pivotally supporting the cover between an uppermost position and a lowermost position, wherein the adjusting device adjusts a relative angle between the cover and the dust-collecting device, so that the relative angle when the cover is at an uppermost position or a position proximal to the uppermost position is smaller than the relative angle when the cover is at a lowermost position or a position proximal to the lowermost position.

8. The saw as in claim 7, the adjusting device further comprising:

a restricting device and a support device;

wherein the restricting device is arranged and constructed to restrict relative pivotal movement between the cover and the dust-collecting device, so that the dust-collecting device pivots together with the cover when the cover has pivoted downward from an intermediate position between the lowermost position and the uppermost position; and wherein the support device is arranged and constructed to support the dust-collecting device at a predetermined position relative to the base against the force of gravity when the cover has pivoted upward from the intermediate position.

9. The saw as in claim 8, wherein the dust-collecting device comprises a dust-collecting container having a lower surface; and wherein the lower surface extends substantially horizontally when the dust-collecting device is at the predetermined position.

10. The saw as in claim 1, further comprising a base supporting the cover, so that the cover can vertically pivot between an uppermost position and a lowermost position;

wherein the adjusting device further includes a restricting device capable of restricting a lower movable stroke end of the dust collecting container relative to the base and positioned away from the shaft portion of the adjusting device.

* * * * *